US010937999B2

(12) United States Patent
Takahashi et al.

(10) Patent No.: US 10,937,999 B2
(45) Date of Patent: Mar. 2, 2021

(54) SECONDARY BATTERY AND MANUFACTURING METHOD OF THE SAME

(71) Applicant: Semiconductor Energy Laboratory Co., LTD., Atsugi (JP)

(72) Inventors: Minoru Takahashi, Nagano (JP); Junpei Momo, Kanagawa (JP); Ryota Tajima, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 694 days.

(21) Appl. No.: 14/948,681

(22) Filed: Nov. 23, 2015

(65) Prior Publication Data
US 2016/0156012 A1 Jun. 2, 2016

(30) Foreign Application Priority Data

Nov. 28, 2014 (JP) .............................. JP2014-241726

(51) Int. Cl.
*H01M 2/02* (2006.01)
*H01M 10/04* (2006.01)
(Continued)

(52) U.S. Cl.
CPC ....... *H01M 2/021* (2013.01); *H01M 10/0436* (2013.01); *H01M 10/0463* (2013.01); (Continued)

(58) Field of Classification Search
CPC combination set(s) only.
See application file for complete search history.

(56) References Cited

U.S. PATENT DOCUMENTS 6,599,659 B1 7/2003 Endo et al.
6,664,005 B2 12/2003 Kezuka et al.
(Continued)

FOREIGN PATENT DOCUMENTS

CN 102593406 A 7/2012
CN 103401024 A 11/2013
(Continued)

*Primary Examiner* — Barbara L Gilliam
*Assistant Examiner* — Nathaniel T Zemui
(74) *Attorney, Agent, or Firm* — Nixon Peabody LLP; Jeffrey L. Costellia

(57) ABSTRACT

In the case where a secondary battery is repetitively curved, portions which tend to cause deterioration such as crack or breakage are, for example, a positive electrode tab and a negative electrode tab. This is because these portions are narrow projected portions, and tend to have low mechanical strength against repetitive curving in some cases. In view of the above, the positive electrode tab and the negative electrode tab are provided in portions relatively less affected by curving. More specifically, secondary battery includes a positive electrode, a positive electrode lead electrically connected to the positive electrode, a negative electrode, a negative electrode lead electrically connected to the negative electrode, a separator, and an exterior body wrapping the positive electrode, the negative electrode, and the separator. The positive electrode, the separator, the negative electrode, and the exterior body can be curved in a first direction. The positive electrode lead and the negative electrode lead are drawn from opposite sides of the exterior body.

16 Claims, 25 Drawing Sheets

E1

E2

(51) Int. Cl.
*H01M 10/48* (2006.01)
*H01M 10/42* (2006.01)
*H01M 10/052* (2010.01)
*H01M 10/0585* (2010.01)

(52) U.S. Cl.
CPC ...... *H01M 10/052* (2013.01); *H01M 10/0585* (2013.01); *H01M 10/482* (2013.01); *H01M 2010/4271* (2013.01); *H01M 2220/20* (2013.01); *H01M 2220/30* (2013.01); *Y02E 60/10* (2013.01)

(56) References Cited

U.S. PATENT DOCUMENTS

| | | | |
|---|---|---|---|
| 8,192,863 B2 | 6/2012 | Best et al. | |
| 8,785,030 B2 | 7/2014 | Ueda | |
| 8,900,742 B2 | 12/2014 | Ahn et al. | |
| 2011/0081570 A1* | 4/2011 | Jang | H01M 10/0436 429/162 |
| 2011/0097615 A1* | 4/2011 | Goh et al. | |
| 2012/0183825 A1 | 7/2012 | Lee et al. | |
| 2013/0108907 A1 | 5/2013 | Bhardwaj | |
| 2014/0106193 A1* | 4/2014 | Kim | H01M 2/22 429/94 |
| 2014/0109397 A1* | 4/2014 | Devan | H01M 10/049 29/623.2 |
| 2015/0000117 A1* | 1/2015 | Cho | H01M 10/0404 29/623.2 |
| 2015/0049591 A1* | 2/2015 | Adams | G04G 21/08 368/13 |
| 2015/0111088 A1 | 4/2015 | Hiroki et al. | |
| 2015/0140396 A1* | 5/2015 | Yamazaki et al. | |
| 2015/0147626 A1 | 5/2015 | Tajima et al. | |
| 2015/0155530 A1 | 6/2015 | Takahashi et al. | |
| 2015/0155589 A1* | 6/2015 | Suh | H01M 10/0463 429/127 |
| 2015/0162590 A1 | 6/2015 | Takahashi et al. | |
| 2015/0270530 A1* | 9/2015 | Thoennessen | H01M 2/362 29/623.2 |
| 2015/0333299 A1* | 11/2015 | Tsai et al. | |
| 2016/0020434 A1* | 1/2016 | Kwon | H01M 2/0212 429/161 |
| 2016/0036012 A1* | 2/2016 | Kreitman | H01M 2/08 429/185 |
| 2016/0133987 A1* | 5/2016 | Choi | H01M 10/425 429/7 |
| 2016/0248053 A1* | 8/2016 | Iseri | H01M 2/0275 |

FOREIGN PATENT DOCUMENTS

| | | |
|---|---|---|
| CN | 203312421 U | 11/2013 |
| CN | 103441307 A | 12/2013 |
| EP | 2325929 | 5/2011 |
| EP | 2477267 A | 7/2012 |
| JP | 2000/173559 | 6/2000 |
| JP | 2009/187768 | 8/2009 |
| JP | 2010-080325 A | 4/2010 |
| JP | 2011-060456 A | 3/2011 |
| JP | 2014-072348 A | 4/2014 |
| WO | WO-2014/190647 | 12/2014 |
| WO | WO-2014/190765 | 12/2014 |

* cited by examiner

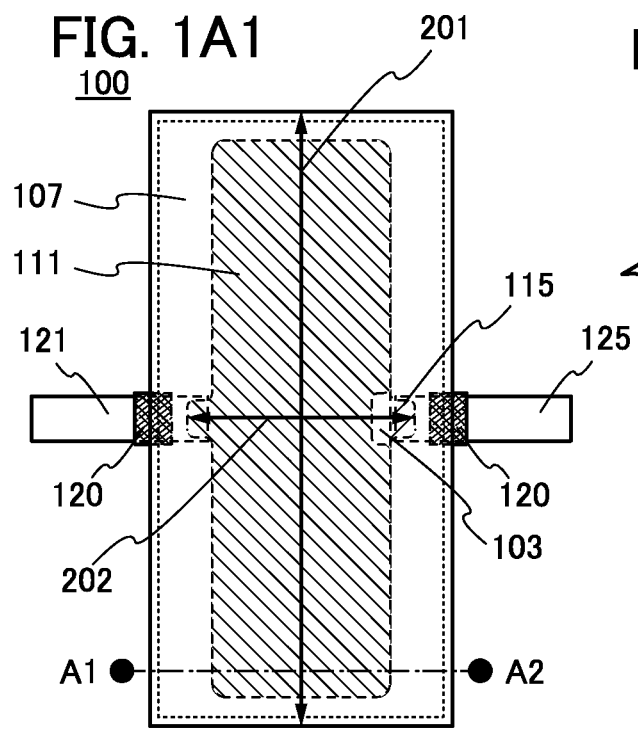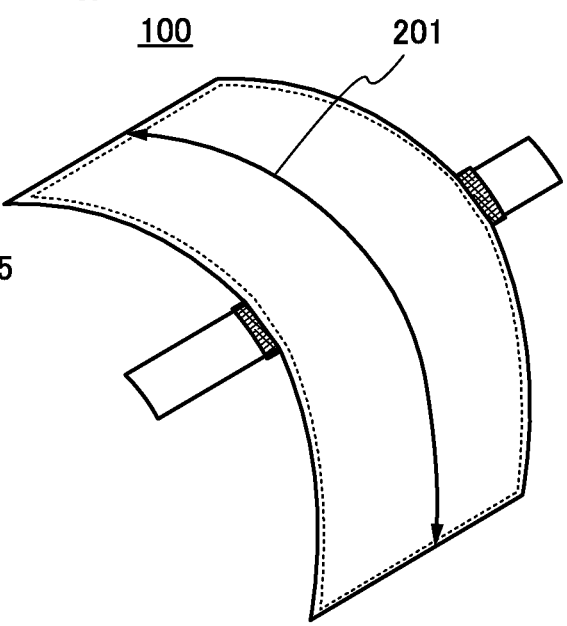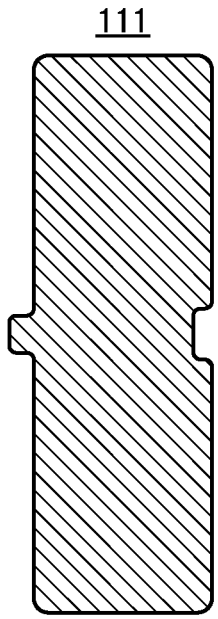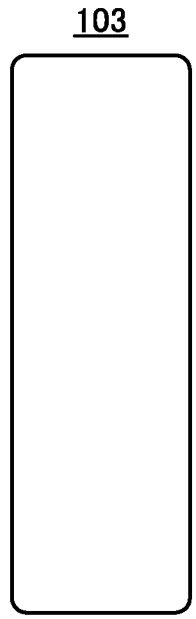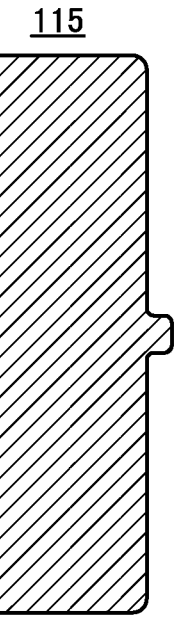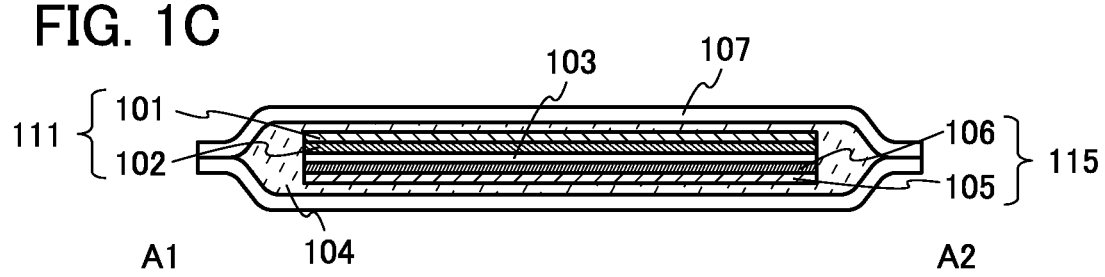

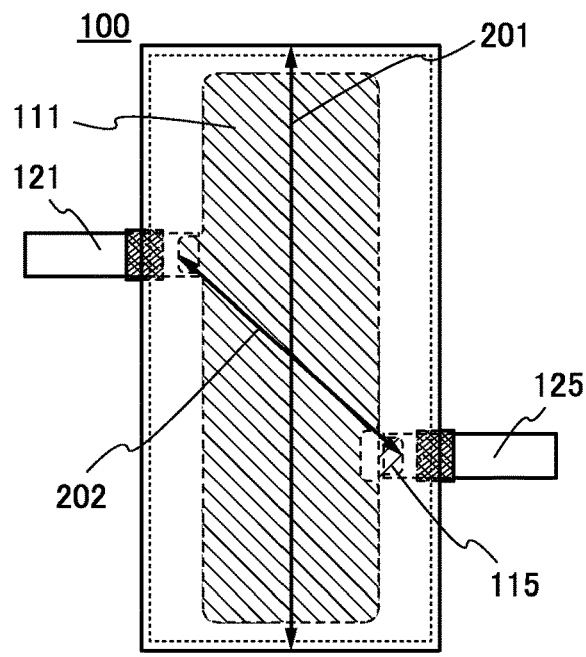
FIG. 4A1
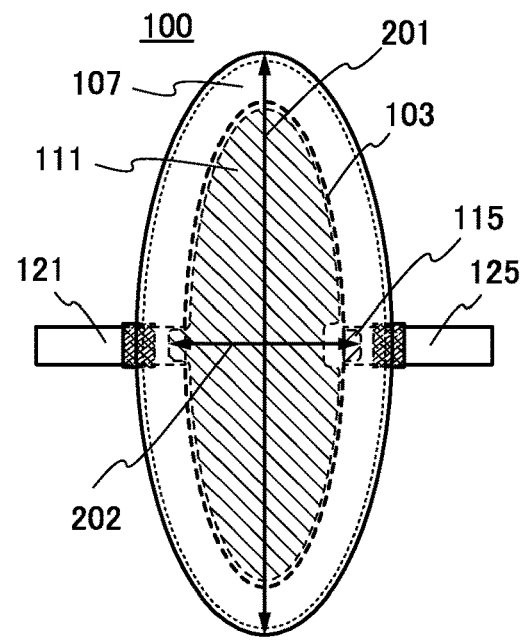
FIG. 4A2
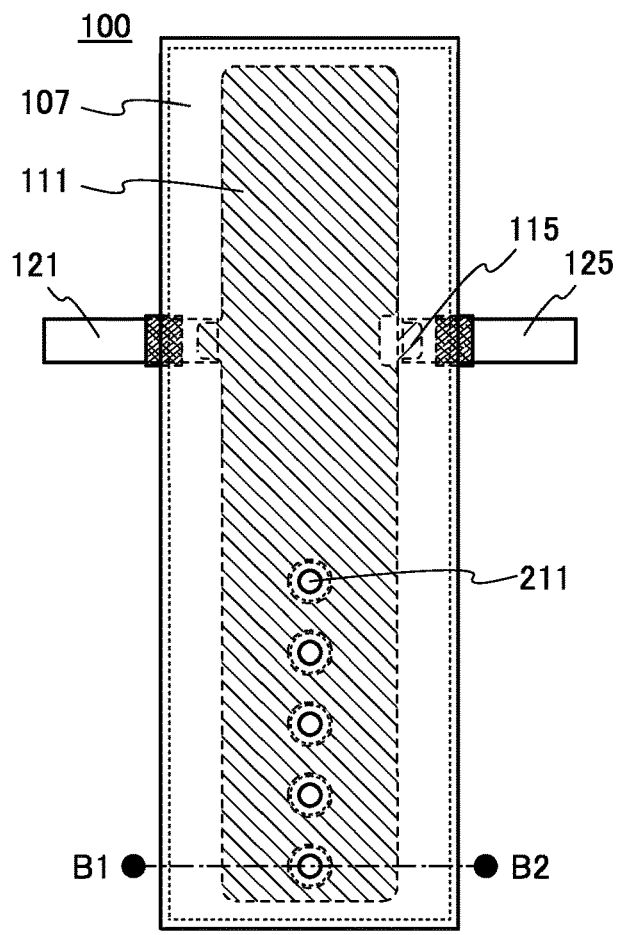
FIG. 4B1
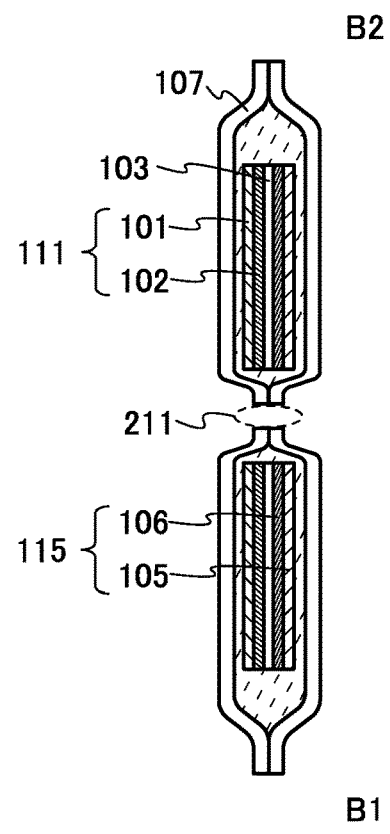
FIG. 4B2

FIG. 5A
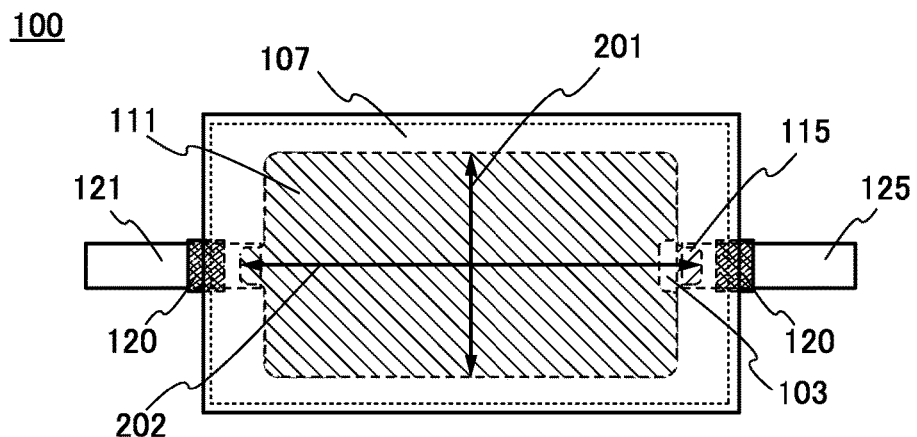
FIG. 5B1
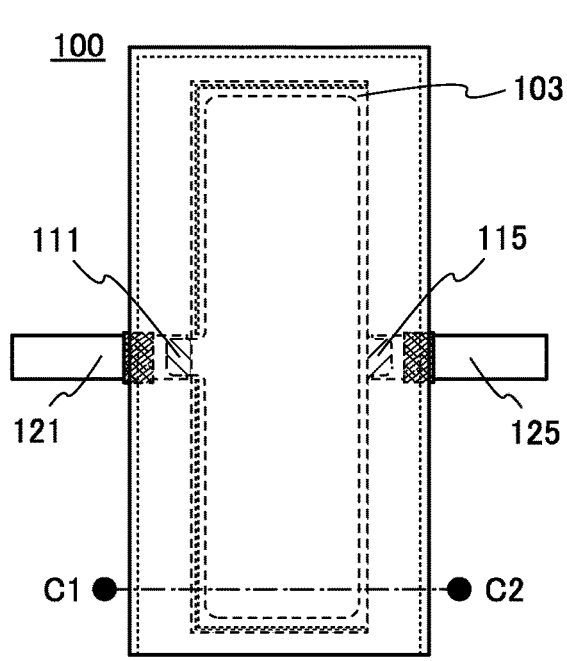
FIG. 5B2
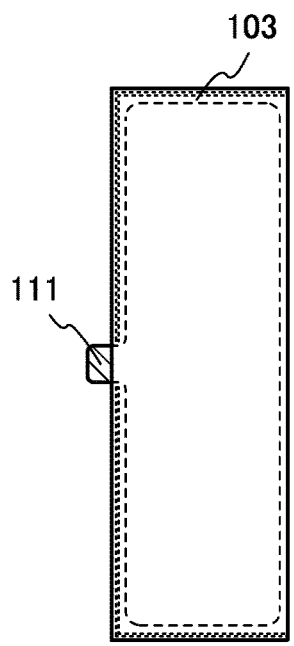
FIG. 5B3
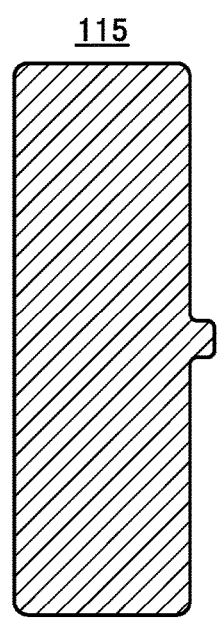
FIG. 5C
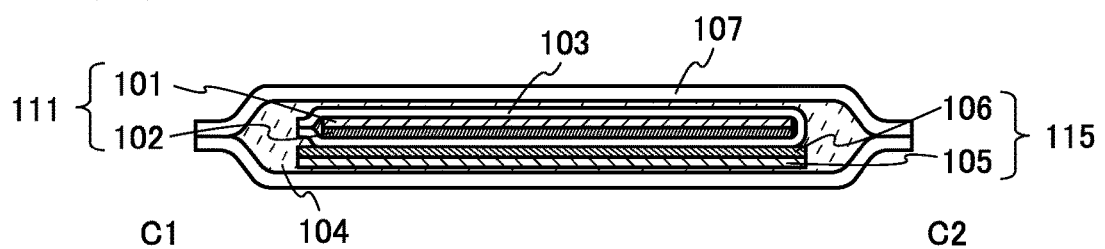

FIG. 9A
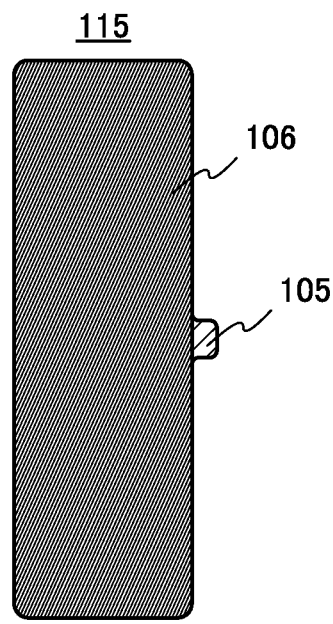
FIG. 9B1
FIG. 9B2
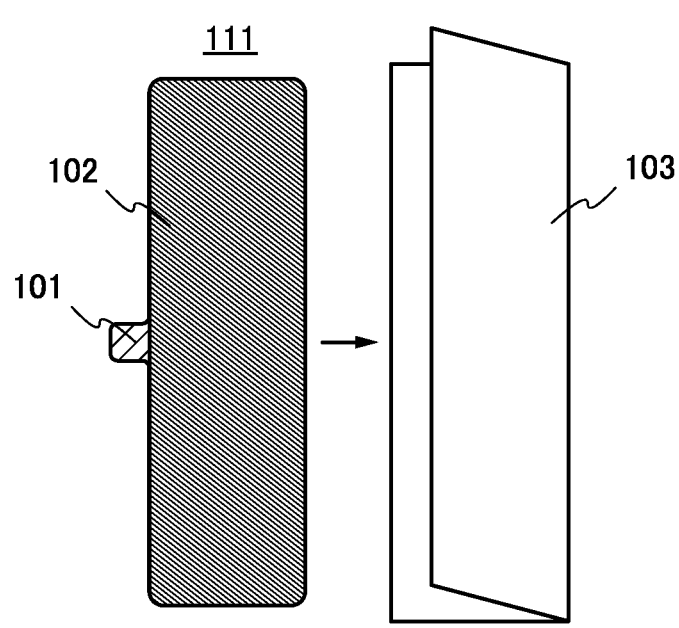
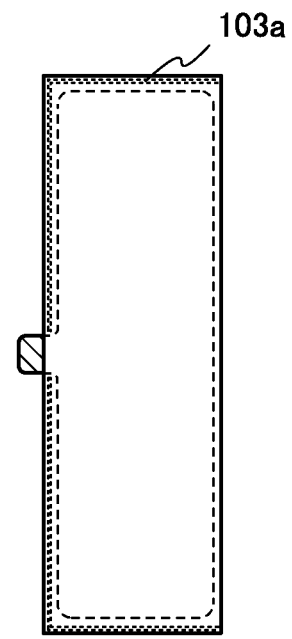

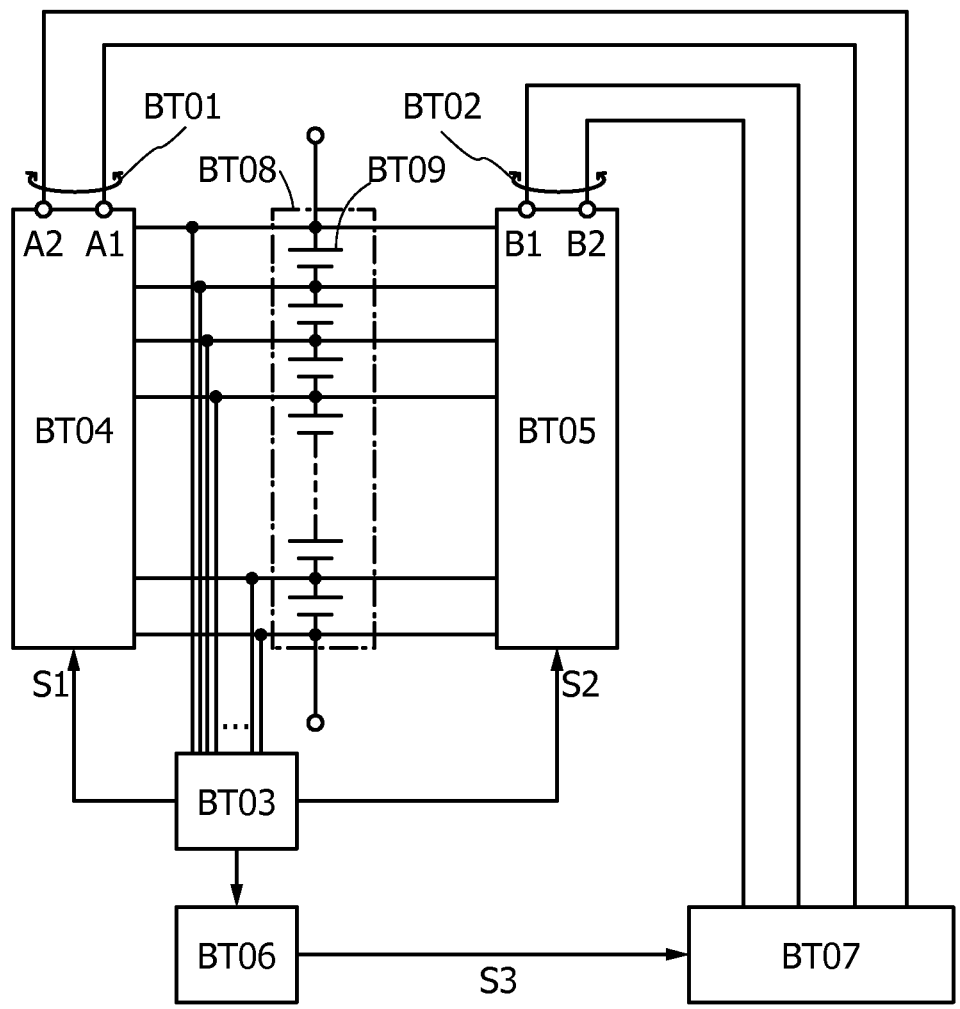

FIG. 21A  FIG. 21B  FIG. 21C
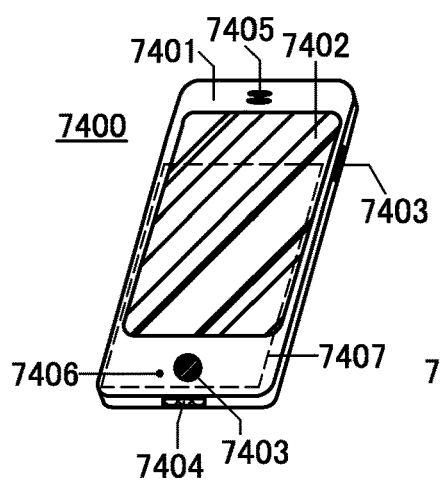
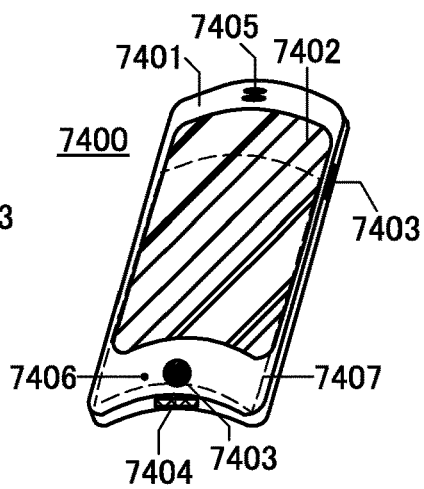
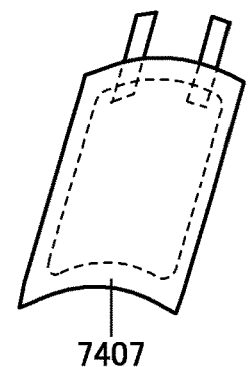
FIG. 21D  FIG. 21E
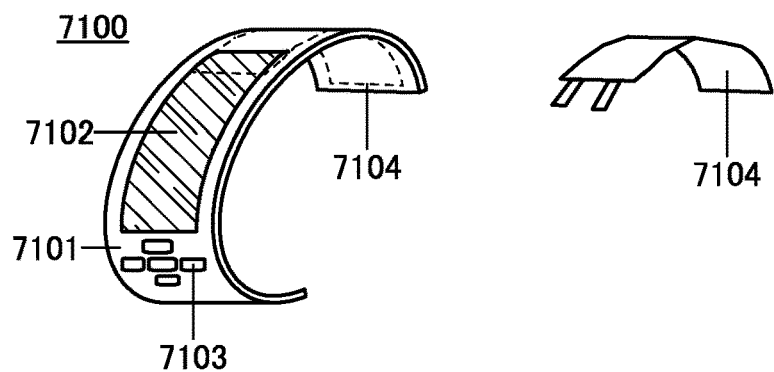
FIG. 21F
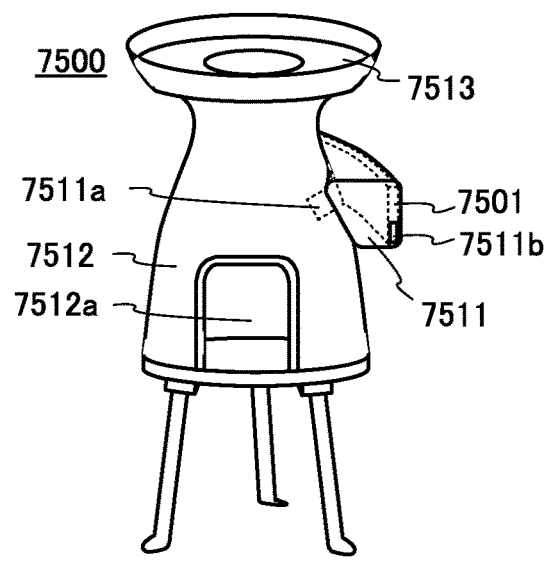

SECONDARY BATTERY AND MANUFACTURING METHOD OF THE SAME

BACKGROUND OF THE INVENTION

1. Field of the Invention

The present invention relates to an object, a method, or a manufacturing method. In addition, the present invention relates to a process, a machine, manufacture, or a composition of matter. In particular, one embodiment of the present invention relates to a semiconductor device, a display device, a light-emitting device, a power storage device, an imaging device, a driving method thereof, or a manufacturing method thereof. In particular, one embodiment of the present invention relates to a secondary battery and a method for manufacturing the secondary battery.

2. Description of the Related Art

In recent years, wearable devices have been under active development. Since a feature of wearable devices is that they are carried on one's body, it is preferable that they can conform to a curved surface of the body or be curved according to the movement of the body. Therefore, flexible secondary batteries used in wearable devices have been also under development, like those for displays and other housings.

For example, Patent Document 1 discloses a sheet-like power storage device which can be curved, and electronic devices including the power storage device.
[Patent Document]
[Patent Document 1] United States Patent Application Publication No. 2013/0108907

SUMMARY OF THE INVENTION

In the case of a secondary battery having flexibility, a flexible material such as a laminate film is generally used for the exterior body. Part of a positive electrode lead electrically connected to a positive electrode and part of a negative electrode lead electrically connected to a negative electrode are led to the outside of the exterior body. Note that a narrow projected portion of a positive electrode, which is electrically connected to a positive electrode lead, is referred to as a positive electrode tab. Similarly, a narrow projected portion of the negative electrode, which is electrically connected to a negative electrode lead, is a negative electrode tab.

When the above secondary battery is repetitively curved, portions which tend to cause deterioration such as crack or breakage are a positive electrode tab and a negative electrode tab, for example. This is because these portions are narrow projected portions and have smaller thickness than an electrode portion on which an active material is formed, so that they tend to have low mechanical strength against repetitive curving.

In view of the above, in one embodiment of the present invention, a secondary battery having a novel structure is provided. Specifically, a flexible secondary battery having a novel structure is provided.

An object of one embodiment of the present invention is to provide a novel power storage device, an electronic device including a novel secondary battery, or the like. Note that the descriptions of these objects do not disturb the existence of other objects. In one embodiment of the present invention, there is no need to achieve all the objects. Other objects will be apparent from and can be derived from the description of the specification, the drawings, the claims, and the like.

In order to achieve the object, the positive electrode tab and the negative electrode tab are provided at positions relatively less affected by curving.

In the case where a secondary battery is curved in one axis direction, the positional shift of adjacent current collectors is likely to be the largest at end portions in the curving direction due to the difference between the inner diameter and the outer diameter of the secondary battery. Therefore, a positive electrode tab and a negative electrode tab are provided so as to avoid sides having the end portions in the curving direction.

More specifically, one embodiment of the present invention is a secondary battery including a positive electrode, a positive electrode lead electrically connected to the positive electrode, a negative electrode, a negative electrode lead electrically connected to the negative electrode, a separator, and an exterior body wrapping the positive electrode, the negative electrode, and the separator. The positive electrode, the separator, the negative electrode, and the exterior body can be curved in a first direction. The positive electrode lead and the negative electrode lead are drawn from opposite sides of the exterior body.

In the above, a second direction connecting a positive electrode tab portion where the positive electrode and the positive electrode lead are electrically connected and a negative electrode tab portion where the negative electrode and the negative electrode lead are electrically connected is preferably perpendicular to the first direction.

A secondary battery having a novel structure can be provided. Specifically, a flexible secondary battery having a novel structure can be provided.

Furthermore, a novel power storage device, an electronic device including a novel secondary battery, or the like can be provided. Note that the description of these effects does not disturb the existence of other effects. One embodiment of the present invention does not necessarily achieve all the objects listed above. Other effects will be apparent from and can be derived from the description of the specification, the drawings, the claims, and the like.

BRIEF DESCRIPTION OF THE DRAWINGS

FIGS. 1A1, 1A2, 1B1, 1B2, 1B3, and 1C are top views, a perspective view, and a cross sectional view illustrating a structure example of a secondary battery.

FIG. 3 is a cross-sectional view illustrating a conductive additive or the like which can be used in a secondary battery.

FIGS. 4A1, 4A2, 4B1, and 4B2 are top views and a cross-sectional view illustrating examples of a secondary battery.

FIGS. 5A, 5B1, 5B2, 5B3, and 5C are top views and a cross-sectional view illustrating a structure example of a secondary battery.

FIGS. 9A, 9B1, and 9B2 illustrate a method of manufacturing a secondary battery.

FIG. 13 is a block diagram illustrating a battery management unit of a power storage device.

FIGS. 21A to 21F each illustrate an example of an electronic device.

DETAILED DESCRIPTION OF THE INVENTION

Figure 2A:
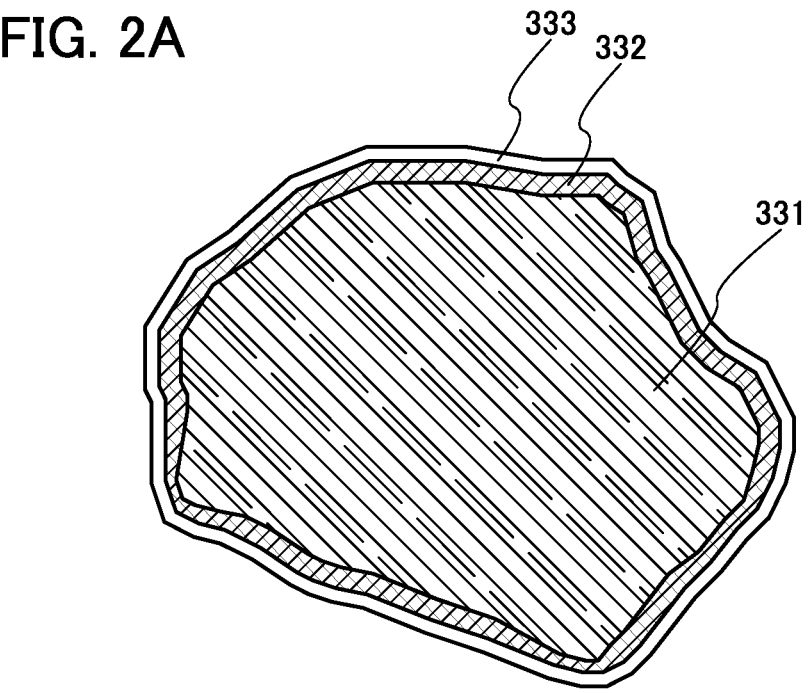
FIGS. 2A and 2B are cross-sectional views each illustrating a positive electrode active material which can be used in a secondary battery.

Embodiments of the present invention will be described below in detail with reference to the drawings. However, the present invention is not limited to the description below, and it is easily understood by those skilled in the art that modes and details disclosed herein can be modified in various ways. Furthermore, the present invention is not construed as being limited to description of the embodiments.

The term "electrically connected" includes the case where components are connected through an "object having any electric function". There is no particular limitation on the "object having any electric function" as long as electric signals can be transmitted and received between the components connected through the object.

The position, size, range, or the like of each component illustrated in drawings and the like is not accurately represented in some cases for easy understanding. Therefore, the disclosed invention is not necessarily limited to the position, the size, the range, or the like disclosed in the drawings and the like.

The ordinal number such as "first", "second", and "third" are used to avoid confusion among components.

Note that the terms "film" and "layer" can be interchanged with each other depending on the case or circumstances. For example, the term "conductive layer" can be changed into the term "conductive film" in some cases. Also, the term "insulating film" can be changed into the term "insulating layer" in some cases.

Embodiment 1

In this embodiment, a structure example of a secondary battery of one embodiment of the present invention is described with reference to FIGS. 1A1 to 1C, FIGS. 2A and 2B, FIG. 3, FIGS. 4A1 to 4B2, FIGS. 5A to 5C, FIGS. 6A to 6C, FIGS. 7A to 7C, and FIGS. 8A to 8C.

[1. 1. Typical Structure]

A secondary battery 100 illustrated in FIG. 1A1 includes a positive electrode 111, a positive electrode lead 121 electrically connected to the positive electrode 111, a negative electrode 115, a negative electrode lead 125 electrically connected to the negative electrode 115, a separator 103, and an exterior body 107 wrapping the positive electrode 111, the negative electrode 115, and the separator 103. The positive electrode lead 121 and the negative electrode lead 125 each include a sealing layer 120. The secondary battery 100 includes an electrolyte solution 104 in a region wrapped with the exterior body 107.

The positive electrode 111, the separator 103, and the negative electrode 115 included in the secondary battery 100 are extracted and illustrated in FIGS. 1B1, 1B2, and 1B3, respectively. FIG. 1C is a cross-sectional view along line A1-A2 in FIG. 1A1. The positive electrode 111 includes a positive electrode current collector 101 and a positive electrode active material layer 102. The positive electrode active material layer 102 contains a positive electrode active material. The negative electrode 115 includes a negative electrode current collector 105 and a negative electrode active material layer 106. The negative electrode active material layer 106 contains a negative electrode active material. The positive electrode active material layer 102 over the positive electrode current collector 101 overlaps with the negative electrode active material layer 106 over the negative electrode current collector 105 with the separator 103 provided therebetween.

The secondary battery 100 can be curved in a first direction 201 as illustrated in FIG. 1A2.

The positive electrode lead 121 and the negative electrode lead 125 are drawn from opposite sides of the exterior body 107. In the case where a secondary battery 100 is curved in one axis direction, the positional shift of adjacent current collectors is likely to be the largest at end portions in the curving direction due to the difference between the inner diameter and the outer diameter of the secondary battery 100. Therefore, a positive electrode tab and a negative electrode tab are provided so as to avoid sides having the end portions of the exterior body 107 in the curving direction. In this specification or the like, a portion from the edge of the exterior body 107 in a range within 10% of the overall length of the exterior body 107 is referred to as the end portion of the exterior body 107.

A second direction 202 represents a direction connecting a tab portion of the positive electrode 111 where the positive electrode 111 and the positive electrode lead 121 are electrically connected and a tab portion of the negative electrode 115 where the negative electrode 115 and the negative electrode lead 125 are electrically connected. The second direction 202 is perpendicular to the first direction 201 in the secondary battery 100 in FIGS. 1A1 to 1C.

As illustrated in FIGS. 1A1 and 1B1, it is preferable that the positive electrode 111 be partly cut. This is because it is preferable that the positive electrode 111 be not provided near the tab of the negative electrode 115 to prevent short circuit between the positive electrode 111 and the negative electrode 115 when the positive electrode 111 and the negative electrode 115 are stacked.

In the secondary battery 100 having the structure illustrated in FIG. 1A1, the tab portion of the positive electrode 111 and the tab portion of the negative electrode 115 can be provided in portions relatively less affected by curving.

Therefore, the deterioration of the secondary battery 100 can be suppressed. In addition, the secondary battery 100 can be highly reliable.

The above structure is particularly effective for the secondary battery 100 which is thin and long in the first direction of curving the secondary battery 100. Thus, the length of the exterior body 107 in the first direction 201 is preferably twice or more, more preferably three times or more the length of the exterior body 107 in the second direction 202.

Materials that can be used for the positive electrode 111, the negative electrode 115, the separator 103, the electrolyte solution 104, and the exterior body 107, which are included in the secondary battery 100, are described below.

[1. 2. Positive Electrode]

The positive electrode 111 includes the positive electrode current collector 101, the positive electrode active material layer 102 formed on the positive electrode current collector 101, and the like.

The positive electrode current collector 101 can be formed using a material that has high conductivity and does not cause a significant chemical change, such as a metal typified by stainless steel, gold, platinum, aluminum, or titanium, or an alloy thereof. Alternatively, an aluminum alloy to which an element which improves heat resistance, such as silicon, titanium, neodymium, scandium, or molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The positive electrode current collector 101 can have a foil-like shape, a plate-like shape (a sheet-like shape), a net-like shape, a punching-metal shape, an expanded-metal shape, or the like as appropriate. The positive electrode current collector 101 preferably has a thickness of greater than or equal to 5 μm and less than or equal to 30 μm. The surface of the positive electrode current collector 101 may be provided with an undercoat using graphite or the like.

The positive electrode active material layer 102 may further include a binder for increasing adhesion of positive electrode active materials, a conductive additive for increasing the conductivity of the positive electrode active material layer 102, and the like in addition to the positive electrode active material.

Examples of positive electrode active materials that can be used for the positive electrode active material layer 102 include a composite oxide with an olivine structure, a composite oxide with a layered rock-salt structure, and a composite oxide with a spinel structure. As the positive electrode active material, a compound such as $LiFeO_2$, $LiCoO_2$, $LiNiO_2$, $LiMn_2O_4$, $V_2O_5$, $Cr_2O_5$, and $MnO_2$ is used.

$LiCoO_2$ is particularly preferable because it has high capacity, stability in the air higher than that of $LiNiO_2$, and thermal stability higher than that of $LiNiO_2$, for example.

It is preferable to add a small amount of lithium nickel oxide ($LiNiO_2$ or $LiNi_{1-x}M_xO_2$ (0<x<1)(M=Co, Al, or the like)) to a lithium-containing material with a spinel crystal structure which contains manganese such as $LiMn_2O_4$ because characteristics of the secondary battery using such a material can be improved.

In addition, a lithium-manganese composite oxide that is represented by a composition formula $Li_aMn_bM_cO_d$ can be used as the positive electrode active material. Here, the element M is preferably a metal element other than lithium and manganese, or silicon or phosphorus, more preferably nickel. Furthermore, it is preferable to satisfy the following at the time of discharging: 0<a/(b+c)<2; c>0; and 0.26≤(b+c)/d<0.5. Note that the lithium-manganese composite oxide is an oxide containing at least lithium and manganese, and may contain at least one selected from chromium, cobalt, aluminum, nickel, iron, magnesium, molybdenum, zinc, indium, gallium, copper, titanium, niobium, silicon, phosphorus, and the like. To obtain a lithium-manganese composite oxide with different properties in a superficial portion and a central portion described later, it is particularly preferable to use a lithium-manganese composite oxide represented by a composition formula $Li_{1.68}Mn_{0.8062}M_{0.318}O_3$. Here, a lithium-manganese composite oxide represented by a composition formula $Li_{1.68}Mn_{0.8062}Ni_{0.318}O_3$ refers to that formed at a ratio (molar ratio) of the amounts of raw materials of $Li_2CO_3$:$MnCO_3$:NiO=0.84:0.8062:0.318. Although this lithium-manganese composite oxide is represented by a composition formula $Li_{1.68}Mn_{0.8062}M_{0.318}O_3$, the composition might be different. For example, the composition formula is $Li_aMn_bM_cO_d$ satisfying relations 1.5<a<1.8, 0.6<b<1, 0.1<c<0.5, and d=3.

The average particle diameter of the lithium-manganese composite oxides is preferably greater than or equal to 5 nm and less than or equal to 50 μm, for example. Note that the average particle sizes can be measured with a particle size distribution analyzer or the like using a laser diffraction and scattering method or by observation with a scanning electron microscope (SEM) or a TEM. The specific surface area can be measured by a gas adsorption method.

Figure 2B:
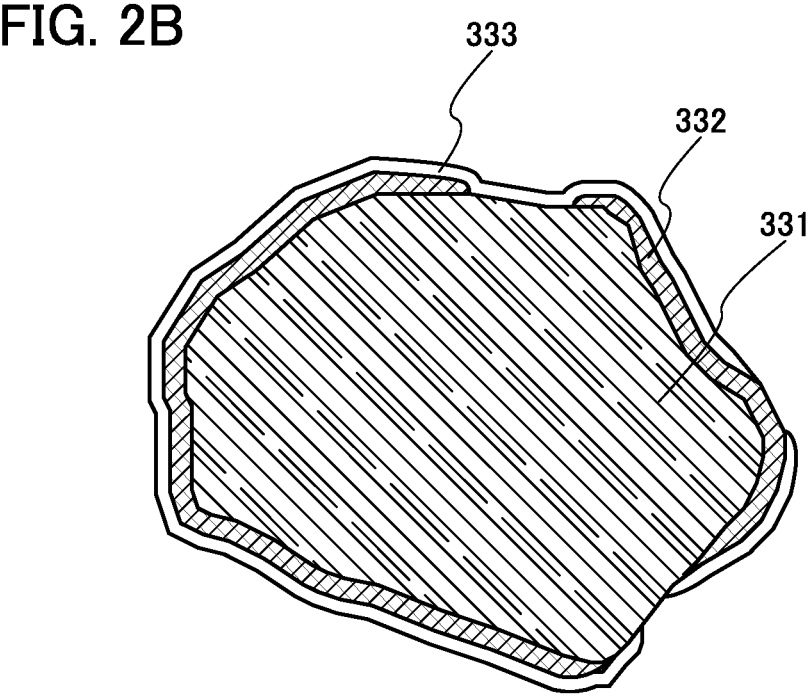

In addition, a lithium-manganese composite oxide preferably has different properties in a superficial portion and a central portion because high capacity can be obtained. FIGS. 2A and 2B each illustrate an example of a cross-sectional view of a lithium manganese composite oxide particle having different properties in a superficial portion and a central portion.

As illustrated in FIG. 2A, a lithium-manganese composite oxide having different properties in a superficial portion and a central portion preferably includes a first region 331, a second region 332, and a third region 333. The second region 332 is in contact with at least part of the outside of the first region 331. Here, the term "outside" refers to the side closer to a surface of the particle. The third region 333 preferably includes a region corresponding to the surface of the lithium manganese composite oxide particle.

As shown in FIG. 2B, the first region 331 may include a region not covered with the second region 332. The second region 332 may include a region not covered with the third region 333. For example, the first region 331 may include a region in contact with the third region 333. The first region 331 may include a region covered with neither the second region 332 nor the third region 333.

The second region 332 preferably has composition different from that of the first region 331.

For example, the case is described where the first region 331 contains lithium, manganese, the element M, and oxygen; the second region 332 contains lithium, manganese, the element M, and oxygen; the atomic ratio of lithium to manganese, the element M, and oxygen in the first region 331 is represented by a1:b1:c1:d1; and the atomic ratio of lithium to manganese, the element M, and oxygen in the second region 332 is represented by a2:b2:c2:d2. Here, d1/(b1+c1) is preferably greater than or equal to 2.2, more preferably greater than or equal to 2.3, much more preferably greater than or equal to 2.35 and less than or equal to 3. Furthermore, d2/(b2+c2) is preferably less than 2.2, more preferably less than 2.1, much more preferably greater than or equal to 1.1 and less than or equal to 1.9.

The valence of manganese in the second region 332 may be different from that of manganese in the first region 331. The valence of the element M in the second region 332 may be different from that of the element M in the first region 331.

Specifically, the first region 331 is preferably a lithium-manganese composite oxide having a layered rock-salt crystal structure. The second region 332 is preferably a lithium-manganese composite oxide having a spinel crystal structure.

Here, in the case where the composition of the regions or valences of elements in the regions are spatially distributed, the composition or valences in a plurality of portions are obtained, the average values thereof are calculated, and the average values are regarded as the composition or valences of the regions, for example.

A transition layer may be provided between the second region 332 and the first region 331. Here, the transition layer is a region where composition is changed continuously or gradually, a region where a crystal structure is changed continuously or gradually, or a region where the lattice constant of a crystal is changed continuously or gradually. A mixed layer may be provided between the second region 332 and the first region 331. The mixed layer is a layer in which, for example, two or more crystals having different crystal orientations are mixed, two or more crystals having different crystal structures are mixed, or two or more crystals having different compositions are mixed.

The third region 333 preferably contains carbon. Since carbon has high conductivity, the particle coated with carbon in the electrode of the secondary battery can reduce the resistance of the electrode, for example. The coating layer may contain graphene, graphene oxide, or graphene oxide subjected to reduction. Graphene and reduced graphene oxide have excellent electrical characteristics of high conductivity and excellent physical properties of high flexibility and high mechanical strength.

The thickness of the coating layer is preferably greater than or equal to 0.4 nm and less than or equal to 40 nm.

The third region 333 may contain a metal compound. Examples of the metal include cobalt, aluminum, nickel, iron, manganese, titanium, zinc, lithium, and carbon. As an example of the metal compound, an oxide of the metal, a fluoride of the metal, or the like can be given.

Oxidation and reduction or the crystal structure of the third region 333 is preferably more stable than the first region 331 and the second region 332 at the time of a battery reaction such as charging and discharging.

Alternatively, a complex material ($LiMPO_4$ (general formula) (M is one or more of Fe(II), Mn(II), Co(II), and Ni(II))) can be used. Typical examples of the general formula $LiMPO_4$ which can be used as a material are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<<1). $LiFePO_4$ is particularly preferable because it meets requirements with balance for a positive electrode active material, such as safety, stability, high capacity density, and the existence of lithium ions that can be extracted in initial oxidation (charging).

Alternatively, a complex material such as $Li_{(2-j)}MSiO_4$ (general formula) (M is one or more of Fe(II), Mn(II), Co(II), and Ni(II); 0≤j≤2) may be used. Typical examples of the general formula $Li_{(2-j)}MSiO_4$ which can be used as a material are lithium compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_nSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Still alternatively, a nasicon compound expressed by $A_xM_2(XO_4)_3$ (general formula) (A=Li, Na, or Mg, M=Fe, Mn, Ti, V, or Nb, X=S, P, Mo, W, As, or Si) can be used for the positive electrode active material. Examples of the nasicon compound are $Fe_2(MnO_4)_3$, $Fe_2(SO_4)_3$, and $Li_3Fe_2(PO_4)_3$. Still further alternatively, compounds represented by a general formula, $Li_2MPO_4F$, $Li_2MP_2O_7$, and $Li_5MO_4$ (M=Fe or Mn), a perovskite fluoride such as $NaFeF_3$ and $FeF_3$, a metal chalcogenide (a sulfide, a selenide, and a telluride) such as $TiS_2$ and $MoS_2$, an oxide with an inverse spinel crystal structure such as $LiMVO_4$, a vanadium oxide (e.g., $V_2O_5$, $V_6O_{13}$, and $LiV_3O_8$), a manganese oxide, and an organic sulfur compound can be used as the positive electrode active material, for example.

In the case where carrier ions are alkali metal ions other than lithium ions or alkaline-earth metal ions, the positive electrode active material may contain, instead of lithium, an alkali metal (e.g., sodium or potassium) or an alkaline-earth metal (e.g., calcium, strontium, barium, beryllium, or magnesium). For example, the positive electrode active material may be a layered oxide containing sodium such as $NaFeO_2$ or $Na_{2/3}[Fe_{1/2}Mn_{1/2}]O_2$.

Further alternatively, any of the aforementioned materials may be combined to be used as the positive electrode active material. For example, a solid solution obtained by combining two or more of the above materials can be used as the positive electrode active material. For example, a solid solution of $LiCo_{1/3}Mn_{1/3}Ni_{1/3}O_2$ and $Li_2MnO_3$ can be used as the positive electrode active material.

Note that although not shown, a conductive material such as a carbon layer may be provided on a surface of the positive electrode active material layer 102. With the conductive material such as the carbon layer, conductivity of the electrode can be increased. For example, the positive electrode active material layer 102 can be coated with the carbon layer by mixing a carbohydrate such as glucose at the time of baking the positive electrode active material.

The average particle diameter of the primary particle of the positive electrode active material layer 102 is preferably greater than or equal to 50 nm and less than or equal to 100 μm.

Examples of the conductive additive include a carbon material, a metal material, and a conductive ceramic material. Alternatively, a fiber material may be used as the conductive additive. The content of the conductive additive in the active material layer is preferably greater than or equal to 1 wt % and less than or equal to 10 wt %, more preferably greater than or equal to 1 wt % and less than or equal to 5 wt %.

A network for electrical conduction can be formed in the electrode by the conductive additive. The conductive additive also allows maintaining of a path for electric conduction between the particles of the positive electrode active material. The addition of the conductive additive to the active material layer increases the electrical conductivity of the active material layer.

Examples of the conductive additive include natural graphite, artificial graphite such as mesocarbon microbeads, and carbon fiber. Examples of carbon fiber include mesophase pitch-based carbon fiber, isotropic pitch-based carbon fiber, carbon nanofiber, and carbon nanotube. Carbon nanotube can be formed by, for example, a vapor deposition method. Other examples of the conductive additive include carbon materials such as carbon black (e.g., acetylene black (AB)), graphite (black lead) particles, graphene, and fullerene. Alternatively, metal powder or metal fibers of copper, nickel, aluminum, silver, gold, or the like, a conductive ceramic material, or the like can be used.

Flaky graphene has an excellent electrical characteristic of high conductivity and excellent physical properties of high flexibility and high mechanical strength. Thus, the use of graphene as the conductive additive can increase contact points and the contact area of active materials.

Note that graphene in this specification includes single-layer graphene and multilayer graphene including two to hundred layers. Single-layer graphene refers to a one-atom-thick sheet of carbon molecules having π bonds. Graphene oxide refers to a compound formed by oxidation of such graphene. When graphene oxide is reduced to form graphene, oxygen contained in the graphene oxide is not entirely released and part of the oxygen remains in the graphene. In the case where graphene contains oxygen, the proportion of oxygen in the graphene measured by XPS is higher than or equal to 2 atomic % and lower than or equal to 11 atomic %, preferably higher than or equal to 3 atomic % and lower than or equal to 10 atomic %.

Graphene is capable of making low-resistance surface contact and has extremely high conductivity even with a small thickness. Therefore, even a small amount of graphene can efficiently form a conductive path in an active material layer.

In the case where an active material with a small average particle size (e.g., 1 µm or less) is used, the specific surface area of the active material is large and thus more conductive paths for the active material particles are needed. In such a case, it is particularly preferred that graphene with extremely high conductivity that can efficiently form a conductive path even in a small amount be used.

A cross-sectional structure example of a positive electrode active material layer containing graphene as a conductive additive is described below. Note that a negative electrode active material layer may contain graphene as a conductive additive.

Figure 3:
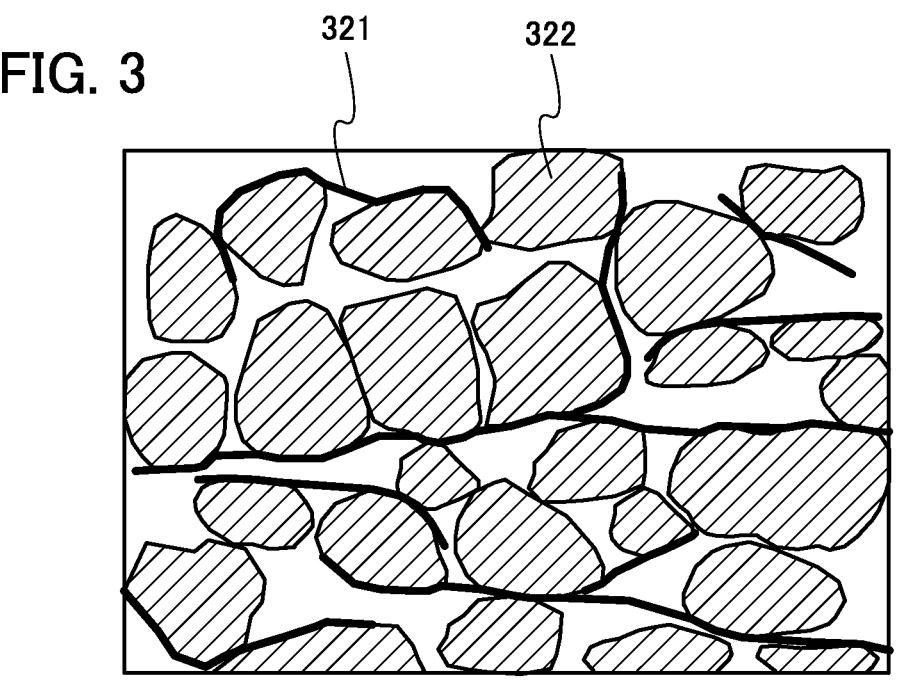

FIG. 3 shows a longitudinal sectional view of the positive electrode active material layer 102. The positive electrode active material layer 102 includes positive electrode active material particles 322, graphene flakes 321 as a conductive additive, and a binder (not illustrated).

The longitudinal section of the positive electrode active material layer 102 of FIG. 3 shows substantially uniform dispersion of the graphene flakes 321 in the positive electrode active material layer 102. The graphene flakes 321 are schematically shown by thick lines in FIG. 3 but are actually thin films each having a thickness corresponding to the thickness of a single layer or a multi-layer of carbon molecules. The plurality of graphene flakes 321 are formed in such a way as to wrap, coat, or adhere to the surfaces of the plurality of positive electrode active material particles 322, so that the graphene flakes 321 make surface contact with the positive electrode active material particles 322. Furthermore, the graphene flakes 321 are also in surface contact with each other; consequently, the plurality of graphene flakes 321 form a three-dimensional network for electric conduction.

This is because graphene oxide with extremely high dispersibility in a polar solvent is used for the formation of the graphene flakes 321. The dispersion medium is removed by volatilization from a suspension in which graphene oxide is uniformly dispersed, and the graphene oxide is reduced to graphene; hence, the graphene flakes 321 remaining in the positive electrode active material layer 102 partly overlap with each other and are dispersed such that surface contact is made, thereby forming an electrical conduction path. Then, graphene oxide is preferably reduced by heat treatment or with the use of a reducing agent, for example.

Unlike a conventional conductive additive in the form of particles, such as acetylene black, which makes point contact with an active material, the graphene flake 321 is capable of making low-resistance surface contact; accordingly, the electrical conduction between the positive electrode active material particles 322 and the graphene flakes 321 can be improved without an increase in the amount of a conductive additive. Thus, the proportion of the positive electrode active material particles 322 in the positive electrode active material layer 102 can be increased. Accordingly, the discharge capacity of a secondary battery can be increased.

Graphene flakes are bonded to each other to form net-like graphene (hereinafter referred to as a graphene net). The graphene net covering the active material can function as a binder for binding particles. The amount of a binder can thus be reduced, or the binder does not have to be used. This can increase the proportion of the active material in the electrode volume or weight. That is to say, the capacity of the secondary battery can be increased.

Various methods can be used for forming an electrode which is used for the secondary battery in one embodiment of the present invention. For example, in the case where an active material layer is formed over a current collector by a coating method, the active material, the binder, the conductive additive, and the dispersion medium (also referred to as solvent) are mixed to form a paste, the paste is applied to the current collector, and the dispersion medium is vaporized. After that, the active material layer may be pressed by a compression method such as a roll press method or a flat plate press method so as to be consolidated if necessary.

As the dispersion medium, water, polar organic solvent such as N-methylpyrrolidone (NMP) or dimethylformamide, or the like can be used. Water is preferably used in terms of the safety and cost.

It is preferable for the binder to include, for example, water-soluble polymers. As the water-soluble polymers, a polysaccharide or the like can be used. As the polysaccharide, a cellulose derivative such as carboxymethyl cellulose (CMC), methyl cellulose, ethyl cellulose, hydroxypropyl cellulose, diacetyl cellulose, or regenerated cellulose, starch, or the like can be used.

As the binder, a rubber material such as styrene-butadiene rubber (SBR), styrene-isoprene-styrene rubber, acrylonitrile-butadiene rubber, butadiene rubber, fluorine rubber, or ethylene-propylene-diene copolymer is preferably used. Any of these rubber materials is more preferably used in combination with the aforementioned water-soluble polymers.

Alternatively, as the binder, a material such as polystyrene, poly(methyl acrylate), poly(methyl methacrylate) (PMMA), sodium polyacrylate, polyvinyl alcohol (PVA), polyethylene oxide (PEO), polypropylene oxide, polyimide, polyvinyl chloride, polytetrafluoroethylene, polyethylene, polypropylene, isobutylene, polyethylene terephthalate, nylon, polyvinylidene fluoride (PVdF), polyacrylonitrile (PAN), polyvinyl chloride, ethylene-propylene-diene polymer, polyvinyl acetate, polymethyl methacrylate, or nitrocellulose is preferably used.

Two or more of the above materials may be used in combination for the binder.

The content of the binder in the positive electrode active material layer 102 is preferably greater than or equal to 1 wt % and less than or equal to 10 wt %, more preferably greater than or equal to 2 wt % and less than or equal to 8 wt %, and still more preferably greater than or equal to 3 wt % and less than or equal to 5 wt %. The content of the conductive additive in the positive electrode active material layer 102 is preferably greater than or equal to 1 wt % and less than or equal to 10 wt %, more preferably greater than or equal to 1 wt % and less than or equal to 5 wt %.

In the case where the positive electrode active material layer 102 is formed by a coating method, the positive electrode active material, the binder, and the conductive additive are mixed to form a positive electrode paste (slurry), and the positive electrode paste is applied to the positive electrode current collector 101 and dried.

[1.3. Negative Electrode]

The negative electrode 115 includes, for example, the negative electrode current collector 105 and the negative electrode active material layer 106 formed on the negative electrode current collector 105.

The negative electrode current collector 105 can be formed using a material that has high conductivity and is not alloyed with a carrier ion of lithium or the like, such as stainless steel, gold, platinum, iron, copper, titanium, or an alloy thereof. Alternatively, an aluminum alloy to which an element which improves heat resistance, such as silicon, titanium, neodymium, scandium, or molybdenum, is added can be used. The negative electrode current collector 105 can have a foil-like shape, a plate-like shape (sheet-like shape), a net-like shape, a punching-metal shape, an expanded-metal shape, or the like as appropriate. The negative electrode current collector 105 preferably has a thickness greater than or equal to 5 μm and less than or equal to 30 μm. The surface of the negative electrode current collector 105 may be provided with an undercoat using graphite or the like.

The negative electrode active material layer 106 may further include a binder for increasing adhesion of negative electrode active materials, a conductive additive for increasing the conductivity of the negative electrode active material layer 106, and the like in addition to the negative electrode active materials. For the materials of a binder and the conductive additive which are used for the negative electrode active material layer, refer to the materials of the binder and the conductive additive which are used for the positive electrode active material layer.

A material with which lithium can be dissolved and precipitated or a material which can reversibly react with lithium ions can be used for a negative electrode active material; for example, a lithium metal, a carbon-based material, an alloy-based material, or the like can be used.

The lithium metal is preferable because of its low redox potential (3.045 V lower than that of a standard hydrogen electrode) and high specific capacity per unit weight and per unit volume (3860 mAh/g and 2062 mAh/cm$^3$).

Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (higher than or equal to 0.1 V and lower than or equal to 0.3 V vs. Li/Li$^+$) when lithium ions are intercalated into the graphite (while a lithium-graphite intercalation compound is formed). For this reason, a lithium-ion secondary battery can have a high operating voltage. In addition, graphite is preferable because of its advantages such as relatively high capacity per unit volume, small volume expansion, low cost, and safety greater than that of a lithium metal.

As the negative electrode active material, other than the above carbon materials, an alloy-based material which enables charge-discharge reaction by alloying and dealloying reaction with carrier ions can be used. In the case where carrier ions are lithium ions, for example, a material containing at least one of Mg, Ca, Al, Si, Ge, Sn, Pb, As, Sb, Bi, Ag, Au, Zn, Cd, Hg, In, etc. can be used as the alloy-based material. Such elements have higher capacity than carbon. In particular, silicon has a significantly high theoretical capacity of 4200 mAh/g. For this reason, silicon is preferably used as the negative electrode active material. Examples of an alloy-based material including such elements are $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, $InSb$, and $SbSn$.

Alternatively, for the negative electrode active material, an oxide such as SiO, SnO, $SnO_2$, titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Note that SiO refers to the powder of a silicon oxide including a silicon-rich portion and can also be referred to as $SiO_y$ (2>y>0). Examples of SiO include a material containing one or more of $Si_2O_3$, $Si_3O_4$, and $Si_2O$ and a mixture of Si powder and silicon dioxide ($SiO_2$). Furthermore, SiO may contain another element (e.g., carbon, nitrogen, iron, aluminum, copper, titanium, calcium, and manganese). In other words, SiO refers to a colored material containing two or more of single crystal silicon, amorphous silicon, polycrystal silicon, $Si_2O_3$, $Si_3O_4$, $Si_2O$, and $SiO_2$. Thus, SiO can be distinguished from $SiO_x$ (x is 2 or more), which is clear and colorless or white. Note that in the case where a secondary battery is fabricated using SiO as a material thereof and the SiO is oxidized because of repeated charge and discharge cycles, SiO is changed into $SiO_2$ in some cases.

Still alternatively, as the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active material and thus the negative electrode active material can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used as the negative electrode active material.

For example, a transition metal oxide with which an alloying reaction with lithium is not caused, such as cobalt oxide (CoO), nickel oxide (NiO), or iron oxide (FeO), may be used for the negative electrode active material. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, or CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as a positive electrode active material because of its high potential.

In the case where the negative electrode active material layer 106 is formed by a coating method, the negative electrode active material and the binder are mixed to form a negative electrode paste (slurry), and the negative electrode paste is applied to the negative electrode current collector 105 and dried.

Graphene may be formed on a surface of the negative electrode active material layer 106. In the case of using silicon as the negative electrode active material, the volume of silicon is greatly changed due to occlusion and release of carrier ions in charge-discharge cycles. Therefore, adhesion between the negative electrode current collector 105 and the negative electrode active material layer 106 is decreased, resulting in degradation of battery characteristics caused by charge and discharge. Thus, graphene is preferably formed on a surface of the negative electrode active material layer 106 containing silicon because even when the volume of silicon is changed in charge-discharge cycles, decrease in the adhesion between the negative electrode current collector 105 and the negative electrode active material layer 106 can be inhibited, which makes it possible to reduce degradation of battery characteristics.

Alternatively, a coating film of an oxide or the like may be formed on the surface of the negative electrode active material layer 106. A coating film formed by decomposition or the like of an electrolyte solution or the like in charging cannot release electric charges used at the formation, and therefore forms irreversible capacity. In contrast, the film of an oxide or the like provided on the surface of the negative electrode active material layer 106 in advance can reduce or prevent generation of irreversible capacity.

As the coating film coating the negative electrode active material layer 106, an oxide film of any one of niobium, titanium, vanadium, tantalum, tungsten, zirconium, molybdenum, hafnium, chromium, aluminum, and silicon or an oxide film containing any one of these elements and lithium can be used. Such a film is denser than a conventional film formed on a surface of a negative electrode due to a decomposition product of an electrolyte solution.

For example, niobium oxide ($Nb_2O_5$) has a low electric conductivity of $10^{-9}$ S/cm and a high insulating property. For this reason, a niobium oxide film inhibits electrochemical decomposition reaction between the negative electrode active material and the electrolyte solution. On the other hand, niobium oxide has a lithium diffusion coefficient of $10^{-9}$ cm$^2$/sec and high lithium ion conductivity. Therefore, niobium oxide can transmit lithium ions. Alternatively, silicon oxide or aluminum oxide may be used.

A sol-gel method can be used to coat the negative electrode active material layer 106 with the coating film, for example. The sol-gel method is a method for forming a thin film in such a manner that a solution of metal alkoxide, a metal salt, or the like is changed into a gel, which has lost its fluidity, by hydrolysis reaction and polycondensation reaction and the gel is baked. Since a thin film is formed from a liquid phase in the sol-gel method, raw materials can be mixed uniformly on the molecular scale. For this reason, by adding a negative electrode active material such as graphite to a raw material of the metal oxide film which is a solvent, the active material can be easily dispersed into the gel. In such a manner, the coating film can be formed on the surface of the negative electrode active material layer 106. A decrease in the capacity of the secondary battery can be prevented by using the coating film.

[1.4. Separator]

As a material of the separator 103, a porous insulator such as cellulose, polypropylene (PP), polyethylene (PE), polybutene, nylon, polyester, polysulfone, polyacrylonitrile, polyvinylidene fluoride, or tetrafluoroethylene can be used. Alternatively, nonwoven fabric of a glass fiber or the like, or a diaphragm in which a glass fiber and a polymer fiber are mixed may be used.

[1.5. Electrolyte Solution]

As a solvent for the electrolyte solution 104 used in the secondary battery 100, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

When a gelled high-molecular material is used as the solvent for the electrolyte solution, safety against liquid leakage and the like is improved. Further, a secondary battery can be thinner and more lightweight. Typical examples of the high-molecular material that undergoes gelation include a silicone gel, an acrylic-based gel, an acrylonitrile gel, a polyethylene oxide-based gel, a polypropylene oxide-based gel, a fluorine-based polymer gel, and the like.

Alternatively, the use of one or more ionic liquids (room temperature molten salts) which are less likely to burn and volatilize as the solvent for the electrolyte solution can prevent the secondary battery from exploding or catching fire even when the secondary battery internally shorts out or the internal temperature increases due to overcharging or the like.

In the case of using lithium ions as carriers, as an electrolyte dissolved in the above-described solvent, one of lithium salts such as $LiPF_6$, $LiClO_4$, $LiAsF_6$, $LiBF_4$, $LiAlCl_4$, LiSCN, LiBr, La, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

The electrolyte solution used for the secondary battery preferably contains a small amount of dust particles and elements other than the constituent elements of the electrolyte solution (hereinafter, also simply referred to as impurities) so as to be highly purified. Specifically, the weight ratio of impurities to the electrolyte solution is less than or equal to 1%, preferably less than or equal to 0.1%, and more preferably less than or equal to 0.01%. An additive agent such as vinylene carbonate may be added to the electrolyte solution.

[1.6. Exterior Body]

There are a variety of structures of a secondary battery, and a film is used for formation of the exterior body 107 in this embodiment. Note that the film used for the exterior body 107 is a single-layer film selected from a metal film (e.g., an aluminum film, a stainless steel film, and a nickel steel film), a plastic film made of an organic material, a hybrid material film including an organic material (e.g., an organic resin or fiber) and an inorganic material (e.g., ceramic), and a carbon-containing inorganic film (e.g., a carbon film or a graphite film); or a stacked-layer film including two or more of the above films. Forming a depression or a projection on a surface of a metal film by embossing increases the surface area of the exterior body 107 exposed to outside air, achieving efficient heat dissipations.

In the case where the secondary battery 100 is changed in form by externally applying force, bending stress is externally applied to the exterior body 107 of the secondary battery 100. This might partly deform or damage the exterior body 107. Projections or depressions formed on the exterior body 107 can relieve a strain caused by stress applied to the exterior body 107. Therefore, the secondary battery 100 can have high reliability. Note that a "strain" is the scale of change in form indicating the displacement of a point of an object relative to the reference (initial) length of the object. The depression or the projection formed on the surface of the exterior body 107 can reduce the influence of a strain caused by application of external force to the secondary battery to an acceptable level. Thus, a highly reliable secondary battery can be provided.

2. Modification Example 1

Although FIGS. 1A1 to 1C illustrate the example where the second direction 202 connecting the tab portion of the positive electrode 111 and the tab portion of the negative electrode 115 is perpendicular to the first direction 201 of curving the secondary battery 100, one embodiment of the present invention is not limited thereto. The second direction can be any direction as long as it is not parallel to the first direction.

FIG. 4A1 shows an example of the secondary battery 100 which is different from that in FIGS. 1A1 to 1C. In the secondary battery 100 illustrated in FIG. 4A1, the first direction 201 is not perpendicular to the second direction 202. Even in the secondary battery 100 with such a structure, the tab of the positive electrode 111 and the tab of the negative electrode 115 can be provided in a portion relatively less affected by curving.

The description of FIGS. 1A1 to 1C can be referred to except for the position of the positive electrode lead 121, the negative electrode lead 125, the tab of the positive electrode 111, and the tab of the negative electrode 115.

3. Modification Example 2

Although FIGS. 1A1 to 1C illustrate the example of the secondary battery where each of the positive electrode 111, the negative electrode 115, the separator 103, and the exterior body 107 is substantially rectangular, one embodiment of the present invention is not limited thereto.

FIG. 4A2 shows another example of the secondary battery 100 which is different from that in FIGS. 1A1 to 1C. In the secondary battery 100 illustrated in FIG. 4A2, each of the positive electrode 111, the negative electrode 115, the separator 103, and the exterior body 107 is substantially ellip-tical. In addition, in the secondary battery 100 illustrated in FIG. 4A2, the second direction 202 connecting the tab portion of the positive electrode 111 and the tab portion of the negative electrode 115 is perpendicular to the first direction 201 of curving the secondary battery 100. Even in the secondary battery 100 with such a structure, the tab of the positive electrode 111 and the tab of the negative electrode 115 can be provided in a portion relatively less affected by curving.

The description of FIGS. 1A1 to 1C can be referred to except for the shape of the positive electrode 111, the negative electrode 115, the separator 103, and the exterior body 107.

4. Modification Example 3

FIG. 4B1 shows an example of the secondary battery 100 which is different from that in FIGS. 1A1 to 1C. FIG. 4B2 illustrates a cross-sectional view taken along dashed-dotted line B1-B2 in FIG. 4B 1.

In the secondary battery 100 illustrated in FIG. 4B1, each of the positive electrode 111, the negative electrode 115, the separator 103, and the exterior body 107 has a plurality of holes 211. Since the secondary battery 100 illustrated in FIG. 4B1 has the holes 211, the secondary battery 100 can be provided in an electronic device which needs holes, such as a band portion of a watch-type device. Thus, the capacity of the secondary battery 100 can be increased.

The description of FIGS. 1A1 to 1C can be referred to except for the shape of the positive electrode 111, the negative electrode 115, the separator 103, and the exterior body 107.

5. Modification Example 4

FIG. 5A shows an example of the secondary battery 100 which is different from that in FIGS. 1A1 to 1C. In the secondary battery 100 in FIG. 5A, the length of the positive electrode 111, the negative electrode 115, the separator 103, and the exterior body 107 in the first direction 201 of curving the secondary battery 100 is longer than the length thereof in the second direction 202 connecting the tab portion of the positive electrode 111 and the tab portion of the negative electrode 115. Even in the secondary battery 100 with such a structure, the tab of the positive electrode 111 and the tab of the negative electrode 115 can be provided in a portion relatively less affected by curving.

The description of FIGS. 1A1 to 1C can be referred to except for the shape of the positive electrode 111, the negative electrode 115, the separator 103, and the exterior body 107.

6. Modification Example 5

FIG. 5B1 shows an example of the secondary battery 100 which is different from that in FIGS. 1A1 to 1C. The positive electrode 111 and the separator 103 included in the secondary battery 100 shown in FIG. 5B1 are extracted and illustrated in FIG. 5B2. The negative electrode 115 is extracted and illustrated in FIG. 5B3. FIG. 5C illustrates a cross-sectional view taken along dashed-dotted line C1-C2 in FIG. 5B1.

In the secondary battery 100 illustrated in FIG. 5B1, the separator 103 is provided to wrap the positive electrode 111. In that case, a short circuit between the positive electrode 111 and the negative electrode 115 can be prevented even when the positive electrode 111 does not have a cutout.

The description of FIGS. 1A1 to 1C can be referred to except for the shape of the separator 103.

7. Modification Example 6

Figure 6A:
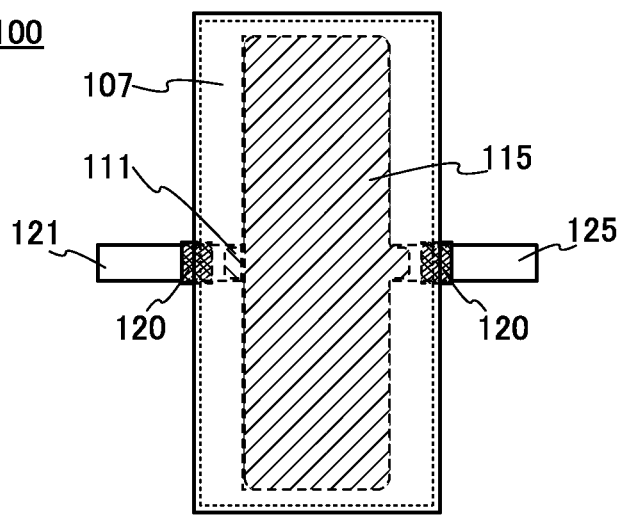
FIGS. 6A to 6C are a top view, a perspective view, and a cross-sectional view illustrating an example of a secondary battery.
Figure 6B:
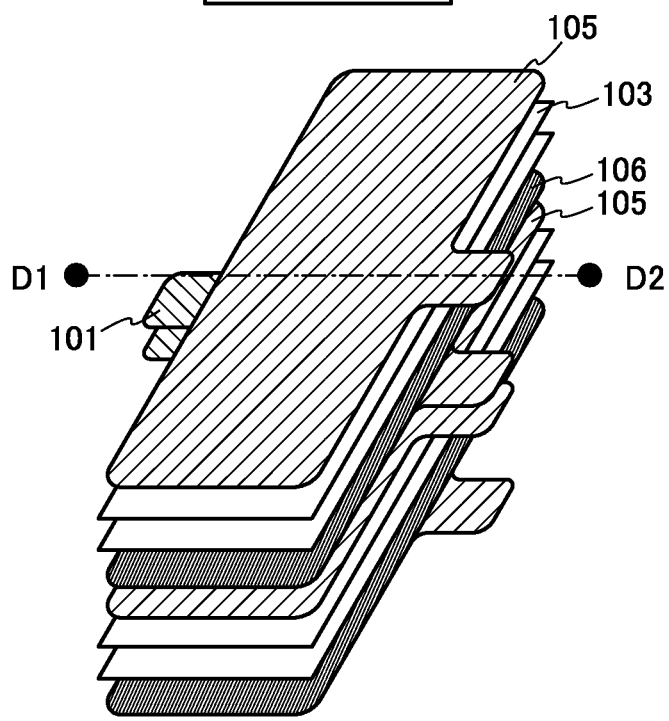
Figure 6C:
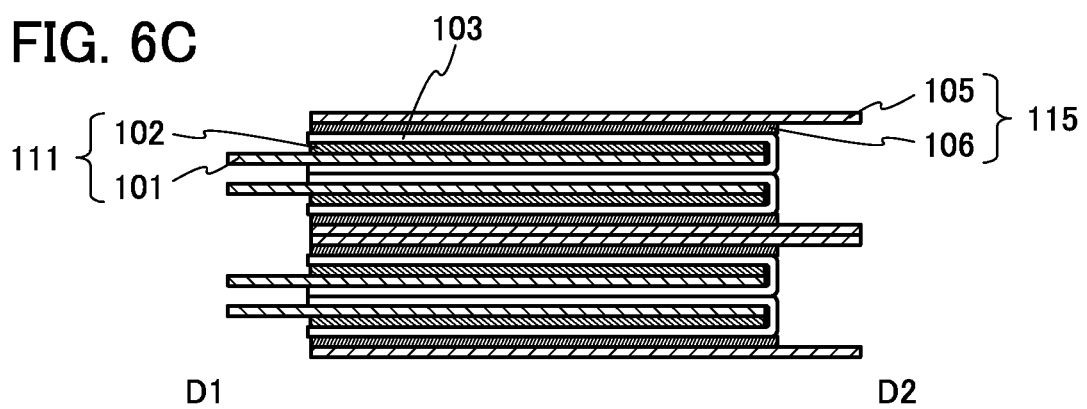

FIG. 6A shows an example of the secondary battery 100 which is different from that in FIGS. 1A1 to 1C. The secondary battery 100 illustrated in FIG. 6A includes a plurality of positive electrodes 111 and a plurality of negative electrodes 115. FIG. 6B is a perspective view showing the stacking order of the positive electrodes 111 and the negative electrodes 115 in the secondary battery 100. FIG. 6C illustrates a cross-sectional view taken along dashed-dotted line D1-D2 in FIG. 6B.

The secondary battery 100 in FIGS. 6A to 6C includes four positive electrodes 111 each including the positive electrode active material layer 102 on one surface of the positive electrode current collector 101, and four negative electrodes 115 each including the negative electrode active material layer 106 on one surface of the negative electrode current collector 105. The separators 103 are provided to wrap the positive electrodes 111.

The capacity of the secondary battery 100 can be increased by providing the plurality of positive electrodes 111 and the plurality of negative electrodes 115.

As illustrated in FIG. 6C, the positive electrodes 111 and the negative electrodes 115 are stacked so that surfaces of the positive electrodes 111 on which a positive electrode active material layer is not provided to face each other with the separators 103 interposed therebetween, and that surfaces of the negative electrodes 115 on which a negative electrode active material layer is not provided are in contact with each other.

With this stacking order, a contact surface between metals such as a contact surface between surfaces of the negative electrodes 115 on which a negative electrode active material layer is not provided can be formed. The contact surface between metals has a lower coefficient of friction than a contact surface between the active material layer and the separator.

The surfaces of the negative electrodes 115 on which a negative electrode active material layer is not provided slide on each other when the secondary battery 100 is curved, so that stress caused by the difference between the inner diameter and the outer diameter of a curved portion can be reduced. Therefore, the deterioration of the secondary battery 100 can be suppressed. In addition, the secondary battery 100 can be highly reliable.

Figure 7A:
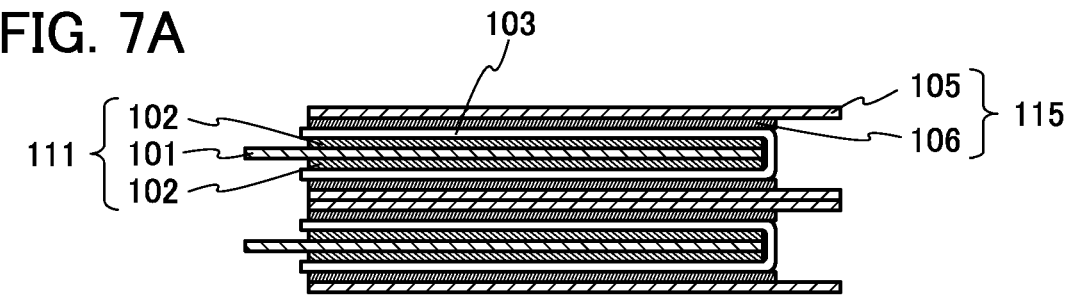
FIGS. 7A to 7C are cross-sectional views of structure examples of a secondary battery.

FIG. 7A shows an example of a stacked-layer structure of the positive electrodes 111 and the negative electrodes 115 which is different from that in FIGS. 6A to 6C. In FIG. 7A, two positive electrodes 111 each including the positive electrode active material layer 102 on both surfaces of the positive electrode current collector 101 and four negative electrodes 115 each including the negative electrode active material layer 106 on one surface of the negative electrode current collector 105 are stacked. Even in the structure in FIG. 7A, a contact surface between metals such as a contact surface between surfaces of the negative electrodes 115 on which a negative electrode active material layer is not provided can be formed.

Figure 7B:
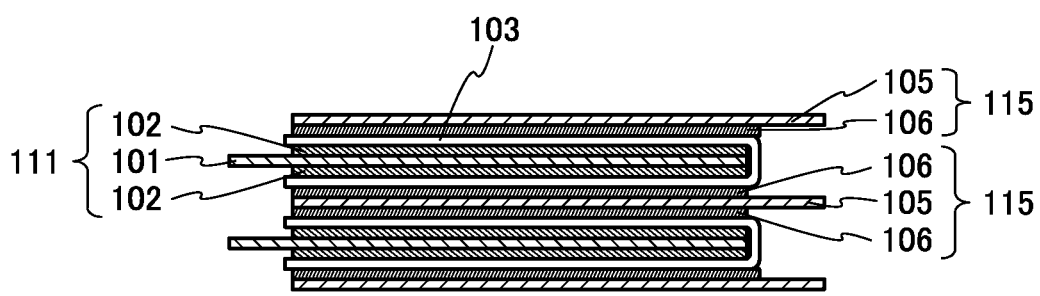

FIG. 7B shows an example of a stacked-layer structure of the positive electrodes 111 and the negative electrodes 115 which is different from that in FIGS. 6A to 6C. In FIG. 7B, two positive electrodes 111 each including the positive electrode active material layer 102 on both surfaces of the positive electrode current collector 101, two negative electrodes 115 each including the negative electrode active material layer 106 on one surface of the negative electrode current collector 105, and one negative electrode 115 including the negative electrode active material layer 106 on both surfaces of the negative electrode current collector 105 are stacked. When the active material layer is provided on the both surfaces of the current collector as illustrated in FIG. 7B, capacity of the secondary battery 100 per unit volume can be increased.

Figure 7C:
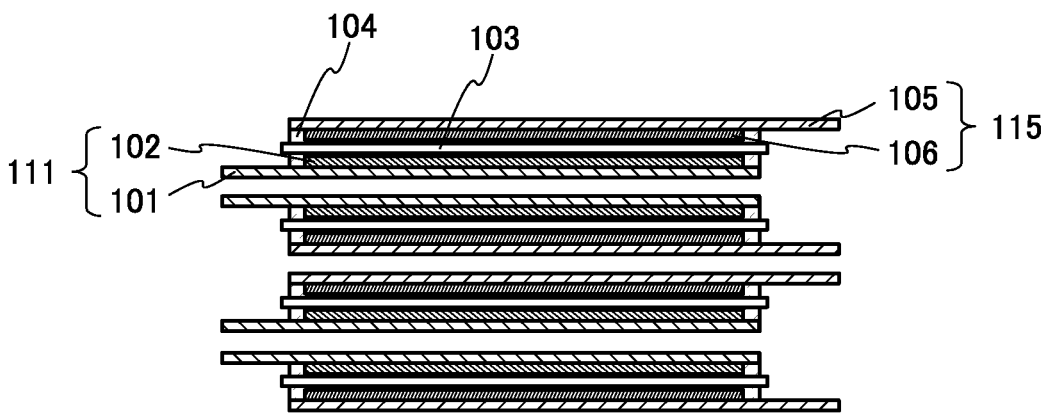

FIG. 7C shows an example of a stacked-layer structure of the positive electrodes 111 and the negative electrodes 115 which is different from that in FIGS. 6A to 6C. In FIG. 7C, the electrolyte solution 104, which is an electrolyte solution including a polymer, bonds a set of the positive electrode 111, the negative electrode 115, and the separator 103. With such a structure, the slide between the positive electrode 111 and the negative electrode 115 where a battery reaction occurs can be prevented when the secondary battery 100 is curved.

Many contact surfaces between metals, such as a contact surface between surfaces of the positive electrodes 111 on which a positive electrode active material layer is not provided and a contact surface between surfaces of the negative electrodes 115 on which a negative electrode active material layer is not provided can be obtained. These contact surfaces slide on each other when the secondary battery 100 is curved, so that stress caused by the difference between the inner diameter and the outer diameter of a curved portion can be reduced.

Therefore, the deterioration of the secondary battery 100 can be further suppressed. In addition, the secondary battery 100 can be more reliable.

As the polymer included in the electrolyte solution 104 in FIG. 7C, a polyethylene oxide-based polymer, a polyacrylonitrile-based polymer, a polyvinylidene fluoride-based polymer, a polyacrylate based polymer, or a polymethylmethacrylate-based polymer can be used. A polymer which can gel the electrolyte solution 104 at normal temperature (e.g., 25° C.) is preferably used. In this specification and the like, the term polyvinylidene fluoride-based polymer, for example, refers to a polymer including polyvinylidene fluoride (PVDF), and includes a poly(vinylidene fluoride-hexafluoropropylene) copolymer and the like.

The above polymer can be qualitatively analyzed using a Fourier transform infrared (FT-IR) spectrometer or the like. For example, the polyvinylidene fluoride-based polymer has an absorption peak showing a C—F bond in a spectrum obtained with the FT-IR spectrometer. Furthermore, the polyacrylonitrile-based polymer has an absorption peak showing a C≡N bond in a spectrum obtained by the FT-IR spectrometer.

The description of FIGS. 1A1 to 1C can be referred to except that the plurality of positive electrodes 111 and the plurality of negative electrodes 115 are stacked.

8. Modification Example 7

Figure 8A:
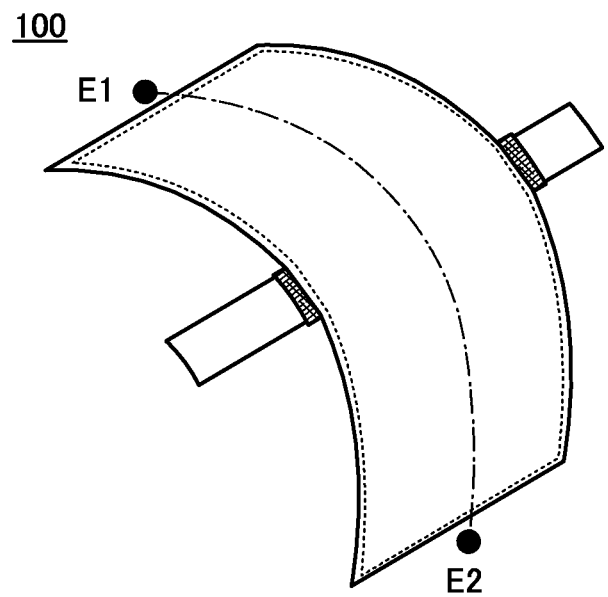
FIGS. 8A to 8C are a perspective view and cross-sectional views illustrating a structure example of a secondary battery.
Figure 8B:
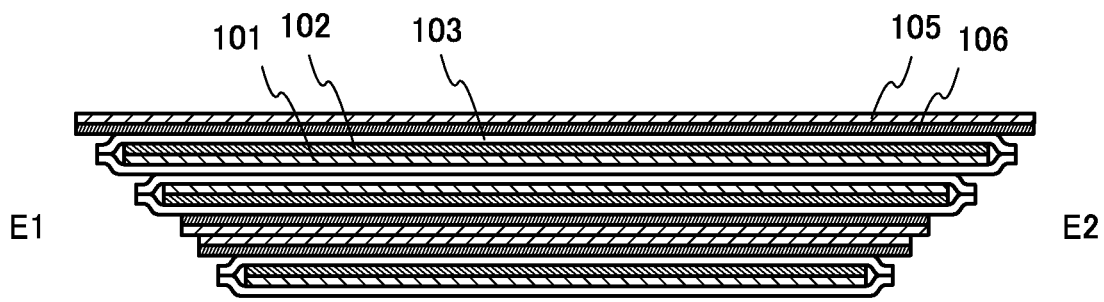
Figure 8C:
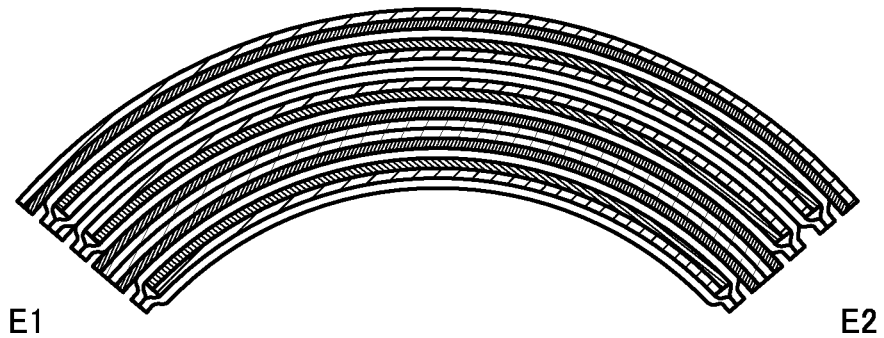

FIGS. 8A to 8C illustrate an example of the secondary battery 100 including the positive electrode 111 and the negative electrode 115 whose lengths are different from those in FIGS. 6A to 6C. FIG. 8A shows an external view of the secondary battery 100 which is curved. FIGS. 8B and 8C show cross-sectional views taken along dashed-dotted line E1-E2 in FIG. 8A. FIG. 8B is a cross-sectional view of the secondary battery 100 in a flat state. FIG. 8C is a cross-sectional view of the secondary battery 100 that is curved.

Note that in FIGS. 8B and 8C, the positive electrode 111, the negative electrode 115, and the separator 103 are extracted and illustrated.

In the positive electrodes 111 and the negative electrodes 115 in the secondary battery 100 illustrated in FIGS. 8A to 8C, the length of an electrode on the inner diameter side of the curved secondary battery 100 in the direction of curving is shorter than the length of an electrode on the outer diameter side of the curved secondary battery 100 in the direction of curving as illustrated in FIG. 8B.

With such a structure, end portions of the positive electrode 111 and those of the negative electrode 115 are aligned as illustrated in FIG. 8C when the secondary battery 100 is curved with a desired curvature. That is, the entire region of the positive electrode active material layer 102 included in the positive electrode 111 can face the negative electrode active material layer 106 included in the negative electrode 115. Thus, positive electrode active materials included in the positive electrode 111 can efficiently contribute to a battery reaction. Therefore, the capacity of the secondary battery 100 per volume can be increased. Such a structure is particularly effective in a case where the curvature of the secondary battery 100 is fixed in curving the secondary battery 100.

The description of FIGS. 1A1 to 1C can be referred to except that the plurality of positive electrodes 111 and the plurality of negative electrodes 115 are stacked.

In Embodiment 1, one embodiment of the present invention has been described. Other embodiments of the present invention are described in Embodiments 2 to 6. Note that one embodiment of the present invention is not limited to the above examples. For example, although the example where the positive electrode lead and the negative electrode lead are drawn from opposite sides of the exterior body is shown, one embodiment of the present invention is not limited thereto. Depending on circumstances or conditions, the positive electrode lead and the negative electrode lead may be drawn from the same side or adjacent sides of the exterior body in one embodiment of the present invention. For another example, the example in which the secondary battery is curved is shown, one embodiment of the present invention is not limited thereto. Depending on circumstances or conditions, in one embodiment of the present invention, secondary battery may be transformed by curving, straightening, or the like as needed, or may be kept in some shape. Alternatively, for example, depending on circumstances or conditions, secondary battery is not necessarily curved in one embodiment of the present invention. The example in which one embodiment of the present invention is applied to a lithium-ion secondary battery is described; however, one embodiment of the present invention is not limited thereto. Depending on circumstances or conditions, one embodiment of the present invention may be applied to a variety of secondary batteries such as a lead storage battery, a lithium-ion polymer secondary battery, a nickel-hydrogen storage battery, a nickel-cadmium storage battery, a nickel-iron storage battery, and a nickel-zinc storage battery, and a silver oxide-zinc storage battery, a solid-state battery, an air battery, a primary battery, a capacitor, an electric double layer capacitor, a lithium ion capacitor, and the like. Alternatively, for example, depending on circumstances or conditions, one embodiment of the present invention is not necessarily applied to a lithium-ion secondary battery.

Moreover, a secondary battery having a combination of features of the typical example and the modification examples shown in this embodiment may be employed.

Embodiment 2

In this embodiment, as an example of a manufacturing method of the secondary battery in one embodiment of the present invention, a manufacturing method of the secondary battery 100 illustrated in FIGS. 6A to 6C is described with reference to FIGS. 9A to 9B2, FIGS. 10A and 10B, FIGS. 11A and 11B, and FIGS. 12A and 12B.

[1. Prepare Negative Electrode]

First, a negative electrode active material layer 106 is formed over the negative electrode current collector 105. The negative electrode active material layer 106 and the negative electrode current collector 105 are processed into a shape of the negative electrode 115 (FIG. 9A).

[2. Prepare Positive Electrode and Wrap it with Separator]

Next, the positive electrode active material layer 102 is formed over the positive electrode current collector 101. The positive electrode active material layer 102 and the positive electrode current collector 101 are processed into a shape of the positive electrode 111. Then, the positive electrode 111 is interposed between surfaces of the folded separator 103 (FIG. 9B1).

Then, the outer edges of the separator 103 outside the positive electrode 111 are bonded to form the bag-like separator 103 (FIG. 9B2). The bonding of the outer edges of the separator 103 can be performed with the use of an adhesive or the like, by ultrasonic welding, or by thermal fusion bonding.

In this embodiment, polypropylene is used as the separator 103, and the outer edges of the separator 103 are bonded to each other by heating. A bonding portion 103a is shown in FIG. 9B2. In this manner, the positive electrode 111 can be wrapped with the separator 103. The separator 103 is formed so as to wrap the positive electrode active material layer 102 and does not necessarily wrap the whole positive electrode 111.

Note that although the separator 103 is folded in FIGS. 9A to 9B2, one embodiment of the present invention is not limited thereto. For example, the positive electrode 111 may be interposed between two separators. In that case, the bonding portion 103a may be formed to surround almost all of four sides of the separators.

The outer edges of the separator 103 may be bonded, using dashed line-like or dot-like bonding portions provided at regular intervals.

Alternatively, bonding may be performed on only one side of the outer edges. Alternatively, bonding may be performed on only two sides of the outer edges. Alternatively, bonding may be performed on four sides of the outer edges, in which case the four sides can be in an even state.

Note that although the case where the positive electrode 111 is wrapped with the separator 103 is shown in FIGS. 6A to 6C and FIGS. 9A to 9B2, one embodiment of the present invention is not limited thereto. For example, the positive electrode 111 is not necessarily wrapped with the separator 103; instead of the positive electrode 111, the negative electrode 115 may be wrapped with the separator 103.

[3. Stack Positive Electrode and Negative Electrode]

Figure 10A:
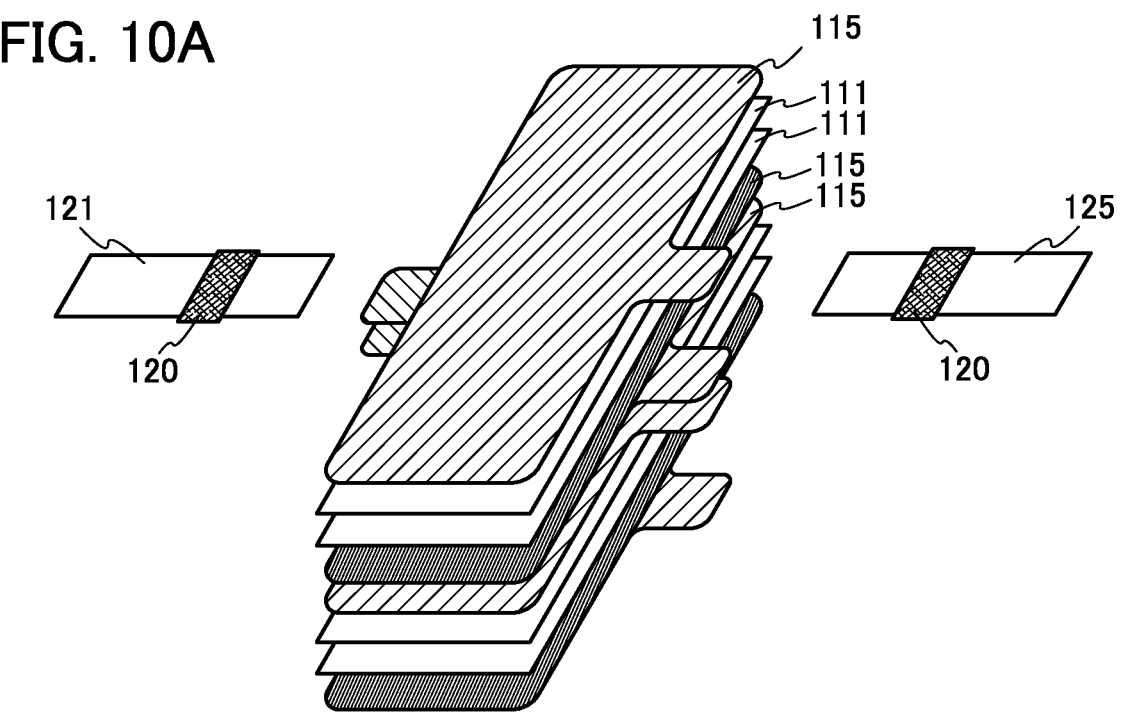
FIGS. 10A and 10B illustrate a method of manufacturing a secondary battery.

Next, the positive electrodes 111 and the negative electrodes 115 are stacked (FIG. 10A). In this embodiment, four positive electrodes 111 each having the positive electrode active material layer 102 on one surface and four negative electrodes 115 each having the negative electrode active material layer 106 on one surface are stacked. The positive electrodes 111 and the negative electrodes 115 are positioned so that the positive electrode active material layer 102 and the negative electrode active material layer 106 are arranged to face each other with the separator 103 provided therebetween. Furthermore, the negative electrodes 115 are positioned so that the surfaces having no negative electrode active material layers are in contact with each other.

[4. Connect Positive Electrode Lead and Negative Electrode Lead]

Next, the positive electrode lead 121 including a sealing layer 120 is electrically connected to positive electrode tabs of the plurality of positive electrode current collectors 101 by ultrasonic wave irradiation while pressure is applied (ultrasonic welding).

The lead electrode is likely to be cracked or cut by stress due to external force applied after manufacture of the secondary battery 100. Here, when subjected to ultrasonic welding, the positive electrode lead 121 and the positive electrode tab may be placed between bonding dies provided with projections, whereby a connection region and a bent portion can be preferably formed in the positive electrode tab. This bent portion can relieve stress due to external force applied after fabrication of the secondary battery 100. Therefore, the secondary battery 100 can have high reliability.

The bent portion is not necessarily formed in the positive electrode tab. The positive electrode current collector may be formed using a high-strength material such as stainless steel to a thickness of 10 μm or less, in order to easily relieve stress due to external force applied after fabrication of a secondary battery.

It is needless to say that two or more of the above examples may be combined to relieve concentration of stress in the positive electrode tab.

Figure 10B:
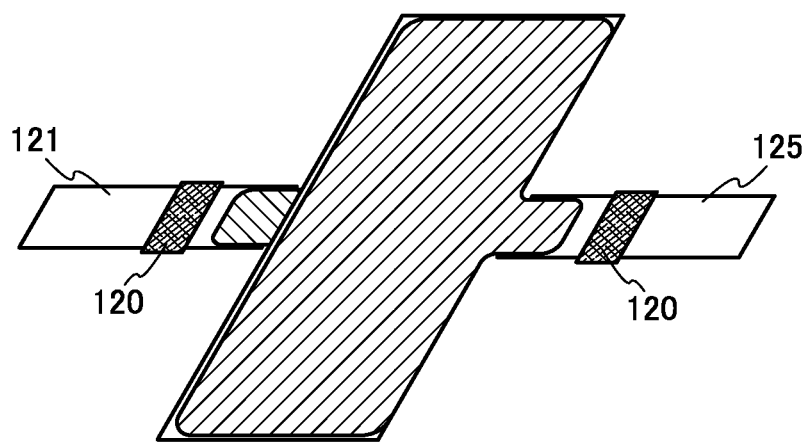

Then, in a manner similar to that of the positive electrode current collector 101, the negative electrode lead 125 including the sealing layer 120 is electrically connected to a plurality of negative electrode tabs of the negative electrode current collectors 105 by ultrasonic welding (FIG. 10B).

[5. Wrap Positive Electrode and Negative Electrode with Exterior Body]

Figure 11A:
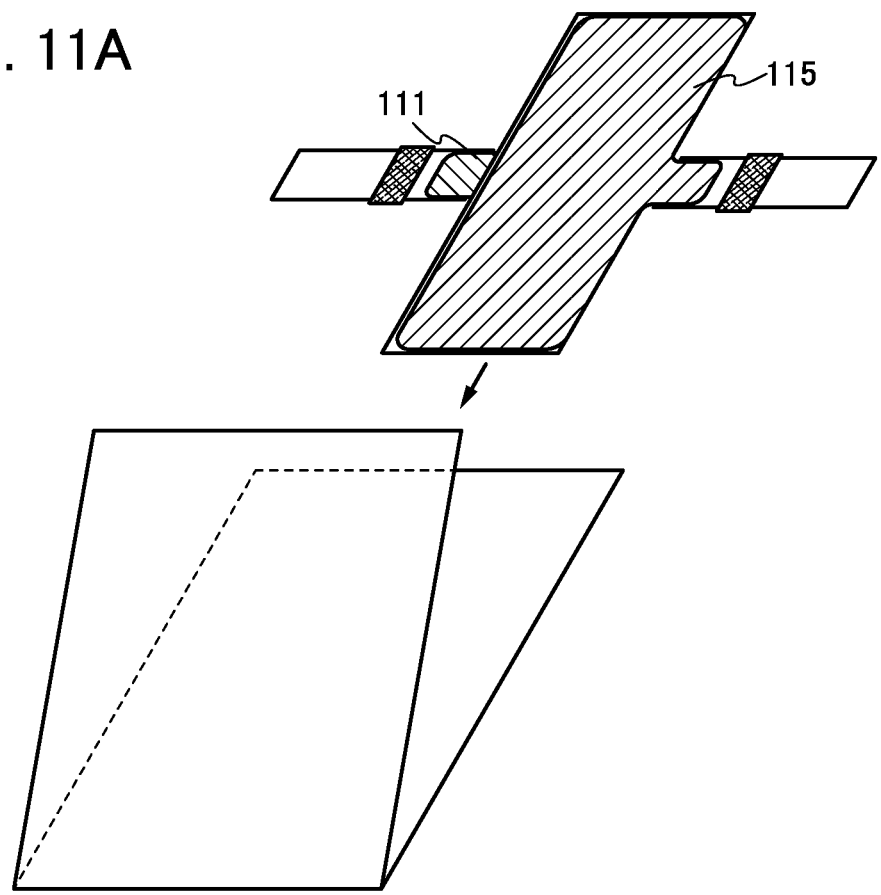
FIGS. 11A and 11B illustrate a method of manufacturing a secondary battery.

Next, a film used as an exterior body is folded, and the positive electrode 111 and the negative electrode 115 are interposed between surfaces of the folded film (FIG. 11A).

Figure 11B:
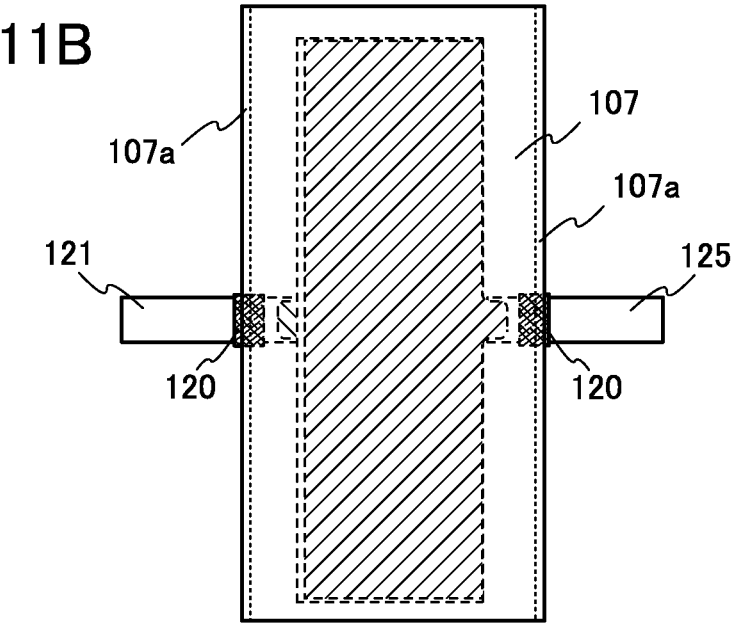

Next, thermocompression bonding is performed on two sides of the folded film, and the positive electrode 111 and the negative electrode 115 are wrapped with the exterior body 107 (see FIG. 11B). Portions where the two sides of the exterior body 107 are bonded by thermocompression are shown as bonding portions 107a in FIG. 11B. The bonding portions 107a overlap with the sealing layers 120 included in the positive electrode lead 121 and the negative electrode lead 125.

[5. Inject Electrolyte Solution and Seal]

Figure 12A:
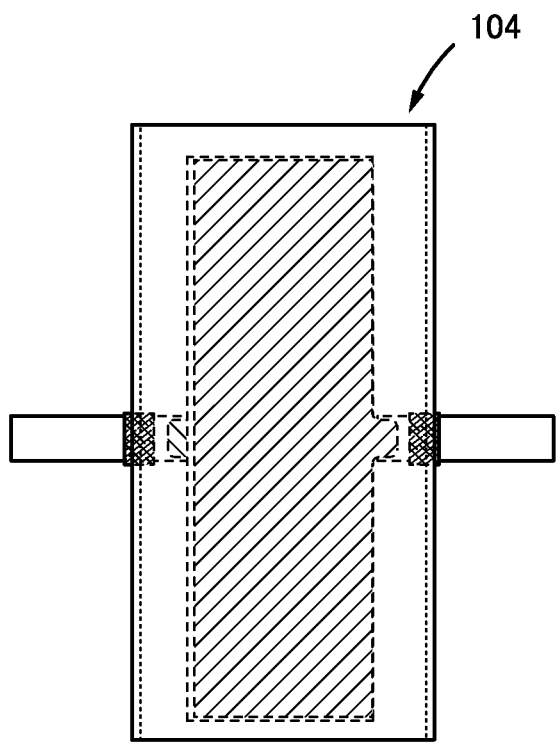
FIGS. 12A and 12B illustrate a method of manufacturing a secondary battery.

Next, the electrolyte solution 104 is injected from an unsealed side of the exterior body 107 (FIG. 12A). Then, the remaining open side of the exterior body 107 is sealed under vacuum, heat, and pressure. This treatment is performed in an environment from which oxygen is eliminated, for example, in a glove box. The evacuation to a vacuum may be performed with a vacuum sealer, a liquid pouring sealer, or the like. Heating and pressing can be performed by setting the exterior body 107 between two heatable bars included in the sealer. An example of the conditions is as follows: the degree of vacuum is 60 kPa, the heating temperature is 190° C., the pressure is 0.1 MPa, and the time is 3 seconds. Here, pressure may be applied to the positive electrode and the negative electrode through the exterior body 107. The application of pressure enables removal of bubbles which enter between the positive electrode and the negative electrode when the electrolyte solution is injected.

Figure 12B:
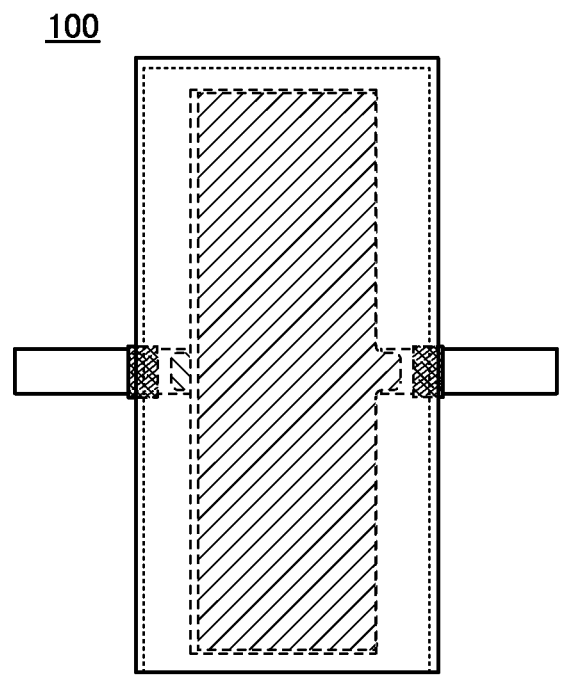

Through the above-described process, the secondary battery 100 can be fabricated (FIG. 12B).

This embodiment can be implemented in appropriate combination with any of the other embodiments and example.

Embodiment 3

A battery management unit (BMU) which can be combined with the secondary battery including the negative electrode described in the above embodiment and a transistor suitable for a circuit included in the battery management unit are described with reference to FIG. 13, FIGS. 14A to 14C, FIG. 15, FIG. 16, FIGS. 17A to 17C, FIG. 18, and FIG. 19. In this embodiment, a battery management unit of a power storage device including battery cells that are connected in series is particularly described.

When a plurality of battery cells connected in series are charged and discharged repeatedly, each battery cell has different capacity (output voltage) from one another due to the variation in charge and discharge characteristics among the battery cells. A discharge capacity of all of the battery cells connected in series depends on a battery cell with small capacity. The variation in capacities among the battery cells reduces the capacity of the all the battery cells at the time of discharging. Charging based on a battery cell with small capacity may cause insufficient charging. Charging based on a battery cell with high capacity may cause overcharge.

Thus, the battery management unit of the power storage device including battery cells connected in series has a function of reducing variation in capacities among the battery cells which causes insufficient charging or overcharge. Although circuit structures for reducing variation in capacities among the battery cells include a resistive type, a capacitor type, and an inductor type, here, a circuit structure which can reduce variation in capacities among the battery cells using transistors with a low off-state current is explained as an example.

A transistor including an oxide semiconductor in its channel formation region (an OS transistor) is preferably used as the transistor with a low off-state current. When an OS transistor with a low off-state current is used in the circuit of the battery management unit of the power storage device, the amount of electric charge leaking from a battery can be reduced, and reduction in capacity with the lapse of time can be suppressed.

As the oxide semiconductor used in the channel formation region, an In-M-Zn oxide (M is Ga, Sn, Y, Zr, La, Ce, or Nd) is used. In the case where the atomic ratio of the metal elements of a target for forming an oxide semiconductor film is In:M:Zn=$x_1$:$y_1$:$z_1$, $x_1/y_1$ is preferably greater than or equal to ⅓ and less than or equal to 6, further preferably greater than or equal to 1 and less than or equal to 6, and $z_1/y_1$ is preferably greater than or equal to ⅓ and less than or equal to 6, further preferably greater than or equal to 1 and less than or equal to 6. Note that when $z_1/y_1$ is greater than or equal to 1 and less than or equal to 6, a CAAC-OS film as the oxide semiconductor film is easily formed.

Here, the details of the CAAC-OS film are described.

The CAAC-OS film is one of oxide semiconductor films having a plurality of c-axis aligned crystal parts.

In a combined analysis image (also referred to as a high-resolution TEM image) of a bright-field image and a diffraction pattern of a CAAC-OS film, which is obtained using a transmission electron microscope (TEM), a plurality of crystal parts can be observed. However, in the high-resolution TEM image, a boundary between crystal parts, that is, a grain boundary is not clearly observed. Thus, in the CAAC-OS film, a reduction in electron mobility due to the grain boundary is less likely to occur.

According to the high-resolution cross-sectional TEM image of the CAAC-OS film observed in a direction substantially parallel to a sample surface, metal atoms are arranged in a layered manner in the crystal parts. Each metal atom layer has a morphology reflecting unevenness of a surface over which the CAAC-OS film is formed (hereinafter, a surface over which the CAAC-OS film is formed is referred to as a formation surface) or of a top surface of the CAAC-OS film, and is arranged parallel to the formation surface or the top surface of the CAAC-OS film.

On the other hand, according to the high-resolution planar TEM image of a plane of the CAAC-OS film observed in a direction substantially perpendicular to the sample surface, metal atoms are arranged in a triangular or hexagonal configuration in the crystal parts. However, there is no regularity of arrangement of metal atoms between different crystal parts.

A CAAC-OS film is subjected to structural analysis with an X-ray diffraction (XRD) apparatus. For example, when the CAAC-OS film including an $InGaZnO_4$ crystal is analyzed by an out-of-plane method, a peak appears frequently when the diffraction angle ($2\theta$) is around $31°$. This peak is derived from the (009) plane of the $InGaZnO_4$ crystal, which indicates that crystals in the CAAC-OS film have c-axis alignment, and that the c-axes are aligned in a direction substantially perpendicular to the formation surface or the top surface of the CAAC-OS film.

Note that when the CAAC-OS film with an $InGaZnO_4$ crystal is analyzed by an out-of-plane method, a peak of $2\theta$ may also be observed at around $36°$, in addition to the peak of $2\theta$ at around $31°$. The peak of $2\theta$ at around $36°$ indicates that a crystal having no c-axis alignment is included in part of the CAAC-OS film. It is preferable that in the CAAC-OS film, a peak of $2\theta$ appear at around $31°$ and a peak of $2\theta$ not appear at around $36°$.

The CAAC-OS film is an oxide semiconductor film having low impurity concentration. The impurity is an element other than the main components of the oxide semiconductor film, such as hydrogen, carbon, silicon, or a transition metal element. In particular, an element that has higher bonding strength to oxygen than a metal element included in the oxide semiconductor film, such as silicon, disturbs the atomic arrangement of the oxide semiconductor film by depriving the oxide semiconductor film of oxygen and causes a decrease in crystallinity. Further, a heavy metal such as iron or nickel, argon, carbon dioxide, or the like has a large atomic radius (molecular radius), and thus disturbs the atomic arrangement of the oxide semiconductor film and causes a decrease in crystallinity when it is contained in the oxide semiconductor film. Note that the impurity contained in the oxide semiconductor film might serve as a carrier trap or a carrier generation source.

The CAAC-OS film is an oxide semiconductor film having a low density of defect states. In some cases, oxygen vacancies in the oxide semiconductor film serve as carrier traps or serve as carrier generation sources when hydrogen is captured therein.

The state in which impurity concentration is low and density of defect states is low (the number of oxygen vacancies is small) is referred to as a "highly purified intrinsic" or "substantially highly purified intrinsic" state. A highly purified intrinsic or substantially highly purified intrinsic oxide semiconductor film has few carrier generation sources, and thus can have a low carrier density. Thus, a transistor including the oxide semiconductor film rarely has negative threshold voltage (is rarely normally on). The highly purified intrinsic or substantially highly purified intrinsic oxide semiconductor film has few carrier traps. Accordingly, the transistor including the oxide semiconductor film has little variation in electrical characteristics and high reliability. Electric charge trapped by the carrier traps in the oxide semiconductor film takes a long time to be released, and might behave like fixed electric charge. Thus, the transistor which includes the oxide semiconductor film having high impurity concentration and a high density of defect states has unstable electrical characteristics in some cases.

With the use of the CAAC-OS film in a transistor, variation in the electrical characteristics of the transistor due to irradiation with visible light or ultraviolet light is small.

Since the OS transistor has a wider band gap than a transistor including silicon in its channel formation region (a Si transistor), dielectric breakdown is unlikely to occur when a high voltage is applied. Although a voltage of several hundreds of volts is generated when battery cells are connected in series, the above described OS transistor is suitable for a circuit of a battery management unit which is used for such battery cells in the power storage device for the above reason.

FIG. 13 is an example of a block diagram of the power storage device. A power storage device BT00 illustrated in FIG. 13 includes a terminal pair BT01, a terminal pair BT02, a switching control circuit BT03, a switching circuit BT04, a switching circuit BT05, a voltage transformation control circuit BT06, a voltage transformer circuit BT07, and a battery portion BT08 including a plurality of battery cells BT09 connected in series.

In the power storage device BT00 illustrated in FIG. 13, a portion including the terminal pair BT01, the terminal pair BT02, the switching control circuit BT03, the switching circuit BT04, the switching circuit BT05, the voltage transformation control circuit BT06, and the voltage transformer circuit BT07 can be referred to as a battery management unit.

The switching control circuit BT03 controls operations of the switching circuits BT04 and BT05. Specifically, the switching control circuit BT03 selects battery cells to be discharged (a discharge battery cell group) and battery cells to be charged (a charge battery cell group) in accordance with voltage measured for every battery cell BT09.

Furthermore, the switching control circuit BT03 outputs a control signal S1 and a control signal S2 on the basis of the selected discharge battery cell group and the selected charge battery cell group. The control signal S1 is output to the switching circuit BT04. The control signal S1 controls the switching circuit BT04 so that the terminal pair BT01 and the discharge battery cell group are connected. In addition, the control signal S2 is output to the switching circuit BT05. The control signal S2 controls the switching circuit BT05 so that the terminal pair BT02 and the charge battery cell group are connected.

The switching control circuit BT03 generates the control signal S1 and the control signal S2 on the basis of connection relation of the switching circuit BT04, the switching circuit BT05, and the voltage transformer circuit BT07 so that terminals having the same polarity of the terminal pair BT01 and the discharge battery cell group are connected with each other, or terminals having the same polarity of the terminal pair BT02 and the charge battery cell group are connected with each other.

An operation of the switching control circuit BT03 is described in detail.

First, the switching control circuit BT03 measures the voltage of each of the plurality of battery cells BT09. Then, the switching control circuit BT03 determines that the battery cell BT09 having a voltage higher than a predetermined threshold value is a high-voltage battery cell (high-voltage cell) and that a battery cell BT09 having a voltage lower than the predetermined threshold value is a low-voltage battery cell (low-voltage cell), for example.

As a method to determine whether a battery cell is a high-voltage cell or a low-voltage cell, any of various methods can be employed. For example, the switching control circuit BT03 may determine whether each battery cell BT09 is a high-voltage cell or a low-voltage cell on the basis of the voltage of a battery cell BT09 having the highest voltage or the lowest voltage among the plurality of battery cells BT09. In this case, the switching control circuit BT03 can determine whether each battery cell BT09 is a high-voltage cell or a low-voltage cell by determining whether or not a ratio of a voltage of each battery cell BT09 to the reference voltage is the predetermined value or more. Then, the switching control circuit BT03 determines a charge battery cell group and a discharge battery cell group on the basis of the determination result.

Note that high-voltage cells and low-voltage cells are mixed in various states in the plurality of battery cells BT09. For example, the switching control circuit BT03 selects a portion having the largest number of high-voltage cells connected in series as the discharge battery cell group of mixed high-voltage cells and low-voltage cells. Furthermore, the switching control circuit BT03 selects a portion having the largest number of low-voltage cells connected in series as the charge battery cell group. In addition, the switching control circuit BT03 may preferentially select battery cells BT09 which are near overcharge or overdischarge as the discharge battery cell group or the charge battery cell group.

Figure 14A:
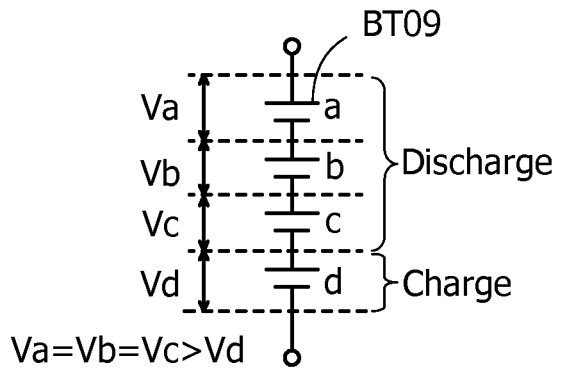
FIGS. 14A to 14C are conceptual diagrams illustrating a battery management unit of a power storage device.
Figure 14B:
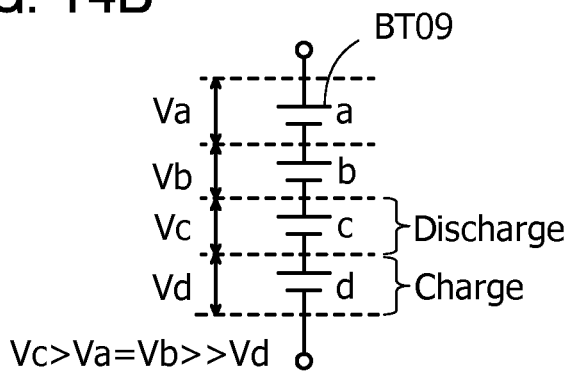
Figure 14C:
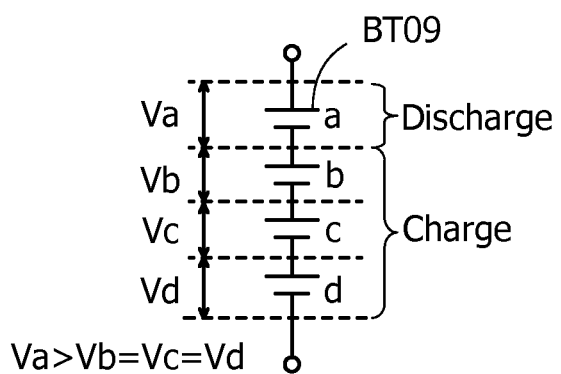

Here, operation examples of the switching control circuit BT03 in this embodiment are described with reference to FIGS. 14A to 14C. FIGS. 14A to 14C illustrate operation examples of the switching control circuit BT03. Note that FIGS. 14A to 14C each illustrate the case where four battery cells BT09 are connected in series as an example for convenience of explanation.

FIG. 14A shows the case where the relation of voltages Va, Vb, Vc, and Vd is Va=Vb=Vc>Vd where the voltages Va, Vb, Vc, and Vd are voltages of a battery cell a, a battery cell b, a battery cell c, and a battery cell d, respectively. That is, a series of three high-voltage cells a to c and one low-voltage cell d are connected in series. In that case, the switching control circuit BT03 selects the series of three high-voltage cells a to c as the discharge battery cell group. In addition, the switching control circuit BT03 selects the low-voltage cell d as the charge battery cell group.

Next, FIG. 14B shows the case where the relation of the voltages is Vc>Va=Vb>>Vd. That is, a series of two low-voltage cells a and b, one high-voltage cell c, and one low-voltage cell d which is close to overdischarge are connected in series. In that case, the switching control circuit BT03 selects the high-voltage cell c as the discharge battery cell group. Since the low-voltage cell d is close to overdischarge, the switching control circuit BT03 preferentially selects the low-voltage cell d as the charge battery cell group instead of the series of two low-voltage cells a and b.

Lastly, FIG. 14C shows the case where the relation of the voltages is Va>Vb=Vc=Vd. That is, one high-voltage cell a and a series of three low-voltage cells b to d are connected in series. In that case, the switching control circuit BT03 selects the high-voltage cell a as the discharge battery cell group. In addition, the switching control circuit BT03 selects the series of three low-voltage cells b to d as the charge battery cell group.

On the basis of the determination result shown in the examples of FIGS. 14A to 14C, the switching control circuit BT03 outputs the control signal S1 and the control signal S2 to the switching circuit BT04 and the switching circuit BT05, respectively. Information showing the discharge battery cell group being the connection destination of the switching circuit BT04 is set in the control signal S1. Information showing the charge battery cell group being a connection destination of the switching circuit BT05 is set in the control signal S2.

The above is the detailed description of the operation of the switching control circuit BT03.

The switching circuit BT04 sets the discharge battery cell group selected by the switching control circuit BT03 as the connection destination of the terminal pair BT01 in response to the control signal S1 output from the switching control circuit BT03.

The terminal pair BT01 includes a pair of terminals A1 and A2. The switching circuit BT04 sets the connection destination of the terminal pair BT01 by connecting one of the pair of terminals A1 and A2 to a positive electrode terminal of a battery cell BT09 positioned on the most upstream side (on the high potential side) of the discharge battery cell group, and the other to a negative electrode terminal of a battery cell BT09 positioned on the most downstream side (on the low potential side) of the discharge battery cell group. Note that the switching circuit BT04 can recognize the position of the discharge battery cell group on the basis of the information set in the control signal S1.

The switching circuit BT05 sets the charge battery cell group selected by the switching control circuit BT03 as the connection destination of the terminal pair BT02 in response to the control signal S2 output from the switching control circuit BT03.

The terminal pair BT02 includes a pair of terminals B1 and B2. The switching circuit BT05 sets the connection destination of the terminal pair BT02 by connecting one of the pair of terminals B1 and B2 to a positive electrode terminal of a battery cell BT09 positioned on the most upstream side (on the high potential side) of the charge battery cell group, and the other to a negative electrode terminal of a battery cell BT09 positioned on the most downstream side (on the low potential side) of the charge battery cell group. Note that the switching circuit BT05 can recognize the position of the charge battery cell group on the basis of the information set in the control signal S2.

Figure 15:
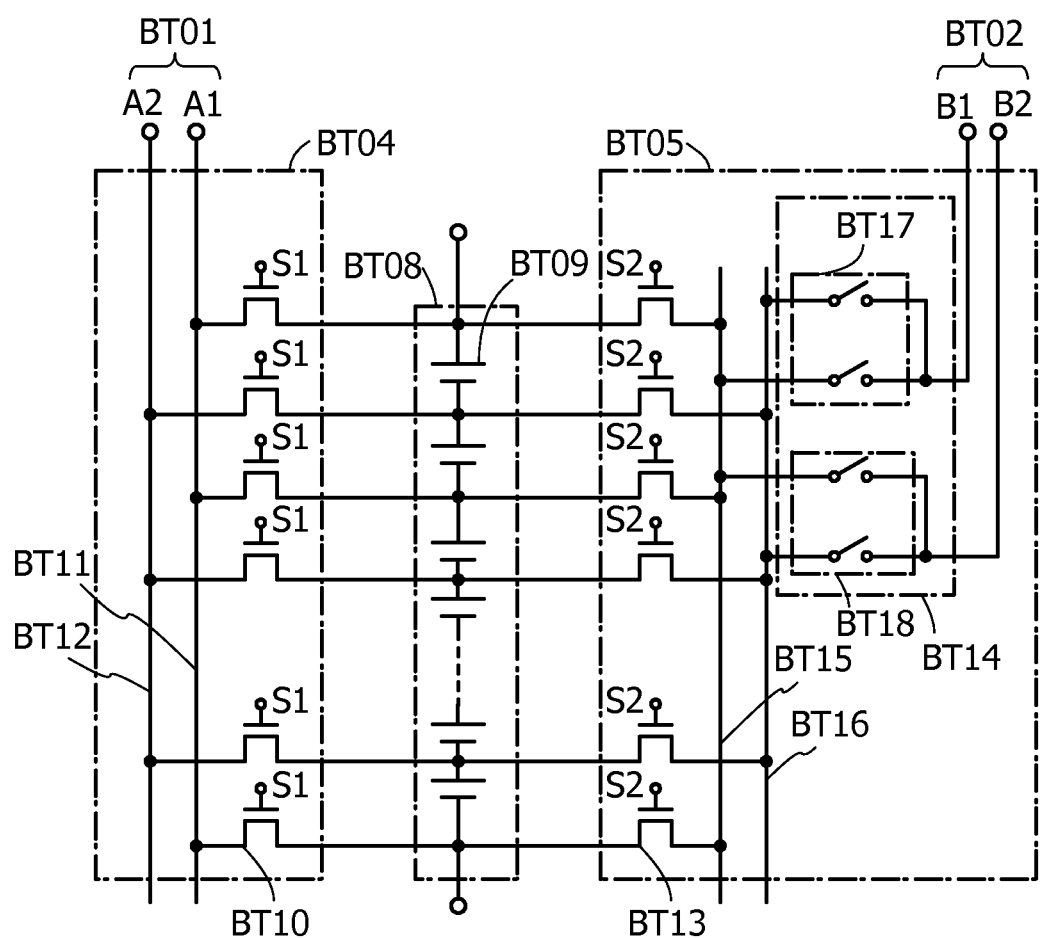
FIG. 15 is a circuit diagram illustrating a battery management unit of a power storage device.
Figure 16:
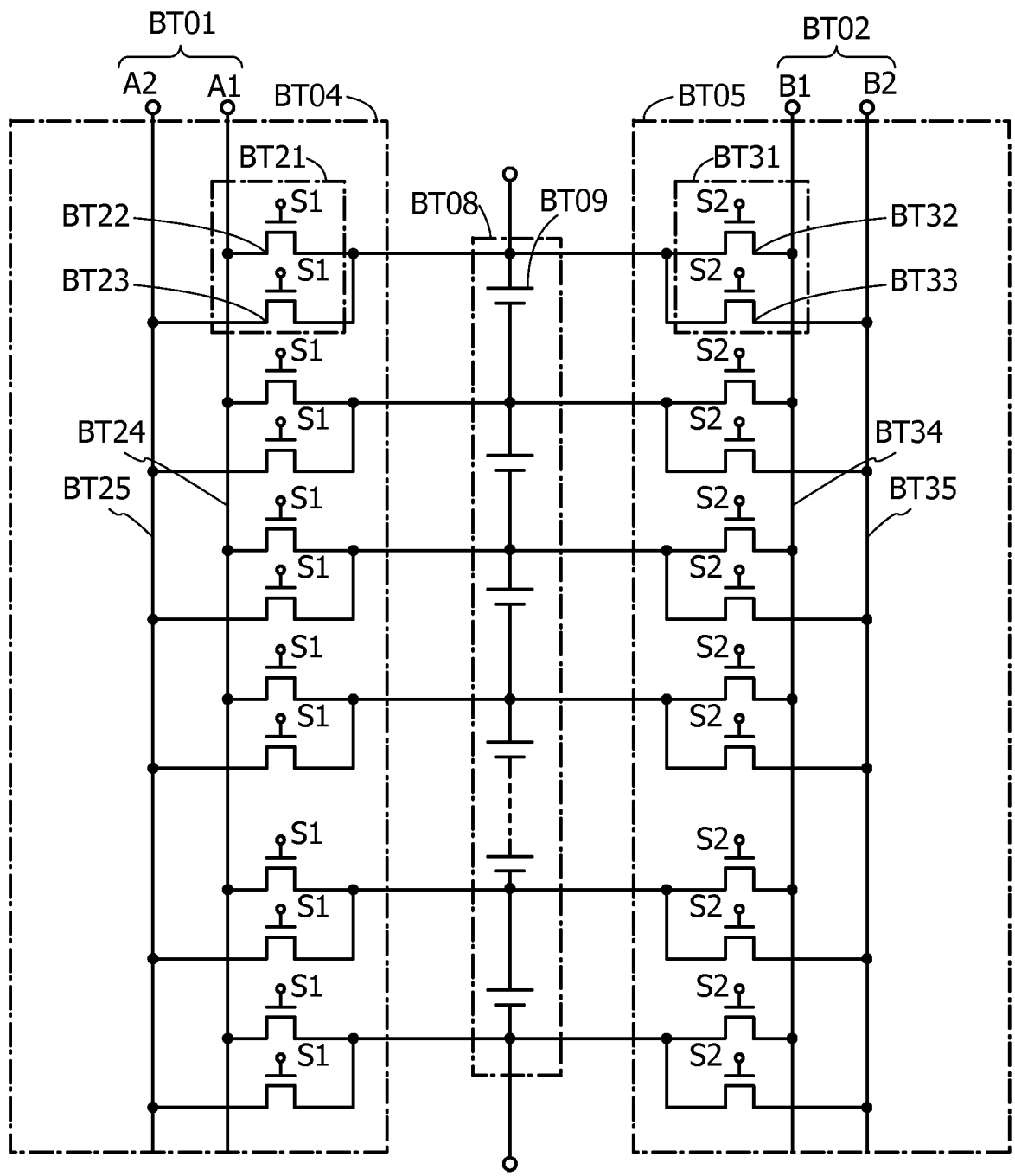
FIG. 16 is a circuit diagram illustrating a battery management unit of a power storage device.

FIG. 15 and FIG. 16 are circuit diagrams showing configuration example of the switching circuits BT04 and BT05.

In FIG. 15, the switching circuit BT04 includes a plurality of the transistors BT10, a bus BT11, and a bus BT12. The bus BT11 is connected to the terminal A1. The bus BT12 is connected to the terminal A2. Sources or drains of the plurality of transistors BT10 are connected alternately to the bus BT11 and the bus BT12. Sources or drains which are not connected to the bus BT11 and the bus BT12 of the plurality of the transistors BT10 are each connected between two adjacent battery cells BT09.

A source or a drain of the transistor BT10 which is not connected to the bus BT11 on the most upstream side of the plurality of transistors BT10 is connected to a positive electrode terminal of a battery cell BT09 on the most upstream side of the battery portion BT08. A source or a drain of a transistor BT10 which is not connected to the bus BT11 of the transistor BT10 on the most downstream side of the plurality of transistors BT10 is connected to a negative electrode terminal of a battery cell BT09 on the most downstream side of the battery portion BT08.

The switching circuit BT04 connects the discharge battery cell group to the terminal pair BT01 by bringing one of the plurality of transistors BT10 which are connected to the bus BT11 and one of the plurality of transistors BT10 which are connected to the bus BT12 into an on state in response to the control signal S1 supplied to gates of the plurality of transistors BT10. Accordingly, the positive electrode terminal of the battery cell BT09 on the most upstream side of the discharge battery cell group is connected to one of the pair of terminals A1 and A2. In addition, the negative electrode terminal of the battery cell BT09 on the most downstream side of the discharge battery cell group is connected to the other of the pair of terminals A1 and A2 (i.e., a terminal which is not connected to the positive electrode terminal).

OS transistors are preferably used as the transistors BT10. Since the off-state current of the OS transistor is low, the amount of electric charge leaking from battery cells which do not belong to the discharge battery cell group can be reduced, and reduction in capacity with the lapse of time can be suppressed. In addition, dielectric breakdown is unlikely to occur in the OS transistor when a high voltage is applied. Therefore, the battery cell BT09 and the terminal pair BT01, which are connected to the transistor BT10 in an off state, can be insulated from each other even when an output voltage of the discharge battery cell group is high.

In FIG. 15, the switching circuit BT05 includes a plurality of transistors BT13, a current control switch BT14, a bus BT15, and a bus BT16. The bus BT15 and the bus BT16 are provided between the plurality of transistors BT13 and the current control switch BT14. Sources or drains of the plurality of transistors BT13 are connected alternately to the bus BT15 and the bus BT16. Sources or drains which are not connected to the bus BT15 and the bus BT16 of the plurality of transistors BT13 are each connected between two adjacent battery cells BT09.

A source or a drain of a transistor BT13 which is not connected to the bus BT15 on the most upstream side of the plurality of transistors BT13 is connected to the positive electrode terminal of the battery cell BT09 on the most upstream side of the battery portion BT08. A source or a drain of a transistor BT13 which is not connected to the bus BT15 on the most downstream side of the plurality of transistors BT13 is connected to the negative electrode terminal of the battery cell BT09 on the most downstream side of the battery portion BT08.

OS transistors are preferably used as the transistors BT13 like the transistors BT10. Since the off-state current of the OS transistor is low, the amount of electric charge leaking from the battery cells which do not belong to the charge battery cell group can be reduced, and reduction in capacity with the lapse of time can be suppressed. In addition, dielectric breakdown is unlikely to occur in the OS transistor when a high voltage is applied. Therefore, the battery cell BT09 and the terminal pair BT02, which are connected to the transistor BT13 in an off state, can be insulated from each other even when a voltage for charging the charge battery cell group is high.

The current control switch BT14 includes a switch pair BT17 and a switch pair BT18. One end of the switch pair BT17 is connected to the terminal B1. The other ends of the switch pair BT17 extend from respective switches. One switch is connected to the bus BT15, and the other switch is connected to the bus BT16. One end of the switch pair BT18 is connected to the terminal B2. The other ends of the switch pair BT18 extend from respective switches. One switch is connected to the bus BT15, and the other switch is connected to the bus BT16.

OS transistors are preferably used for the switches included in the switch pair BT17 and the switch pair BT18 like the transistors BT10 and BT13.

The switching circuit BT05 connects the charge battery cell group and the terminal pair BT02 by controlling the combination of on and off states of the transistors BT13 and the current control switch BT14 in response to the control signal S2.

For example, the switching circuit BT05 connects the charge battery cell group and the terminal pair BT02 in the following manner.

The switching circuit BT05 brings a transistor BT13 connected to the positive electrode terminal of a battery cell BT09 on the most upstream side of the charge battery cell group into an on state in response to the control signal S2 supplied to gates of the plurality of the transistors BT13. In addition, the switching circuit BT05 brings a transistor BT13 connected to the negative electrode terminal of a battery cell BT09 on the most downstream side of the charge battery cell group into an on state in response to the control signal S2 supplied to the gates of the plurality of the transistors BT13.

The polarities of voltages applied to the terminal pair BT02 can vary in accordance with the connection structures of the voltage transformer circuit BT07 and the discharge battery cell group connected to the terminal pair BT01. In order to supply current in a direction for charging the charge battery cell group, terminals with the same polarity of the terminal pair BT02 and the charge battery cell group are required to be connected. In view of this, the current control switch BT14 is controlled by the control signal S2 so that the connection destination of the switch pair BT17 and that of the switch pair BT18 are changed in accordance with the polarities of the voltages applied to the terminal pair BT02.

The state where voltages are applied to the terminal pair BT02 so as to make the terminal B1 a positive electrode and the terminal B2 a negative electrode is described as an example. Here, in the case where the battery cell BT09 positioned on the most downstream side of the battery portion BT08 is in the charge battery cell group, the switch pair BT17 is controlled to be connected to the positive electrode terminal of the battery cell BT09 in response to the control signal S2. That is, the switch of the switch pair BT17 connected to the bus BT16 is turned on, and the switch of the switch pair BT17 connected to the bus BT15 is turned off. In contrast, the switch pair BT18 is controlled to be connected to the negative electrode terminal of the battery cell BT09 positioned on the most downstream side of the battery portion BT08 in response to the control signal S2. That is, the switch of the switch pair BT18 connected to the bus BT15 is turned on, and the switch of the switch pair BT18 connected to the bus BT16 is turned off. In this manner, terminals with the same polarity of the terminal pair BT02 and the charge battery cell group are connected to each other. In addition, the current which flows from the terminal pair BT02 is controlled to be supplied in a direction so as to charge the charge battery cell group.

In addition, instead of the switching circuit BT05, the switching circuit BT04 may include the current control switch BT14. In that case, the polarities of the voltages applied to the terminal pair BT02 are controlled by controlling the polarities of the voltages applied to the terminal pair BT01 in response to the operation of the current control switch BT14 and the control signal S1. Thus, the current control switch BT14 controls the direction of current which flows to the charge battery cell group from the terminal pair BT02.

FIG. 16 is a circuit diagram illustrating structure examples of the switching circuit BT04 and the switching circuit BT05 which are different from those of FIG. 15.

In FIG. 16, the switching circuit BT04 includes a plurality of transistor pairs BT21, a bus BT24, and a bus BT25. The bus BT24 is connected to the terminal A1. The bus BT25 is connected to the terminal A2. One ends of the plurality of transistor pairs BT21 extend from transistors BT22 and transistors BT23. Sources or drains of the transistors BT22 are connected to the bus BT24. Sources or drains of the transistors BT23 are connected to the bus BT25. In addition, the other ends of the plurality of transistor pairs BT21 are each connected between two adjacent battery cells BT09. The other end of the transistor pair BT21 on the most upstream side of the plurality of transistor pairs BT21 is connected to the positive electrode terminal of the battery cell BT09 on the most upstream side of the battery portion BT08. The other end of the transistor pair BT21 on the most downstream side of the plurality of transistor pairs BT21 is connected to a negative electrode terminal of the battery cell BT09 on the most downstream side of the battery portion BT08.

The switching circuit BT04 switches the connection destination of the transistor pair BT21 to one of the terminal A1 and the terminal A2 by turning on or off the transistors BT22 and BT23 in response to the control signal S1. Specifically, when the transistor BT22 is turned on, the transistor BT23 is turned off, so that the connection destination of the transistor pair BT21 is the terminal A1. On the other hand, when the transistor BT23 is turned on, the transistor BT22 is turned off, so that the connection destination of the transistor pair BT21 is the terminal A2. Which of the transistors BT22 and BT23 is turned on is determined by the control signal S1.

Two transistor pairs BT21 are used to connect the terminal pair BT01 and the discharge battery cell group. Specifically, the connection destinations of the two transistor pairs BT21 are determined on the basis of the control signal S1, and the discharge battery cell group and the terminal pair BT01 are connected. The connection destinations of the two transistor pairs BT21 are controlled by the control signal S1 so that one of the connection destinations is the terminal A1 and the other is the terminal A2.

The switching circuit BT05 includes a plurality of transistor pairs BT31, a bus BT34 and a bus BT35. The bus BT34 is connected to the terminal B1. The bus BT35 is connected to the terminal B2. One ends of the plurality of transistor pairs BT31 extend from transistors BT32 and transistors BT33. One end extending from the transistor BT32 is connected to the bus BT34. One end extending from the transistor BT33 is connected to the bus BT35. The other ends of the plurality of transistor pairs BT31 are each connected between two adjacent battery cells BT09. The other end of the transistor pair BT31 on the most upstream side of the plurality of transistor pairs BT31 is connected to the positive electrode terminal of the battery cell BT09 on the most upstream side of the battery portion BT08. The other end of the transistor pair BT31 on the most downstream side of the plurality of transistor pairs BT31 is connected to the negative electrode terminal of the battery cell BT09 on the most downstream side of the battery portion BT08.

The switching circuit BT05 switches the connection destination of the transistor pair BT31 to one of the terminal B1 and the terminal B2 by turning on or off the transistors BT32 and BT33 in response to the control signal S2. Specifically, when the transistor BT32 is turned on, the transistor BT33 is turned off, so that the connection destination of the transistor pair BT31 is the terminal B1. On the other hand, when the transistor BT33 is turned on, the transistor BT32 is turned off, so that the connection destination of the transistor pair BT31 is the terminal B2. Which of the transistors BT32 and BT33 is turned on is determined by the control signal S2.

Two transistor pairs BT31 are used to connect the terminal pair BT02 and the charge battery cell group. Specifically, the connection destinations of the two transistor pairs BT31 are determined on the basis of the control signal S2, and the charge battery cell group and the terminal pair BT02 are connected. The connection destinations of the two transistor pairs BT31 are controlled by the control signal S2 so that one of the connection destinations is the terminal B1 and the other is the terminal B2.

The connection destinations of the two transistor pairs BT31 are determined by the polarities of the voltages applied to the terminal pair BT02. Specifically, in the case where voltages which make the terminal B1 a positive electrode and the terminal B2 a negative electrode are applied to the terminal pair BT02, the transistor pair BT31 on the upstream side is controlled by the control signal S2 so that the transistor BT32 is turned on and the transistor BT33 is turned off. In contrast, the transistor pair BT31 on the downstream side is controlled by the control signal S2 so that the transistor BT33 is turned on and the transistor BT32 is turned off. In the case where voltages which make the terminal B1 a negative electrode and the terminal B2 a positive electrode are applied to the terminal pair BT02, the transistor pair BT31 on the upstream side is controlled by the control signal S2 so that the transistor BT33 is turned on and the transistor BT32 is turned off. In contrast, the transistor pair BT31 on the downstream side is controlled by the control signal S2 so that the transistor BT32 is turned on and the transistor BT33 is turned off. In this manner, terminals with the same polarity of the terminal pair BT02 and the charge battery cell group are connected to each other. In addition, the current which flows from the terminal pair BT02 is controlled to be supplied in a direction for charging the charge battery cell group.

The voltage transformation control circuit BT06 controls operation of the voltage transformer circuit BT07. The voltage transformation control circuit BT06 generates a voltage transformation signal S3 for controlling the operation of the voltage transformer circuit BT07 on the basis of the number of the battery cells BT09 included in the discharge battery cell group and the number of the battery cells BT09 included in the charge battery cell group and outputs the voltage transformation signal S3 to the voltage transformer circuit BT07.

In the case where the number of the battery cells BT09 included in the discharge battery cell group is larger than that included in the charge battery cell group, it is necessary to prevent a charging voltage which is too high from being applied to the charge battery cell group. Thus, the voltage transformation control circuit BT06 outputs the voltage transformation signal S3 for controlling the voltage transformer circuit BT07 so that a discharging voltage (Vdis) is lowered within a range where the charge battery cell group can be charged.

In the case where the number of the battery cells BT09 included in the discharge battery cell group is less than or equal to that included in the charge battery cell group, a voltage necessary for charging the charge battery cell group needs to be secured. Therefore, the voltage transformation control circuit BT06 outputs the voltage transformation signal S3 for controlling the voltage transformer circuit BT07 so that the discharging voltage (Vdis) is raised within a range where a charging voltage which is too high is not applied to the charge battery cell group.

The voltage value of the charging voltage which is too high is determined in the light of product specifications and the like of the battery cell BT09 used in the battery portion BT08. The voltage which is raised or lowered by the voltage transformer circuit BT07 is applied as a charging voltage (Vcha) to the terminal pair BT02.

Figure 17A:
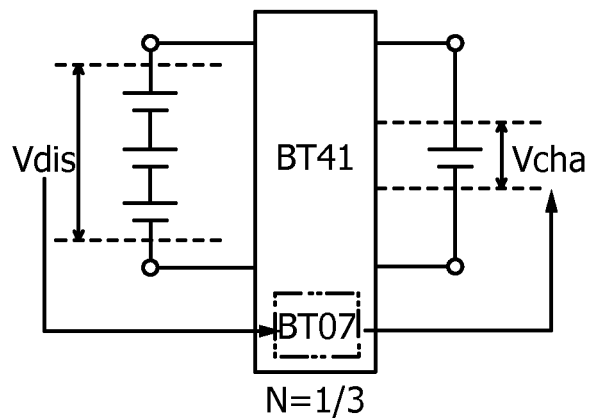
FIGS. 17A to 17C are conceptual diagrams illustrating a battery management unit of a power storage device.
Figure 17B:
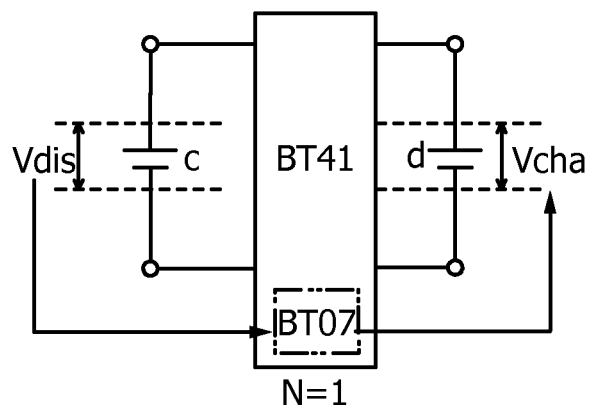
Figure 17C:
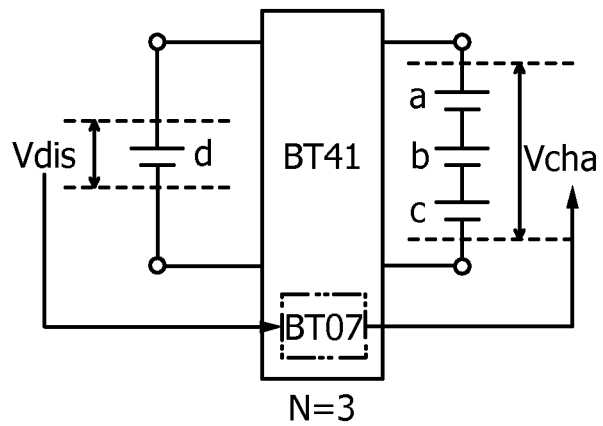

Here, operation examples of the voltage transformation control circuit BT06 in this embodiment are described with reference to FIGS. 17A to 17C. FIGS. 17A to 17C are conceptual diagrams for explaining the operation examples of the voltage transformation control circuit BT06 corresponding to the discharge battery cell group and the charge battery cell group described in FIGS. 14A to 14C. FIGS. 17A to 17C each illustrate a battery management unit BT41. The battery management unit BT41 includes the terminal pair BT01, the terminal pair BT02, the switching control circuit BT03, the switching circuit BT04, the switching circuit BT05, the voltage transformation control circuit BT06, and the voltage transformer circuit BT07.

In an example illustrated in FIG. 17A, the series of three high-voltage cells a to c and one low-voltage cell d are connected in series as described in FIG. 14A. In that case, as described using FIG. 14A, the switching control circuit BT03 selects the high-voltage cells a to c as the discharge battery cell group, and selects the low-voltage cell d as the charge battery cell group. The voltage transformation control circuit BT06 calculates a conversion ratio N for converting the discharging voltage (Vdis) to the charging voltage (Vcha) based on the ratio of the number of the battery cells BT09 included in the charge battery cell group to the number of the battery cells BT09 included in the discharge battery cell group.

In the case where the number of the battery cells BT09 included in the discharge battery cell group is larger than that included in the charge battery cell group, when a discharging voltage is applied to the terminal pair BT02 without transforming the voltage, overvoltage may be applied to the battery cells BT09 included in the charge battery cell group through the terminal pair BT02. Thus, in the case of FIG. 17A, it is necessary that a charging voltage (Vcha) applied to the terminal pair BT02 be lower than the discharging voltage. In addition, in order to charge the charge battery cell group, it is necessary that the charging voltage be higher than the total voltage of the battery cells BT09 included in the charge battery cell group. Thus, the voltage transformation control circuit BT06 sets the conversion ratio N larger than the ratio of the number of the battery cells BT09 included in the charge battery cell group to the number of the battery cells BT09 included in the discharge battery cell group.

Thus, the voltage transformation control circuit BT06 preferably sets the conversion ratio N larger than the ratio of the number of the battery cells BT09 included in the charge battery cell group to the number of the battery cells BT09 included in the discharge battery cell group by about 1% to 10%. Here, the charging voltage is made higher than the voltage of the charge battery cell group, but the charging voltage is equal to the voltage of the charge battery cell group in reality. Note that the voltage transformation control circuit BT06 feeds a current for charging the charge battery cell group in accordance with the conversion ratio N in order to make the voltage of the charge battery cell group equal to the charging voltage. The value of the current is set by the voltage transformation control circuit BT06.

In the example illustrated in FIG. 17A, since the number of the battery cells BT09 included in the discharge battery cell group is three and the number of the battery cells BT09 included in the charge battery cell group is one, the voltage transformation control circuit BT06 calculates a value which is slightly larger than $1/3$ as the conversion ratio N. Then, the voltage transformation control circuit BT06 outputs the voltage transformation signal S3, which lowers the discharging voltage in accordance with the conversion ratio N and converts the voltage into a charging voltage, to the voltage transformer circuit BT07. The voltage transformer circuit BT07 applies the charging voltage which is obtained by transformation in response to the voltage transformation signal S3 to the terminal pair BT02. Then, the battery cells BT09 included in the charge battery cell group are charged with the charging voltage applied to the terminal pair BT02.

In each of examples illustrated in FIGS. 17B and 17C, the conversion ratio N is calculated in a manner similar to that of FIG. 17A. In each of the examples illustrated in FIGS. 17B and 17C, since the number of the battery cells BT09 included in the discharge battery cell group is less than or equal to the number of the battery cells BT09 included in the charge battery cell group, the conversion ratio N is 1 or more. Therefore, in this case, the voltage transformation control circuit BT06 outputs the voltage transformation signal S3 for raising the discharging voltage and converting the voltage into the charging voltage.

The voltage transformer circuit BT07 converts the discharging voltage applied to the terminal pair BT01 into a charging voltage on the basis of the voltage transformation signal S3. The voltage transformer circuit BT07 applies the converted charging voltage to the terminal pair BT02. Here, the voltage transformer circuit BT07 electrically insulates the terminal pair BT01 from the terminal pair BT02. Accordingly, the voltage transformer circuit BT07 prevents a short circuit due to a difference between the absolute voltage of the negative electrode terminal of the battery cell BT09 on the most downstream side of the discharge battery cell group and the absolute voltage of the negative electrode terminal of the battery cell BT09 on the most downstream side of the charge battery cell group. Furthermore, the voltage transformer circuit BT07 converts the discharging voltage, which is the total voltage of the discharge battery cell group, into the charging voltage on the basis of the voltage transformation signal S3 as described above.

An insulated direct current (DC)-DC converter or the like can be used in the voltage transformer circuit BT07. In that case, the voltage transformation control circuit BT06 controls the charging voltage converted by the voltage transformer circuit BT07 by outputting a signal for controlling the on/off ratio (the duty ratio) of the insulated DC-DC converter as the voltage transformation signal S3.

Examples of the insulated DC-DC converter include a flyback converter, a forward converter, a ringing choke converter (RCC), a push-pull converter, a half-bridge converter, and a full-bridge converter, and a suitable converter is selected in accordance with the value of the intended output voltage.

Figure 18:
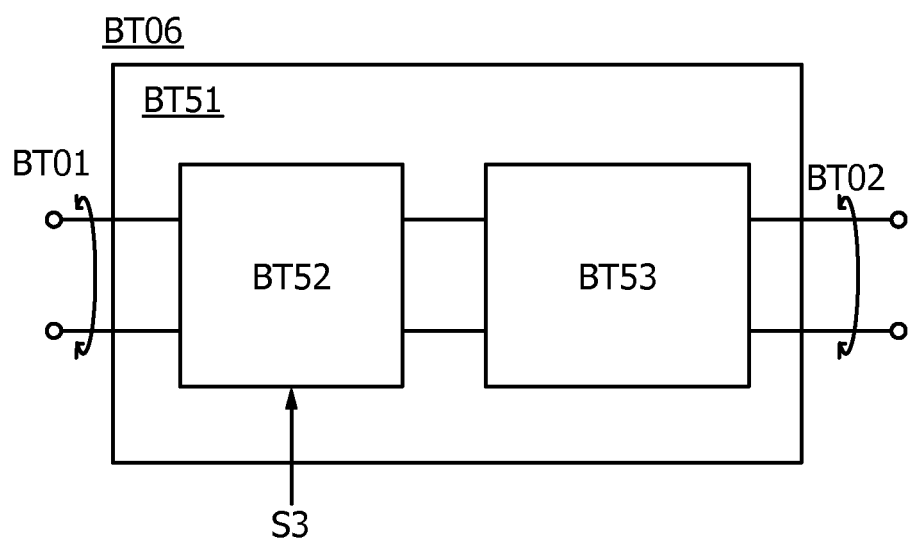
FIG. 18 is a block diagram illustrating a battery management unit of a power storage device.

The structure of the voltage transformer circuit BT07 including the insulated DC-DC converter is illustrated in FIG. 18. An insulated DC-DC converter BT51 includes a switch portion BT52 and a transformer BT53. The switch portion BT52 is a switch for switching on/off of the insulated DC-DC converter, and a metal oxide semiconductor field-effect transistor (MOSFET), a bipolar transistor, or the like is used as the switch portion BT52. The switch portion BT52 periodically turns on and off the insulated DC-DC converter BT51 in accordance with the voltage transformation signal S3 controlling the on/off ratio which is output from the voltage transformation control circuit BT06. The switch portion BT52 can have any of various structures in accordance with the type of the insulated DC-DC converter which is used. The transformer BT53 converts the discharging voltage applied from the terminal pair BT01 into the charging voltage. In detail, the transformer BT53 operates in conjunction with the on/off state of the switch portion BT52 and converts the discharging voltage into the charging voltage in accordance with the on/off ratio. As the time during which the switch portion BT52 is on becomes longer in its switching period, the charging voltage is increased. On the other hand, as the time during which the switch portion BT52 is on becomes shorter in its switching period, the charging voltage is decreased. In the case where the insulated DC-DC converter is used, the terminal pair BT01 and the terminal pair BT02 can be insulated from each other inside the transformer BT53.

Figure 19:
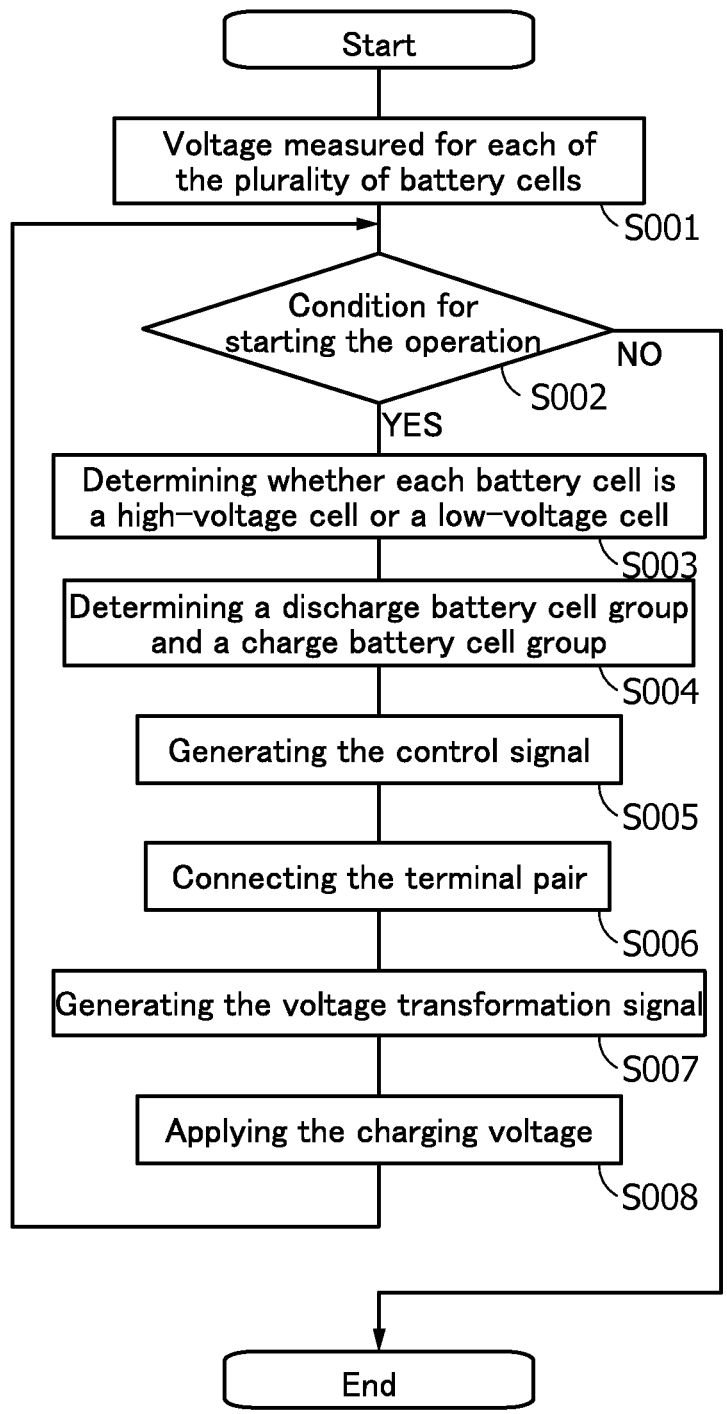
FIG. 19 is a flow chart showing an operation of a battery management unit of a power storage device.

A flow of operation of the power storage device BT00 in this embodiment is described with reference to FIG. 19. FIG. 19 is a flow chart illustrating the flow of the operation of the power storage device BT00.

First, the power storage device BT00 obtains a voltage measured for each of the plurality of battery cells BT09 (step S001). Then, the power storage device BT00 determines whether or not the condition for starting the operation of reducing variation in voltages of the plurality of battery cells BT09 is satisfied (step S002). An example of the condition can be that the difference between the maximum value and the minimum value of the voltage measured for each of the plurality of battery cells BT09 is higher than or equal to the predetermined threshold value. In the case where the condition is not satisfied (step S002: NO), the power storage device BT00 does not perform the following operation because voltages of the battery cells BT09 are well balanced. In contrast, in the case where the condition is satisfied (step S002: YES), the power storage device BT00 performs the operation of reducing variation in the voltages of the battery cells BT09. In this operation, the power storage device BT00 determines whether each battery cell BT09 is a high-voltage cell or a low-voltage cell on the basis of the measured voltage of each cell (step S003). Then, the power storage device BT00 determines a discharge battery cell group and a charge battery cell group on the basis of the determination result (step S004). In addition, the power storage device BT00 generates the control signal S1 for setting the determined discharge battery cell group as the connection destination of the terminal pair BT01, and the control signal S2 for setting the determined charge battery cell group as the connection destination of the terminal pair BT02 (step S005). The power storage device BT00 outputs the generated control signals S1 and S2 to the switching circuit BT04 and the switching circuit BT05, respectively. Then, the switching circuit BT04 connects the terminal pair BT01 and the discharge battery cell group, and the switching circuit BT05 connects the terminal pair BT02 and the discharge battery cell group (step S006). The power storage device BT00 generates the voltage transformation signal S3 based on the number of the battery cells BT09 included in the discharge battery cell group and the number of the battery cells BT09 included in the charge battery cell group (step S007). Then, the power storage device BT00 converts the discharging voltage applied to the terminal pair BT01 into a charging voltage based on the voltage transformation signal S3 and applies the charging voltage to the terminal pair BT02 (step S008). In this way, electric charge of the discharge battery cell group is transferred to the charge battery cell group.

Although the plurality of steps are shown in order in the flow chart of FIG. 19, the order of performing the steps is not limited to the order.

According to the above embodiment, when an electric charge is transferred from the discharge battery cell group to the charge battery cell group, a structure where an electric charge from the discharge battery cell group is temporarily stored, and the stored electric charge is sent to the charge battery cell group is unnecessary, unlike in the a capacitor type circuit. Accordingly, the charge transfer efficiency per unit time can be increased. In addition, the switching circuit BT04 and the switching circuit BT05 determine which battery cell in the discharge battery cell group and the charge battery cell group to be connected to the voltage transformer circuit.

Furthermore, the voltage transformer circuit BT07 converts the discharging voltage applied to the terminal pair BT01 into the charging voltage based on the number of the battery cells BT09 included in the discharge battery cell group and the number of the battery cells BT09 included in the charge battery cell group, and applies the charging voltage to the terminal pair BT02. Thus, even when any battery cell BT09 is selected as the discharge battery cell group and the charge battery cell group, an electric charge can be transferred without any problems.

Furthermore, the use of OS transistors as the transistor BT10 and the transistor BT13 can reduce the amount of electric charge leaking from the battery cells BT09 which do not belong to the charge battery cell group or the discharge battery cell group. Accordingly, a decrease in capacity of the battery cells BT09 which do not contribute to charging or discharging can be suppressed. In addition, the variation in characteristics of the OS transistor due to heat is smaller than that of an Si transistor. Accordingly, even when the temperature of the battery cells BT09 is increased, an operation such as turning on or off the transistors in response to the control signals S1 and S2 can be performed normally.

Embodiment 4

In this embodiment, an example of an electronic device including the secondary battery described in Embodiment 1 is described.

Figure 20:
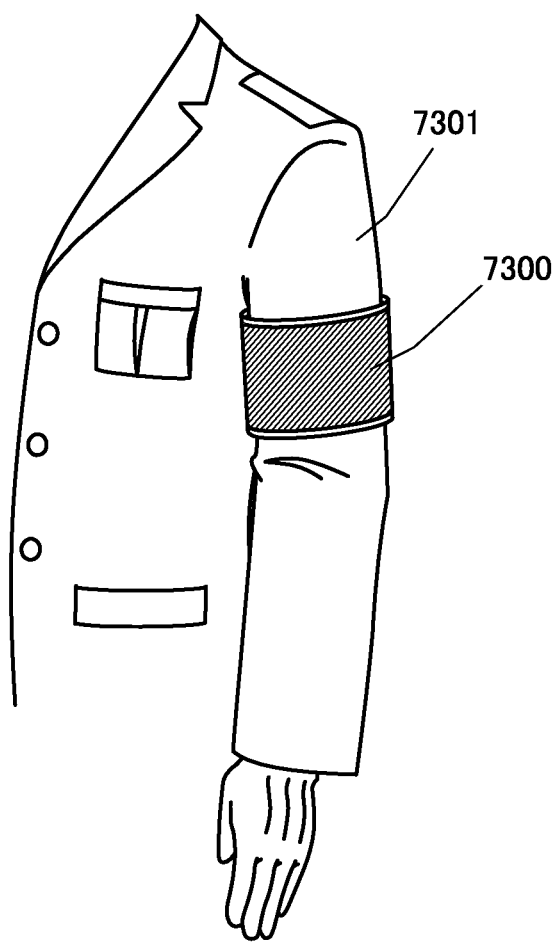
FIG. 20 illustrates an example of an electronic device.

FIG. 20 illustrates an example of an armband electronic device including a flexible secondary battery. An armband device 7300 illustrated in FIG. 20 can be worn on an arm 7301 and includes a display portion having a curved surface and a bendable secondary battery.

Note that in the display portion, a display element, a display device which is a device including a display element, a light-emitting element, and a light-emitting device which is a device including a light-emitting element can employ various modes or can include various elements. The display element, the display device, the light-emitting element, or the light-emitting device includes at least one of an electroluminescence (EL) element (e.g., an EL element including organic and inorganic materials, an organic EL element, or an inorganic EL element), an LED (e.g., a white LED, a red LED, a green LED, or a blue LED), a transistor (a transistor that emits light depending on current), an electron emitter, a liquid crystal element, electronic ink, an electrophoretic element, a grating light valve (GLV), a plasma display panel (PDP), display element using micro electro mechanical systems (MEMS), a digital micromirror device (DMD), a digital micro shutter (DMS), MIRASOL (registered trademark), an interferometric modulator display (IMOD) element, a MEMS shutter display element, an optical-interference-type MEMS display element, an electrowetting element, a piezoelectric ceramic display, a display element including a carbon nanotube, and the like. Other than the above, a display element, a display device, a light-emitting element, or a light-emitting device may include a display medium whose contrast, luminance, reflectivity, transmittance, or the like is changed by electrical or magnetic effect. Note that examples of display devices having EL elements include an EL display. Examples of display devices including electron emitters are a field emission display (FED) and an SED-type flat panel display (SED: surface-conduction electron-emitter display). Examples of display devices including liquid crystal elements include a liquid crystal display (e.g., a transmissive liquid crystal display, a transflective liquid crystal display, a reflective liquid crystal display, a direct-view liquid crystal display, or a projection liquid crystal display). Examples of a display device including electronic ink, electronic liquid powder (registered trademark), or electrophoretic elements include electronic paper. In the case of a transflective liquid crystal display or a reflective liquid crystal display, some of or all of pixel electrodes function as reflective electrodes. For example, some or all of pixel electrodes are formed to contain aluminum, silver, or the like. In such a case, a memory circuit such as an SRAM can be provided under the reflective electrodes, leading to lower power consumption. Note that in the case of using an LED, graphene or graphite may be provided under an electrode or a nitride semiconductor of the LED. Graphene or graphite may be a multilayer film in which a plurality of layers are stacked. As described above, provision of graphene or graphite enables easy formation of a nitride semiconductor film thereover, such as an n-type GaN semiconductor layer including crystals. Furthermore, a p-type GaN semiconductor layer including crystals or the like can be provided thereover, and thus the LED can be formed. Note that an AlN layer may be provided between the n-type GaN semiconductor layer including crystals and graphene or graphite. The GaN semiconductor layers included in the LED may be formed by MOCVD. Note that when the graphene is provided, the GaN semiconductor layers included in the LED can also be formed by a sputtering method.

The armband device 7300 preferably further includes one or more functional elements. An example of a functional element is a sensor. As the sensor, a sensor having a function of measuring force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays can be used. The armband device 7300 may include a functional element such as a touch panel, an antenna, a power generation element, and a speaker.

For example, when a user wears the armband device 7300 on his or her arm and makes its display emit light at nighttime, traffic safety can be ensured. For another example, when a soldier, a security guard, or the like wears the armband device 7300 on an upper arm, he or she can check a chief's command, which is received in real time and displayed on its display portion, while creeping. It is difficult for a soldier or a security guard to use a wireless device, a mobile phone, or a head-mounted device because he or she wears a helmet and has weapons or tools with hands in executing his or her duties. Thus, it is useful that a soldier or a security guard can wear the armband device 7300 on his or her upper arm and operate it by, for example, voice input to an audio input portion such as a microphone even when his or her hands are full.

The armband device 7300 can also be effectively used in the field of sports. For example, it is difficult for a marathoner to check the time on his or her watch without stopping swinging his or her arms. Stopping swinging his or her arms might disturb his or her rhythm, obstructing his or her run. However, wearing the armband device 7300 on his or her upper arm enables checking the time without stopping swinging of his or her arm. Furthermore, it can display other information (e.g., his or her position in a course or his or her health condition) on its display screen. It is more useful that it further has a function that allows an athlete to operate it by voice input or the like without using his or her hands, seek instructions from his or her coach by a communication function, and listen the directions output by voice output from an audio output portion such as a speaker or view the instructions displayed on its display screen.

For another example, when a construction crew or the like who wears a helmet wears the armband device 7300 and operates it, he or she can exchange information by communication to easily obtain the positional information of other crews so that he or she can work safely.

FIGS. 21A to 21F illustrate examples of other electronic devices including flexible secondary batteries. Examples of an electronic device including a flexible secondary battery include television sets (also referred to as televisions or television receivers), monitors of computers or the like, digital cameras or digital video cameras, digital photo frames, mobile phones (also referred to as cellular phones or mobile phone devices), portable game machines, portable information terminals, audio reproducing devices, and large game machines such as pachinko machines.

In addition, a flexible secondary battery can be incorporated along a curved inside/outside wall surface of a house or a building or a curved interior/exterior surface of an automobile.

FIG. 21A illustrates an example of a mobile phone. A cellular phone 7400 is provided with a display portion 7402 incorporated in a housing 7401, an operation button 7403, an external connection port 7404, a speaker 7405, a microphone 7406, and the like. Note that the mobile phone 7400 includes a secondary battery 7407.

FIG. 21B illustrates the mobile phone 7400 that is curved. When the whole mobile phone 7400 is curved by external force, the secondary battery 7407 included in the mobile phone 7400 is also curved. FIG. 21C illustrates the curved secondary battery 7407. The secondary battery 7407 is a thin secondary battery. The secondary battery 7407 is curved and fixed. Note that the secondary battery 7407 includes a lead electrode electrically connected to a current collector. The current collector is, for example, copper foil, and partly alloyed with gallium; thus, adhesion between the current collector and an active material layer is improved. Consequently, the secondary battery 7407 can have high reliability even in a state of being curved.

FIG. 21D illustrates an example of a bangle display device. A portable display device 7100 includes a housing 7101, a display portion 7102, an operation button 7103, and a secondary battery 7104. FIG. 21E illustrates the curved secondary battery 7104. When the curved secondary battery 7104 is on a user's arm, the housing changes its form and the curvature of a part or the whole of the secondary battery 7104 is changed. Note that the radius of curvature of a curve at a point refers to the radius of the circular arc that best approximates the curve at that point. The reciprocal of the radius of curvature is curvature. Specifically, a part or the whole of the housing or the main surface of the secondary battery 7104 is changed in the range of radius of curvature from 40 mm to 150 mm. When the radius of curvature at the main surface of the secondary battery 7104 is 40 mm to 150 mm, the reliability can be kept high.

A flexile secondary battery can be provided with high space efficiency in any of a variety of electronic devices. For example, in a stove 7500 illustrated in FIG. 21F, a module 7511 is attached to a main body 7512. The module 7511 includes the secondary battery 7501, a motor, a fan, an air outlet 7511a, and a thermoelectric generation device. In the stove 7500, after a fuel is injected through an opening 7512a and ignited, outside air can be sent through the air outlet 7511a to the inside of the stove 7500 by rotating the motor and the fan which are included in the module 7511 using power of the secondary battery 7501. In this manner, the stove 7500 can have strong heating power because outside air can be taken into the inside of the stove 7500 efficiently. In addition, cooking can be performed on an upper grill 7513 with thermal energy generated by the combustion of fuel. The thermal energy is converted into power with the thermoelectric generation device of the module 7511, and the secondary battery 7501 is charged with the power. The power charged into the secondary battery 7501 can be output through an external terminal 7511b.

Embodiment 4 can be implemented in appropriate combination with any of the structures described in the other embodiments.

Embodiment 5

In this embodiment, other examples of electronic devices that can include the secondary battery described in Embodiment 1 are described.

Figure 22A:
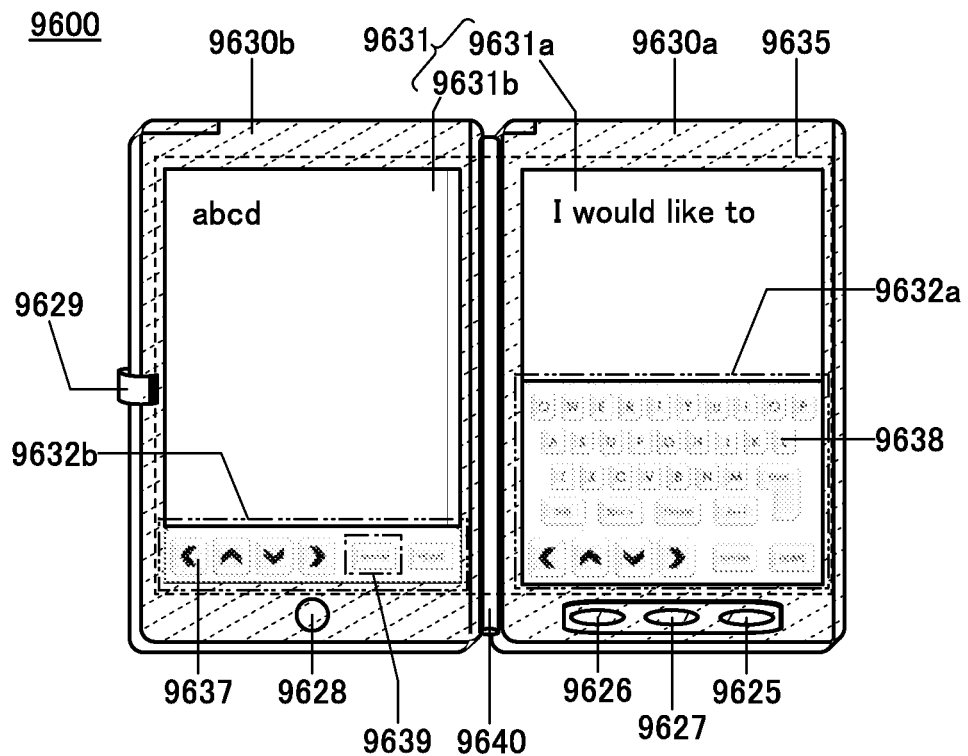
FIGS. 22A to 22C illustrate an example of an electronic device.
Figure 22B:
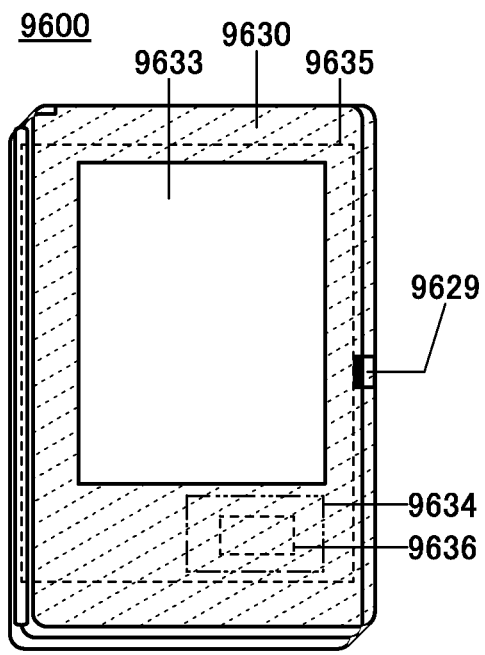

FIGS. 22A and 22B illustrate an example of a tablet terminal that can be folded in half. A tablet terminal 9600 illustrated in FIGS. 22A and 22B includes a housing 9630a, a housing 9630b, a movable portion 9640 connecting the housings 9630a and 9630b, a display portion 9631 including a display portion 9631a and a display portion 9631b, a display mode changing switch 9626, a power switch 9627, a power saving mode changing switch 9625, a fastener 9629, and an operation switch 9628. FIGS. 22A and 22B illustrate the tablet terminal 9600 opened and closed, respectively.

The tablet terminal 9600 includes a secondary battery 9635 inside the housings 9630a and 9630b. The secondary battery 9635 is provided across the housings 9630a and 9630b, passing through the movable portion 9640.

Part of the display portion 9631a can be a touch panel region 9632a, and data can be input by touching operation keys 9638 that are displayed. Note that FIG. 22A shows, as an example, that half of the area of the display portion 9631a has only a display function and the other half of the area has a touch panel function. However, the structure of the display portion 9631a is not limited to this, and all the area of the display portion 9631a may have a touch panel function. For example, all the area of the display portion 9631a can display keyboard buttons and serve as a touch panel while the display portion 9631b can be used as a display screen.

As in the display portion 9631a, part of the display portion 9631b can be a touch panel region 9632b. When a keyboard display switching button 9639 displayed on the touch panel is touched with a finger, a stylus, or the like, a keyboard can be displayed on the display portion 9631b.

Touch input can be performed in the touch panel region 9632a and the touch panel region 9632b at the same time.

The switch 9626 for switching a display mode allows switching between a landscape mode and a portrait mode, color display and black-and-white display, and the like. The power saver switch 9625 can control display luminance in accordance with the amount of external light in use of the tablet terminal 9600, which is measured with an optical sensor incorporated in the tablet terminal 9600. In addition to the optical sensor, other detecting devices such as sensors for determining inclination, such as a gyroscope or an acceleration sensor, may be incorporated in the tablet terminal.

Note that FIG. 22A shows an example in which the display portion 9631a and the display portion 9631b have the same display area; however, one embodiment of the present invention is not limited and one of the display portions may be different from the other display portion in size and display quality. For example, one of the display portions 9631a and 9631b may display higher definition images than the other.

The tablet terminal is closed in FIG. 22B. The tablet terminal includes the housing 9630, a solar cell 9633, and a charge and discharge control circuit 9634 including a DC-DC converter 9636. The secondary battery of one embodiment of the present invention is used for the secondary battery 9635.

The tablet terminal 9600 can be folded so that the housings 9630a and 9630b overlap with each other when not in use. Thus, the display portions 9631a and 9631b can be protected, which increases the durability of the tablet terminal 9600. In addition, the secondary battery 9635 of one embodiment of the present invention has flexibility and can be repeatedly curved without a large decrease in charge and discharge capacity. Thus, a highly reliable tablet terminal can be provided.

The tablet terminal illustrated in FIGS. 22A and 22B can also have a function of displaying various kinds of data (e.g., a still image, a moving image, and a text image), a function of displaying a calendar, a date, or the time on the display portion, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processor, and the like. Note that the solar cell 9633 can be provided on one or both surfaces of the housing 9630 and the secondary battery 9635 can be charged efficiently. When the secondary battery of one embodiment of the present invention is used as the secondary battery 9635, a tablet terminal can be used for a long period because the deterioration of discharge capacity caused by repetition of charging and discharging can be suppressed.

Figure 22C:
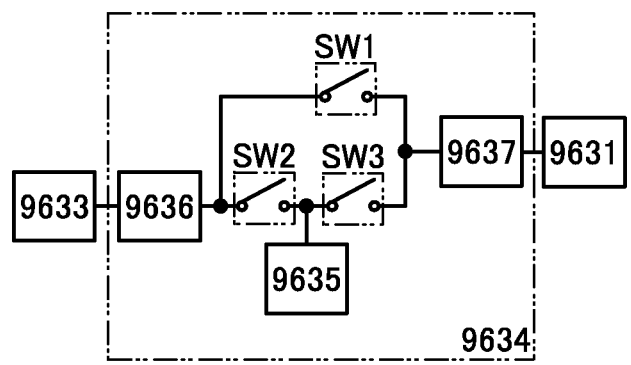

The structure and the operation of the charge and discharge control circuit 9634 illustrated in FIG. 22B will be described with reference to a block diagram in FIG. 22C. The solar cell 9633, the secondary battery 9635, the DC-DC converter 9636, a converter 9637, switches SW1 to SW3, and the display portion 9631 are illustrated in FIG. 22C, and the secondary battery 9635, the DC-DC converter 9636, the converter 9637, and the switches SW1 to SW3 correspond to the charge and discharge control circuit 9634 in FIG. 22B.

First, an example of operation in the case where power is generated by the solar cell 9633 using external light is described. The voltage of electric power generated by the solar cell is raised or lowered by the DC-DC converter 9636 to a voltage for charging the secondary battery 9635. When the display portion 9631 is operated with the power from the solar cell 9633, the switch SW1 is turned on and the voltage of the power is raised or lowered by the converter 9637 to a voltage needed for operating the display portion 9631. In addition, when display on the display portion 9631 is not performed, the switch SW1 is turned off and the switch SW2 is turned on so that the secondary battery 9635 may be charged.

Note that the solar cell 9633 is described as an example of a power generation means; however, one embodiment of the present invention is not limited to this example. The secondary battery 9635 may be charged using another power generation means such as a piezoelectric element or a thermoelectric conversion element (Peltier element). For example, the secondary battery 9635 may be charged with a non-contact power transmission module capable of performing charging by transmitting and receiving electric power wirelessly (without contact), or any of the other charge means used in combination.

Figure 23A:
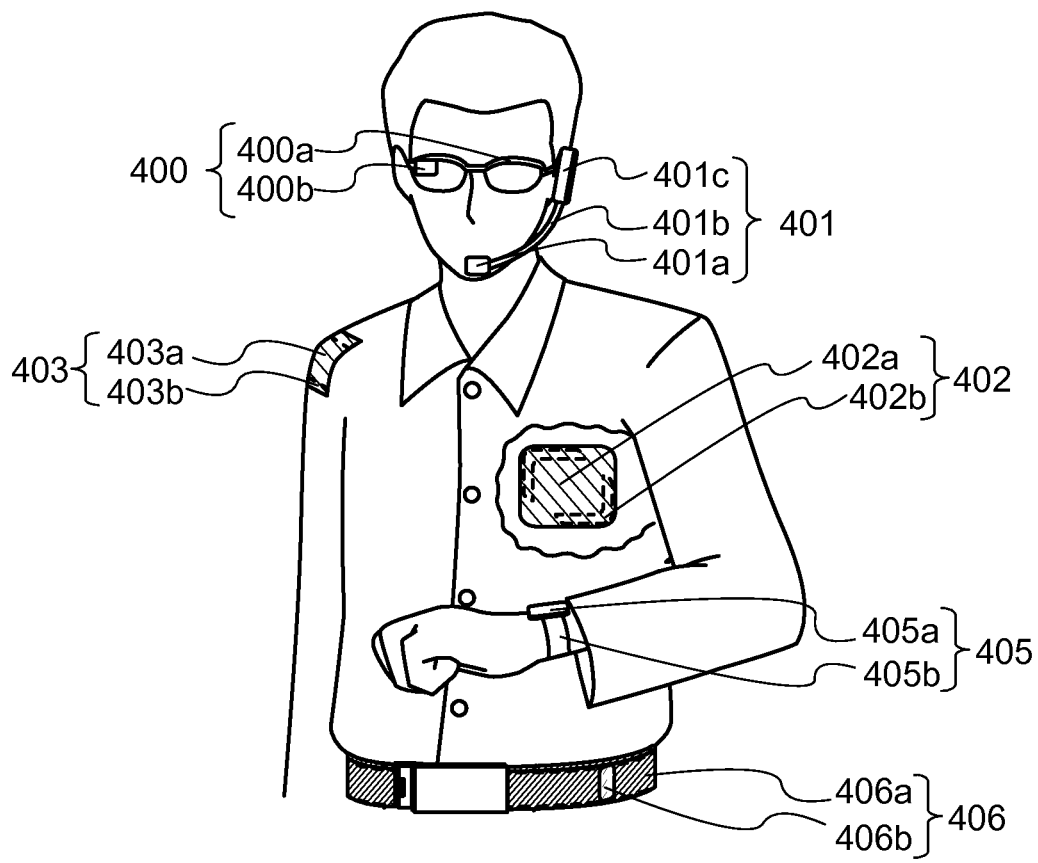
FIGS. 23A and 23B illustrate examples of an electronic device.
Figure 23B:
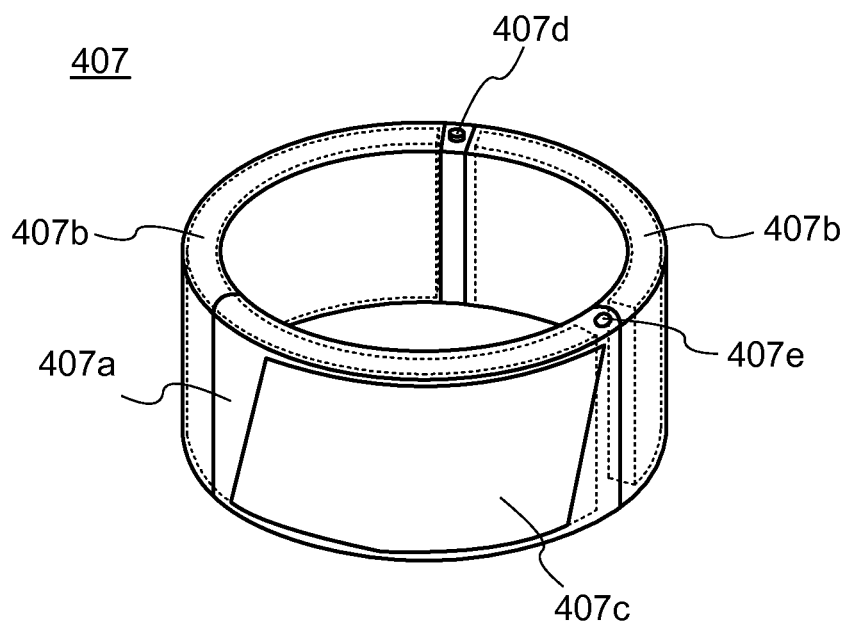

The secondary battery described in Embodiment 1 can be provided in wearable devices illustrated in FIGS. 23A and 23B.

For example, the secondary battery can be provided in a glasses-type device 400 illustrated in FIG. 23A. The glasses-type device 400 includes a frame 400a and a display portion 400b. The secondary battery is provided in a temple of the frame 400a having a curved shape, whereby the glasses-type device 400 can have a well-balanced weight and can be used continuously for a long time.

The secondary battery can be provided in a headset-type device 401. The headset-type device 401 includes at least a microphone part 401a, a flexible pipe 401b, and an earphone part 401c. The secondary battery can be provided in the flexible pipe 401b and the earphone part 401c.

Furthermore, the secondary battery can be provided in a device 402 that can be attached directly to a body. The secondary battery 402b is provided in a thin housing 402a of the device 402.

Furthermore, the secondary battery can be provided in a device 403 that can be attached to clothes. The secondary battery 403b can be provided in a thin housing 403a of the device 403.

Furthermore, the secondary battery can be provided in a watch-type device 405. The watch-type device 405 includes a display portion 405a and a belt portion 405b, and the secondary battery can be provided in the display portion 405a or the belt portion 405b.

Furthermore, the secondary battery can be provided in a belt-type device 406. The belt-type device 406 includes a display portion 406a and a wireless power feeding and receiving portion 406b, and the secondary battery can be provided inside the belt portion 406a.

The secondary battery described in Embodiment 1 can be provided in a wristband device 407 illustrated in FIG. 23B. The wristband device 407 includes two curved secondary batteries 407b in a case 407a. A curved display portion 407c is provided over a surface of the case 407a. For the display portion which can be used for the display portion 407c, the description of the display portion in FIG. 20 can be referred to. The armband device 407 includes a connection portion 407d and a hinge portion 407e. A portion between the connection portion 407d and the hinge portion 407e can be flexibly moved using the hinge portion 407e as an axis. Charging or the like through an external terminal provided in the connection portion 407d is also possible.

Figure 24:
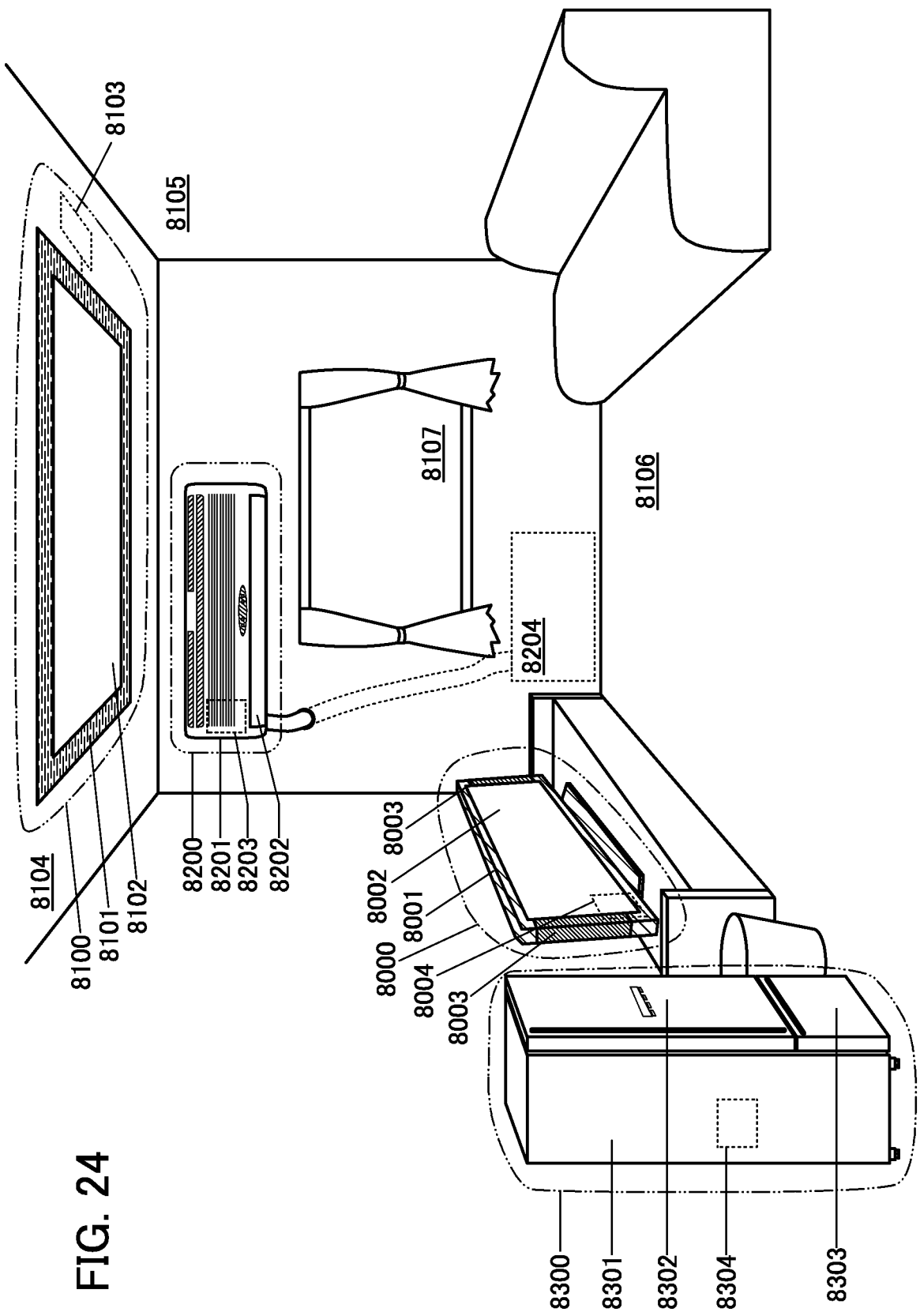
FIG. 24 illustrates examples of electronic devices.

FIG. 24 illustrates examples of other electronic devices. In FIG. 24, a display device 8000 is an example of an electronic device using a secondary battery 8004 of one embodiment of the present invention. Specifically, the display device 8000 corresponds to a display device for TV broadcast reception and includes a housing 8001, a display portion 8002, speaker portions 8003, the secondary battery 8004, and the like. The secondary battery 8004 of one embodiment of the present invention is provided in the housing 8001. The display device 8000 can receive power from a commercial power source. Alternatively, the display device 8000 can use power stored in the secondary battery 8004. Thus, the display device 8000 can be operated with the use of the secondary battery 8004 of one embodiment of the present invention as an uninterruptible power source even when power cannot be supplied from a commercial power source due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception.

In FIG. 24, an installation lighting device 8100 is an example of an electronic device using a secondary battery 8103 of one embodiment of the present invention. Specifically, the installation lighting device 8100 includes a housing 8101, a light source 8102, the secondary battery 8103, and the like. Although FIG. 24 illustrates the case where the secondary battery 8103 is provided in a ceiling 8104 on which the housing 8101 and the light source 8102 are installed, the secondary battery 8103 may be provided in the housing 8101. The installation lighting device 8100 can receive power from a commercial power source. Alternatively, the installation lighting device 8100 can use power stored in the secondary battery 8103. Thus, the installation lighting device 8100 can be operated with the use of the secondary battery 8103 of one embodiment of the present invention as an uninterruptible power source even when power cannot be supplied from a commercial power source due to power failure or the like.

Note that although the installation lighting device 8100 provided in the ceiling 8104 is illustrated in FIG. 24 as an example, the secondary battery of one embodiment of the present invention can be used as an installation lighting device provided in, for example, a wall 8105, a floor 8106, a window 8107, or the like other than the ceiling 8104. Alternatively, the secondary battery can be used in a tabletop lighting device or the like.

As the light source 8102, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 24, an air conditioner including an indoor unit 8200 and an outdoor unit 8204 is an example of an electronic device using a secondary battery 8203 of one embodiment of the present invention. Specifically, the indoor unit 8200 includes a housing 8201, an air outlet 8202, the secondary battery 8203, and the like. Although FIG. 24 illustrates the case where the secondary battery 8203 is provided in the indoor unit 8200, the secondary battery 8203 may be provided in the outdoor unit 8204. Alternatively, the secondary batteries 8203 may be provided in both the indoor unit 8200 and the outdoor unit 8204. The air conditioner can receive power from a commercial power source. Alternatively, the air conditioner can use power stored in the secondary battery 8203. Particularly in the case where the secondary batteries 8203 are provided in both the indoor unit 8200 and the outdoor unit 8204, the air conditioner can be operated with the use of the secondary battery 8203 of one embodiment of the present invention as an uninterruptible power source even when power cannot be supplied from a commercial power source due to power failure or the like.

Note that although the split-type air conditioner including the indoor unit and the outdoor unit is illustrated in FIG. 24 as an example, the secondary battery of one embodiment of the present invention can be used in an air conditioner in which the functions of an indoor unit and an outdoor unit are integrated in one housing.

In FIG. 24, an electric refrigerator-freezer 8300 is an example of an electronic device using a secondary battery 8304 of one embodiment of the present invention. Specifically, the electric refrigerator-freezer 8300 includes a housing 8301, a door for a refrigerator 8302, a door for a freezer 8303, the secondary battery 8304, and the like. The secondary battery 8304 is provided inside the housing 8301 in FIG. 24. The electric refrigerator-freezer 8300 can receive power from a commercial power source. Alternatively, the electric refrigerator-freezer 8300 can use power stored in the secondary battery 8304. Thus, the electric refrigerator-freezer 8300 can be operated with the use of the secondary battery 8304 of one embodiment of the present invention as an uninterruptible power source even when power cannot be supplied from a commercial power source due to power failure or the like.

This embodiment can be implemented in appropriate combination with any of the structures described in the other embodiments.

Embodiment 6

In this embodiment, examples of vehicles including the secondary battery described in Embodiment 1 are described.

The use of secondary batteries in vehicles enables production of next-generation clean energy vehicles such as hybrid electric vehicles (HEVs), electric vehicles (EVs), and plug-in hybrid electric vehicles (PHEVs).

Figure 25A:
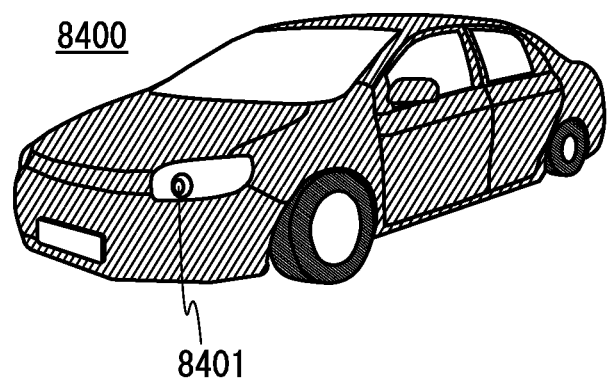
FIGS. 25A and 25B each illustrate an example of an electronic device.
Figure 25B:
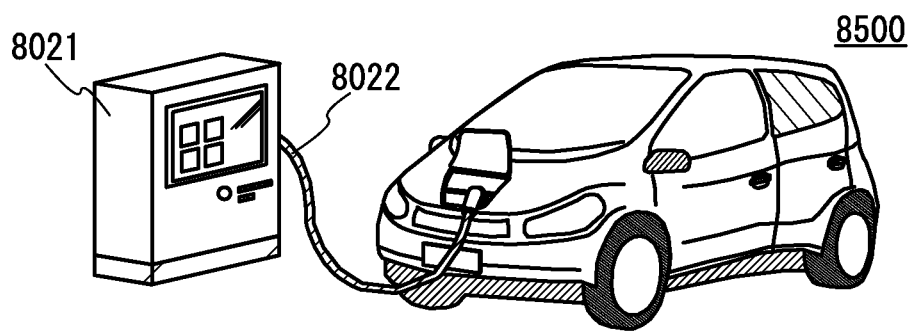

FIGS. 25A and 25B each illustrate an example of a vehicle using one embodiment of the present invention. An automobile 8400 illustrated in FIG. 25A is an electric vehicle which runs on the power of the electric motor. Alternatively, the automobile 8400 is a hybrid electric vehicle capable of driving using either the electric motor or the engine as appropriate. One embodiment of the present invention achieves a high-mileage vehicle. The automobile 8400 includes the secondary battery. The secondary battery is used not only to drive the electric motor, but also to supply electric power to a light-emitting device such as a headlight 8401 or a room light (not illustrated).

The secondary battery can also supply electric power to a display device of a speedometer, a tachometer, or the like included in the automobile 8400. Furthermore, the secondary battery can supply electric power to a semiconductor device included in the automobile 8400, such as a navigation system.

FIG. 25B illustrates an automobile 8500 including the secondary battery. The automobile 8500 can be charged when the secondary battery is supplied with electric power through external charging equipment by a plug-in system, a contactless power feeding system, or the like. In FIG. 25B, the power storage device included in the automobile 8500 is charged with the use of a ground-based charging apparatus 8021 through a cable 8022. In charging, a given method such as CHAdeMO (registered trademark) or Combined Charging System may be referred to for a charging method, the standard of a connector, or the like as appropriate. The charging apparatus 8021 may be a charging station provided in a commerce facility or a power source in a house. With the use of a plug-in technique, the secondary battery included in the automobile 8500 can be charged by being supplied with electric power from outside, for example. The charging can be performed by converting AC electric power into DC electric power through a converter such as an AC-DC converter.

Further, although not illustrated, the vehicle may include a power receiving device so as to be charged by being supplied with electric power from an above-ground power transmitting device in a contactless manner. In the case of the contactless power supply system, by fitting the power transmitting device in a road or an exterior wall, charging can be performed not only when the electric vehicle is stopped but also when driven. In addition, the contactless power supply system may be utilized to perform transmission/reception between vehicles. A solar cell may be provided in the exterior of the automobile to charge the secondary battery when the automobile stops or moves. To supply electric power in such a contactless manner, an electromagnetic induction method or a magnetic resonance method can be used.

Furthermore, the secondary battery included in the vehicle can be used as a power source for supplying electric power to products other than the vehicle. In such a case, the use of a commercial power source can be avoided at peak time of electric power demand.

Embodiment 6 can be implemented in appropriate combination with any of the structures described in the other embodiments.

This application is based on Japanese Patent Application serial no. 2014-241726 filed with Japan Patent Office on Nov. 28, 2014, the entire contents of which are hereby incorporated by reference.

What is claimed is:

1. An electronic device comprising:
    a secondary battery, the secondary battery comprising:
        a first positive electrode;
        a second positive electrode;
        a positive electrode lead electrically connected to the first positive electrode and the second positive electrode;
        a negative electrode between the first positive electrode and the second positive electrode;
        a negative electrode lead electrically connected to the negative electrode;
        a separator; and
        an exterior body wrapping the first positive electrode, the second positive electrode, the negative electrode, and the separator,
    wherein the electronic device has a ring shape,
    wherein the first positive electrode, the second positive electrode, the separator, the negative electrode, and the exterior body are configured to be curved in a first direction along the ring shape,
    wherein the negative electrode and the first positive electrode overlap with each other,
    wherein the first positive electrode and the second positive electrode overlap with each other,
    wherein the length in the first direction of the first positive electrode is longer than the length in the first direction of the second positive electrode,
    wherein the negative electrode comprises a negative electrode tab portion being in contact with the negative electrode lead,
    wherein the negative electrode lead and the negative electrode tab portion overlap with each other,
    wherein the first positive electrode comprises a first positive electrode tab portion being in contact with the positive electrode lead,
    wherein the second positive electrode comprises a second positive electrode tab portion being in contact with the positive electrode lead,
    wherein the positive electrode lead, the first positive electrode tab portion and the second positive electrode tab portion overlap with each other,
    wherein the first positive electrode comprises a cut portion which overlaps with the negative electrode tab portion,
    wherein the positive electrode lead and the negative electrode lead are drawn from opposite sides of the exterior body,
    wherein a second direction connecting the first positive electrode tab portion and the negative electrode tab portion is perpendicular to the first direction,
    wherein the positive electrode lead and the negative electrode lead both extends in the second direction,
    wherein the first positive electrode comprises a first side and a second side,
    wherein the first side and the second side face each other in the first direction,
    wherein the second positive electrode comprises a third side and a fourth side,
    wherein the third side and the fourth side face each other in the first direction,
    wherein the first side and the third side are aligned,
    wherein the second side and the fourth side are aligned,
    wherein the negative electrode comprises a fifth side and a sixth side,
    wherein the fifth side is positioned outward the first side and the third side, and
    wherein the sixth side is positioned outward the second side and the fourth side.

2. The electronic device according to claim 1, wherein a length of the first direction of the exterior body is twice or more a length of the exterior body in the second direction.

3. An electronic device comprising:
    a secondary battery, the secondary battery comprising:
        a first positive electrode;
        a second positive electrode;
        a positive electrode lead electrically connected to the first positive electrode and the second positive electrode;
        a negative electrode between the first positive electrode and the second positive electrode;
        a negative electrode lead electrically connected to the negative electrode;
        a separator; and
        an exterior body wrapping the first positive electrode, the second positive electrode, the negative electrode, and the separator,
    wherein the electronic device has a ring shape,
    wherein the first positive electrode, the second positive electrode, the separator, the negative electrode, and the exterior body are configured to be curved in a first direction along the ring shape,
    wherein the length in the first direction of the first positive electrode is longer than the length in the first direction of the second positive electrode,
    wherein the negative electrode comprises a negative electrode tab portion being in contact with the negative electrode lead,
    wherein the first positive electrode comprises a positive electrode tab portion being in contact with the positive electrode lead,
    wherein the second positive electrode comprises a second positive electrode tab portion being in contact with the positive electrode lead,
    wherein a distance from an edge of the negative electrode tab portion to an edge of an end portion of the exterior body in the first direction is longer than 10% of a length of the first direction of the exterior body,
    wherein the positive electrode lead and the negative electrode lead both extends along a direction perpendicular to the first direction, and
    wherein the first positive electrode comprises a first side and a second side,
    wherein the first side and the second side face each other in the first direction,
    wherein the second positive electrode comprises a third side and a fourth side,
    wherein the third side and the fourth side face each other in the first direction,
    wherein the first side and the third side are aligned,
    wherein the second side and the fourth side are aligned,
    wherein the negative electrode comprises a fifth side and a sixth side,
    wherein the fifth side is positioned outward the first side and the third side, and
    wherein the sixth side is positioned outward the second side and the fourth side.

4. The electronic device according to claim 1,
    wherein the electronic device comprises a housing,
    wherein the curvature of the secondary battery is changed with the change of the form of the housing, and wherein a force is applied by the housing so as to change the whole of the radius of curvature of the exterior body to the exterior body in the first direction.

5. The electronic device according to claim 1, wherein the exterior body is configured to be curved so as to have a constant curvature within the whole exterior body in the first direction.

6. The electronic device according to claim 1, wherein the first positive electrode, the second positive electrode, the negative electrode, the separator and the exterior body comprise a through-hole.

7. The electronic device according to claim 1, wherein the electronic device comprises a curved display portion.

8. The electronic device according to claim 1, wherein the electronic device is a watch-type device.

9. The electronic device according to claim 6, wherein the electronic device comprises a band portion, wherein the band portion comprises a hole, wherein the through-hole of the first positive electrode, the second positive electrode, the negative electrode, the separator and the exterior body overlaps with the hole of the band portion.

10. The electronic device according to claim 1, wherein the exterior body comprises a convex surface curved along the first direction, wherein the distance of the first positive electrode and the convex surface is smaller than the distance of the second positive electrode and the convex surface.

11. An electronic device comprising:
a secondary battery, the secondary battery comprising:
a first positive electrode;
a second positive electrode;
a positive electrode lead electrically connected to the first positive electrode and the second positive electrode;
a first negative electrode;
a second negative electrode between the first positive electrode and the second positive electrode;
a negative electrode lead electrically connected to the first negative electrode and the second negative electrode;
a separator; and
an exterior body wrapping the first positive electrode, the second positive electrode, the first negative electrode, the second negative electrode, and the separator,
wherein the first positive electrode is positioned between the first negative electrode and the second negative electrode,
wherein the first positive electrode, the second positive electrode, the separator, the first negative electrode, the second negative electrode, and the exterior body are configured to be curved in a first direction,
wherein the first negative electrode comprises a first negative electrode tab portion being in contact with the negative electrode lead,
wherein the second negative electrode comprises a second negative electrode tab portion being in contact with the negative electrode lead,
wherein the negative electrode lead, the first negative electrode tab portion and the second negative electrode tab portion overlap with each other,
wherein the first positive electrode comprises a first positive electrode tab portion being in contact with the positive electrode lead,
wherein the second positive electrode comprises a second positive electrode tab portion being in contact with the positive electrode lead,
wherein the positive electrode lead, the first positive electrode tab portion and the second positive electrode tab portion overlap with each other,
wherein the positive electrode lead and the negative electrode lead are drawn from opposite sides of the exterior body,
wherein a second direction connecting the first positive electrode tab portion and the first negative electrode tab portion is perpendicular to the first direction,
wherein the positive electrode lead and the negative electrode lead both extends in the second direction,
wherein the length in the first direction of the first positive electrode is longer than the length in the first direction of the second positive electrode,
wherein the first positive electrode comprises a first side and a second side,
wherein the first side and the second side face each other in the first direction,
wherein the first side, the first negative electrode and the second negative electrode overlap with each other,
wherein the second side, the first negative electrode and the second negative electrode overlap with each other,
wherein the first negative electrode comprises a fifth side and a sixth side,
wherein the fifth side and the sixth side face each other in the first direction,
wherein the second negative electrode comprises a seventh side and a eighth side,
wherein the seventh side and the eighth side face each other in the first direction,
wherein the fifth side and the seventh side are aligned,
wherein the sixth side and the eighth side are aligned,
wherein the first side is positioned inward the fifth side and the seventh side, and
wherein the second side is positioned inward the sixth side and the eighth side.

12. The electronic device according to claim 11, wherein the second positive electrode comprises a third side and a fourth side,
wherein the third side and the fourth side face each other in the first direction,
wherein the third side, the first negative electrode and the second negative electrode overlap with each other, and
wherein the fourth side, the first negative electrode and the second negative electrode overlap with each other.

13. The electronic device according to claim 12, wherein the first side and the third side are aligned, and wherein the second side and the fourth side are aligned.

14. The electronic device according to claim 11, wherein the length in the first direction of the first positive electrode is longer than the length in the first direction of the second negative electrode.

15. The electronic device according to claim 11, wherein the first positive electrode comprises a cut portion which overlaps with the first negative electrode tab portion.

16. The electronic device according to claim 11, wherein a length of the first direction of the exterior body is twice or more a length of the exterior body in the second direction.

* * * * *